United States Patent
White et al.

(10) Patent No.: US 7,134,279 B2
(45) Date of Patent: Nov. 14, 2006

(54) DOUBLE ACTING THERMODYNAMICALLY RESONANT FREE-PISTON MULTICYLINDER STIRLING SYSTEM AND METHOD

(75) Inventors: Maurice A. White, Pasco, WA (US); John E. Augenblick, Richland, WA (US); Allen A. Peterson, Kennewick, WA (US)

(73) Assignee: Infinia Corporation, Kennewick, WA (US)

( * ) Notice: Subject to any disclaimer, the term of this patent is extended or adjusted under 35 U.S.C. 154(b) by 0 days.

(21) Appl. No.: 11/211,147

(22) Filed: Aug. 23, 2005

(65) Prior Publication Data

US 2006/0048510 A1  Mar. 9, 2006

Related U.S. Application Data

(60) Provisional application No. 60/652,053, filed on Feb. 10, 2005, provisional application No. 60/652,458, filed on Feb. 10, 2005, provisional application No. 60/652,146, filed on Feb. 10, 2005, provisional application No. 60/604,468, filed on Aug. 24, 2004.

(51) Int. Cl.
*F01B 29/10* (2006.01)

(52) U.S. Cl. .................. 60/517; 60/525

(58) Field of Classification Search .............. 60/517, 60/518, 520, 522, 525
See application file for complete search history.

(56) References Cited

U.S. PATENT DOCUMENTS

| | | | |
|---|---|---|---|
| 4,148,195 A | 4/1979 | Gerstmann | |
| 4,389,844 A * | 6/1983 | Ackermann et al. | 60/517 |
| 4,476,681 A * | 10/1984 | Dineen | 60/486 |
| 4,612,769 A * | 9/1986 | Berntell | 60/521 |
| 5,146,750 A | 9/1992 | Moscrip | |
| 5,329,768 A | 7/1994 | Moscrip | |
| 5,654,596 A * | 8/1997 | Nasar et al. | 310/12 |
| 5,749,226 A | 5/1998 | Bowman | |
| 5,813,235 A | 9/1998 | Peterson | |
| 5,822,964 A | 10/1998 | Kerpays, Jr. | |
| 5,941,079 A | 8/1999 | Bowman | |
| 6,050,092 A * | 4/2000 | Genstler et al. | 60/520 |
| 6,094,912 A | 8/2000 | Williford | |
| 6,330,800 B1 | 12/2001 | Price | |
| 6,782,700 B1 | 8/2004 | Unger | |
| 2003/0074882 A1 | 4/2003 | Grimsa | |

FOREIGN PATENT DOCUMENTS

| | | |
|---|---|---|
| DE | 3407264 A1 | 8/1985 |
| WO | 1991/005948 A1 | 5/1991 |
| WO | 2004/085821 A1 | 10/2004 |

OTHER PUBLICATIONS

Walker, G., 'Stirling Engines', 1980, pp. 263-266, Oxford University Press, Bath, Great Britain.

JP56081245 (Maschf Augsburg Nuernberg AG), (abstract of corresponding document EP0027549), Jul. 3, 1981, [online] [retrieved Apr. 21, 2006] Retrieved from Internet <URL: http:/www.v3.espacenet.com/textdoc? DB=EPODOC&IDX=JP56081245&F=8.html.=.

(Continued)

*Primary Examiner*—Hoang Nguyen
(74) *Attorney, Agent, or Firm*—Brian L. Johnson; Davis Wright Tremaine LLP

(57) ABSTRACT

Present implementations provide an approach that allows for a double-acting, multi-cylinder, thermodynamically resonant, alpha configuration free-piston Stirling system. The system includes overstroke preventers that control extent of piston travel to prevent undesirable consequences of piston travel beyond predetermined limits. The overstroke preventers involve controlled work extraction out of the system or controlled work input into the system. Implementations can also include duplex linear alternators, and/or frequency tuning systems, and/or vibration balancing configurations.

53 Claims, 48 Drawing Sheets

OTHER PUBLICATIONS

West, C.D., 'Principles and Applications of Stirling Engines', 1986, pp. 63-67; 91-94; 205-206; and 209-216, Van Nostrand Reinhold Company, New York.

JP 61-223250 (Aisin Sieki Co Ltd), Oct. 3, 1986 (abstract), [online] [retrieved Apr. 17, 2006], Retrieved from: Japan Patent Office Database.

JP 01-193565 (Toshiba Corp), Aug. 3, 1989 (abstract), [online] [retrieved Apr. 17, 2006], Retrieved from: Japan Patent Office Database.

JP 01-280668 (Aisin Seiki Co Ltd, Ekuteh KK), Nov. 10, 1989 (abstract), [online] [retrieved Apr. 17, 2006], Retrieved from: Japan Patent Office Database.

JP 06-213074 (Tohoku Electric Power Co Inc, Isshiki Naoji) Aug. 2, 1994 (abstract), [online] [retrieved Apr. 17, 2006], Retrieved from: Japan Patent Office Database.

Clucas, D.M. and Raine, J.K., 'Development of a hermetically sealed Stirling engine battery charger', Journal of Mech. Eng. Sci., Proc. of Inst. of Mech. Engrs, 1994, pp. 357-366, Part C, vol. 208.

JP 10-318042 (Sakushiyon Gas Kikan, Seisakusho:KK, Iwamoto Shoichi) Dec. 2, 1998 (abstract), [online] [retrieved Apr. 17, 2006], Retrieved from: Japan Patent Office Database.

JP 11-107856 (Daiwa Kosan KK) Apr. 20, 1999 (abstract), [online] [retrieved Apr. 17, 2006], Retrieved from: Japan Patent Office Database.

White, Maurice A. Memorandum, Mar. 18, 2005, State of Washington.

'Low-Cost Solar-Thermal-Electric Power Generation', [online], [retrieved Apr. 21, 2006]. Retieved from Internet <URL:http:/www.cs.berkeley.edu/~artin/Research/research.html.>.

Der Minassians, A., et al., "Low-cost distributed solar-thermal-electric power generation", EECS Dept., US Berkeley, Berkeley, CA 94720, U.S.A., Proc. of SPIE vol. 5185, pp. 89-98.

Der Minassians, A., et al., "Low-cost distributed solar-thermal-electric power generation", Power Electronics Research Group, University of California, Berkeley presentation, pp. 1-16.

Walker, G., "Stirling-cycle machines", 1973, pp. 121-130, University of Calgary, Canada, Clarendon Press-Oxford.

Martini, W.R., "Test on a 4U Tube Heat Operated Heat Pump." 18th Intersociety Energy Conversion Engineering Conference—"Energy for the Marketplace," Orlando Florida, Aug. 21-26, 1983, vol. 2, pp. 872-874.

* cited by examiner

DOUBLE ACTING THERMODYNAMICALLY RESONANT FREE-PISTON MULTICYLINDER STIRLING SYSTEM AND METHOD

BACKGROUND

1. Field

The present invention is directed generally to thermodynamic machines and, more particularly, to machines based on the Stirling thermodynamic cycle.

2. Description of the Related Art

The concept behind conventional Stirling machines such as conventional Stirling engines and Stirling coolers has been known since the 19$^{th}$ century. Early-on, conventional hot air Stirling machines had some commercial success, however, electric motors and internal combustion machines displaced their use by the early 20$^{th}$ century.

The application of modern materials and analysis tools beginning in the mid-20$^{th}$ century allowed for improvements to be made in efficiency, power density and general functionality, which allowed conventional Stirling machines to capture a few specialized niche markets. Also, conventional Stirling machines have the advantages of low noise, high efficiency, ultra-low emissions, and the ability to operate from any high grade heat source. Unfortunately, conventional Stirling machines have drawbacks as well so that they have remained in these niche markets and otherwise a subject of curiosity.

Conventional Stirling machines are produced in three topological configurations generally referred to as alpha, beta, and gamma, and include two basic mechanical implementations: kinematic and free-piston machines. Kinematic machines are characterized by mechanical linkages that impose specific strokes and phase relationships among various power pistons and/or displacer pistons by means of connecting rods, crankshafts, bearings, and sliding seals. Kinematic machines require lubrication of the mechanical linkages and include sliding seals that impact operational lifespan and reliability of the machines due in part to lubricant leaking past the seals and associated heat exchangers becoming fouled.

Conventional free-piston (non-kinematic) machines have existed solely as single cylinder configurations. These single cylinder machines each have one reciprocating power piston and one displacer piston that move independently from one another and are not mechanically coupled to another. The stroke and phase relationships of the power piston and the displacer piston are subject to associated pressure wave interactions and resonant spring/mass/damper characteristics. Versions of conventional free-piston single cylinder machines can be built to forego requirements for lubricants and rubbing seals, which allows for very long term operation with high reliability. The single cylinder free-piston machines are also in general mechanically simpler than kinematic machines, but design for proper operation requires very sophisticated dynamic analysis and fine tuning adjustments to enable the single reciprocating piston and the single displacer to operate in the proper phase relationship at the full desired stroke without overstroke.

Single cylinder free-piston Stirling machines are elegantly simple mechanically, but extremely complex from a dynamic and thermodynamic analysis perspective. This complexity is evidenced by conventional efforts over the last approximately forty years. During those years roughly dozens of organizations have attempted to produce single cylinder free-piston Stirling machines and only a few are known to have had any significant success.

Possibly less than a handful of profitable practitioners of single cylinder free-piston Stirling machines worldwide remain. Conventional single cylinder free-piston Stirling machines are single-acting beta or gamma configurations with a displacer piston and a power piston. The displacer is a typically lightweight, lightly damped driven resonant harmonic oscillator. The power piston is a typically massive, heavily damped (as a result of extracting useful work) driven resonant harmonic oscillator.

The only coupling between displacer and power piston is the dynamic pressure wave generated by the displacer shuttling working fluid between the hot and cold regions of the Stirling machine. The two resonant harmonic oscillators must be properly "tuned" by carefully selecting parameters that affect moving masses, spring rates, and displacer drive rod area, and by displacer damping as a result of fluid flow losses through heater, regenerator, cooler, and connecting passages.

The desired outcome of the above tuning is to ensure that both the displacer piston and the power piston operate at full stroke but avoid overstroke at all times, including any potential transients, and that the phase lag between them produces near-optimum power transfer. The net result is that single cylinder free-piston Stirling machines are extremely sensitive to having all these tuning parameters in proper balance to produce and maintain proper operation. Many seemingly minor deviations can produce major performance, or even functional, degradation. The free-piston single cylinder Stirling machines are also unfavorably heavy for a given rated capacity and have limitations in their peak output capacity.

In general, kinematic Stirling machines less than about a kilowatt in output are single cylinder machines of the beta or gamma configuration with one piston and one displacer, which may be in the same or different cylinders (the alpha configuration requires by definition at least two piston cylinders with one piston per cylinder). Larger machines may be a kinematic two-cylinder (two-piston) alpha configuration in the lower power levels, but nearly all with 10-kW or higher output are kinematic four-cylinder alpha machines with four sets of heat exchangers (heater/regenerator/cooler) interconnecting the four pistons in the so-called Siemens or Rinnia configuration as illustrated schematically in FIG. 1 showing a conventional kinematic multicylinder implementation. The implementation 10 includes non-fluid non-free-pistons 12 with piston rods 14 coupled to a crankshaft 16.

In general conventional single-cylinder and two-cylinder machines are single-acting (Stirling-cycle pressure wave on one end of the piston and near-constant pressure on the other end of the piston) machines while in general four-cylinder kinematic machines are double-acting (different Stirling-cycle pressure waves on each end of the piston with a 90 degree phase lag between the pressure waves imposed by the kinematic mechanism). These factors cause the kinematic alpha machines, particularly in the double-acting configuration, to have a significantly higher power density and typically higher efficiency than the beta or gamma configurations. Although benefits exist, problems as described with Stirling machines continue to interfere with further commercialization potential of the technology.

BRIEF DESCRIPTION OF THE SEVERAL VIEWS OF THE DRAWING(S)

DETAILED DESCRIPTION

Figure 1:
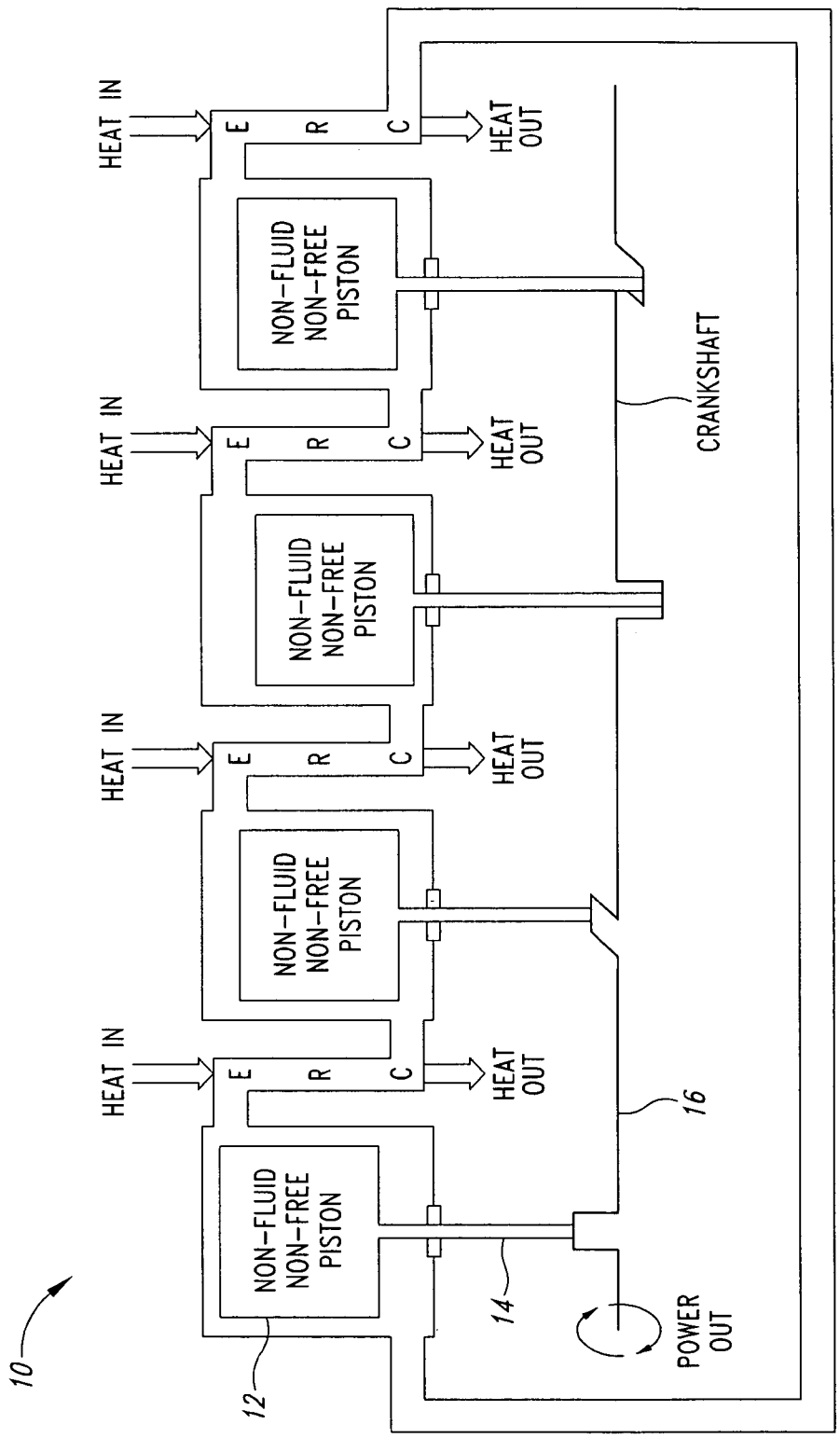
FIG. 1 is a schematic diagram of a conventional kinematic based multicylinder machine.

Present implementations provide an approach that allows for a double-acting, multi-cylinder, thermodynamically resonant, alpha configuration free-piston Stirling machine. Based upon this approach potential exists for the performance advantages of the conventional kinematic Stirling machine while retaining the life and reliability benefits of the conventional single cylinder free-piston Stirling machine. Potential also exists to greatly reduce analysis requirements away from the complex dynamic analysis and tuning requirements required for conventional single cylinder free-piston Stirling machines by eliminating the displacer pistons required for all conventional free-piston Stirling machines. All known conventional free-piston thermodynamically resonant Stirling machines are single cylinder piston-displacer configurations.

A relatively recent conventional innovation involves a thermoacoustic machine, which in effect replaces the physical displacer piston in a conventional free-piston machine with a tuned gas column that provides the functional equivalent of the displacer. That further simplifies the mechanical complexity, but it also introduces a new level of dynamic analysis and tuning complexity. Present implementations described herein extend another level beyond these thermoacoustic machines by totally removing the displacer function, both at the hardware level and at the dynamic analysis and tuning requirements level.

Therefore, in exchange for the well understood and straightforward complication of integrating multiple cylinder heat exchangers, the designs of the present inventive approach eliminate the conventional displacer hardware of free-piston Stirling machines and greatly reduce the very substantial dynamics analysis complexities otherwise required by conventional free-piston Stirling machines or thermo acoustic devices. In addition, the well-known advantages of conventional kinematic double acting pistons and the conventional kinematic alpha Stirling thermodynamic configuration are provided.

Present implementations provide for a free-piston Stirling machine with multiple cylinders (multiple Stirling machine cycles) that allows for substantially greater power density than existing single cycle machines. Conventional free-piston Stirling machines are single cycle machines with one displacer and one power piston, configured in what is commonly referred to as beta or gamma configurations.

The present implementations apply to alpha configuration machines with multiple power pistons, typically, three or more pistons. Implementations include a like number of heat exchanger circuits (serially sequenced heater, regenerator, cooler) that connect the hot end of one piston to the cold end of another piston. Such a thermodynamic connection has been commonly practiced for many years in conjunction with kinematic machines—that is machines in which a mechanical coupling imposes specific relationships between the motions of the various pistons.

Given this age of energy scarce resources, whether due to basic geological factors or other factors related to human organizations, a system and method to produce power from a vast variety of sources including fossil fuels, biomass fuels, solar collection, geothermal, and advanced nuclear processes and other sources would be welcomed. This system and method would be even more welcomed if it was impressively durable in operation, required little maintenance and performed with unfailing reliability. This system and method would be still further welcomed if it could boast marvelous efficiencies and allow for large scale units and relatively straightforward mass production. It is our conviction such realities can be achieved through implementations of a double acting, thermodynamically resonant, free-piston multi-cylinder Stirling system 100 and associated method, as exemplified by an implementation schematically depicted in FIG. 2.

The system 100 retains the reliability aspects of single cylinder free-piston Stirling machines while at the same time gains additional benefits such as enhanced power densities and other enhancements. Conventional free-piston Stirling machines involve a single cycle with one displacer and one power piston, configured in what is commonly referred to as beta or gamma configurations.

The present system 100 involves what is known as an alpha configuration machine, however, conventional alpha configuration machines are not of the free-piston type. As an alpha configured machine, the system 100 utilizes three or more pistons 102 in individual cylinders 104 and a like number of heat exchanger circuits 106. The heat exchanger circuits 106 each have an expansion area heat exchanger ("expansion exchanger") 108 to accept heat in 110, a regenerative heat exchanger ("regenerator") 112, and a compression area heat exchanger ("compression exchanger") 114 where heat out 116 is rejected from the system. Each cylinder 104 has a hot end 118 and a cold end 120. The heat exchanger circuits 106 are configured in the system 100 to connect the hot end 118, of each of the cylinders 104 to the cold end 120 of a different one of the cylinders.

Although conventional approaches have used heat exchanger circuits to connect multiple cylinders together, the conventional approaches have not used only the shared thermodynamic system formed by such connections to couple the conventional pistons together. Instead the conventional approaches have also used mechanical couplings to couple the conventional pistons together. These conventional mechanical couplings impose specific relationships between the various conventional pistons. As discussed above, in FIG. 1, the exemplary conventional alpha system 10 has the pistons 12 with the piston rods 14 mechanically coupled together through a crankshaft 16.

In contrast to conventional approaches, the system 100 is free-piston based and does not use such mechanical couplings of the non-free-piston based Stirling machines. Instead the system 100 uniquely relies on the coupling of the cylinders 104 together via connection through the heat exchanger circuits 106 to couple the pistons 102 together through thermodynamic resonance of the pistons.

Figure 2:
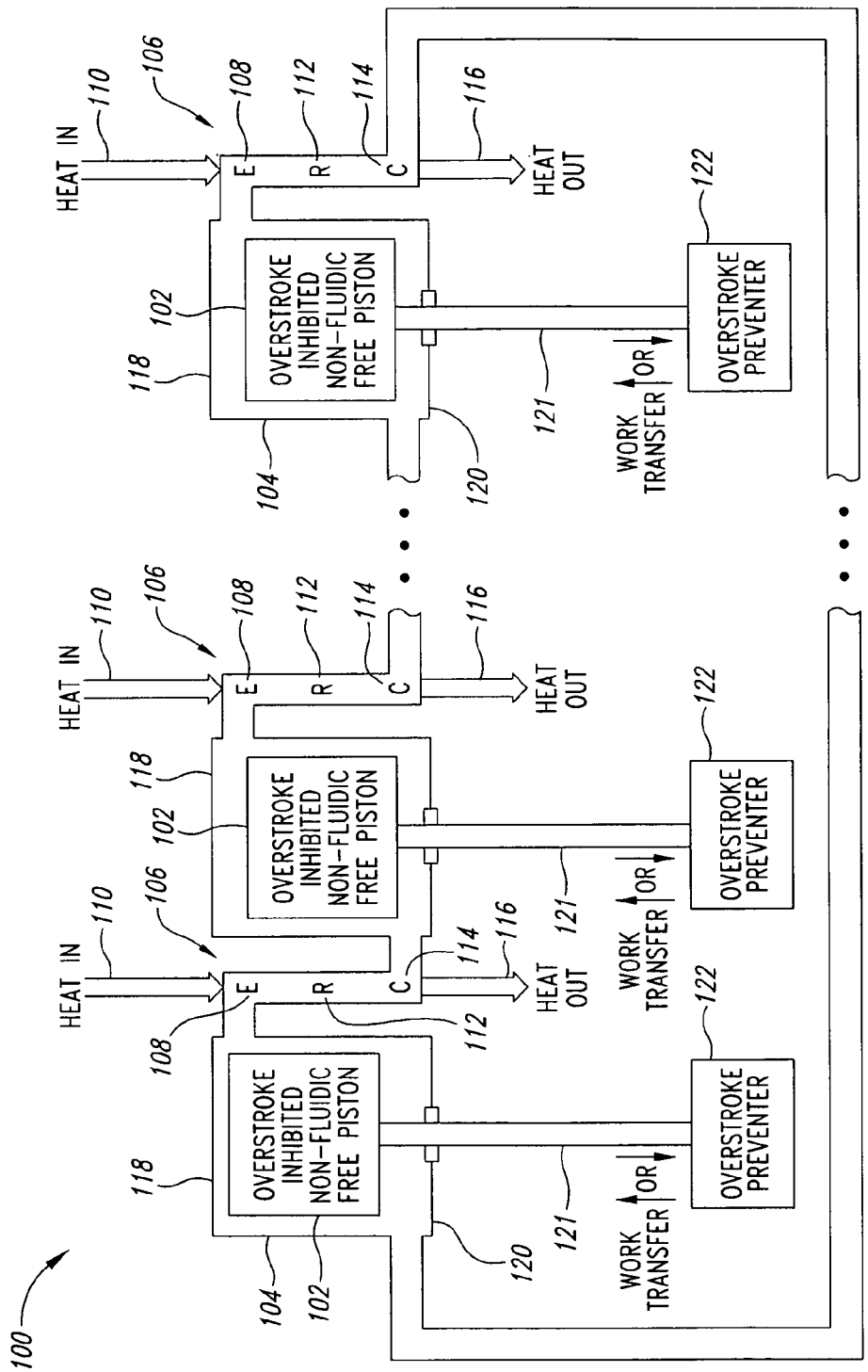
FIG. 2 is a schematic diagram of a non-fluidic free-piston multicylinder Stirling system with overstroke prevention.
Figure 3:
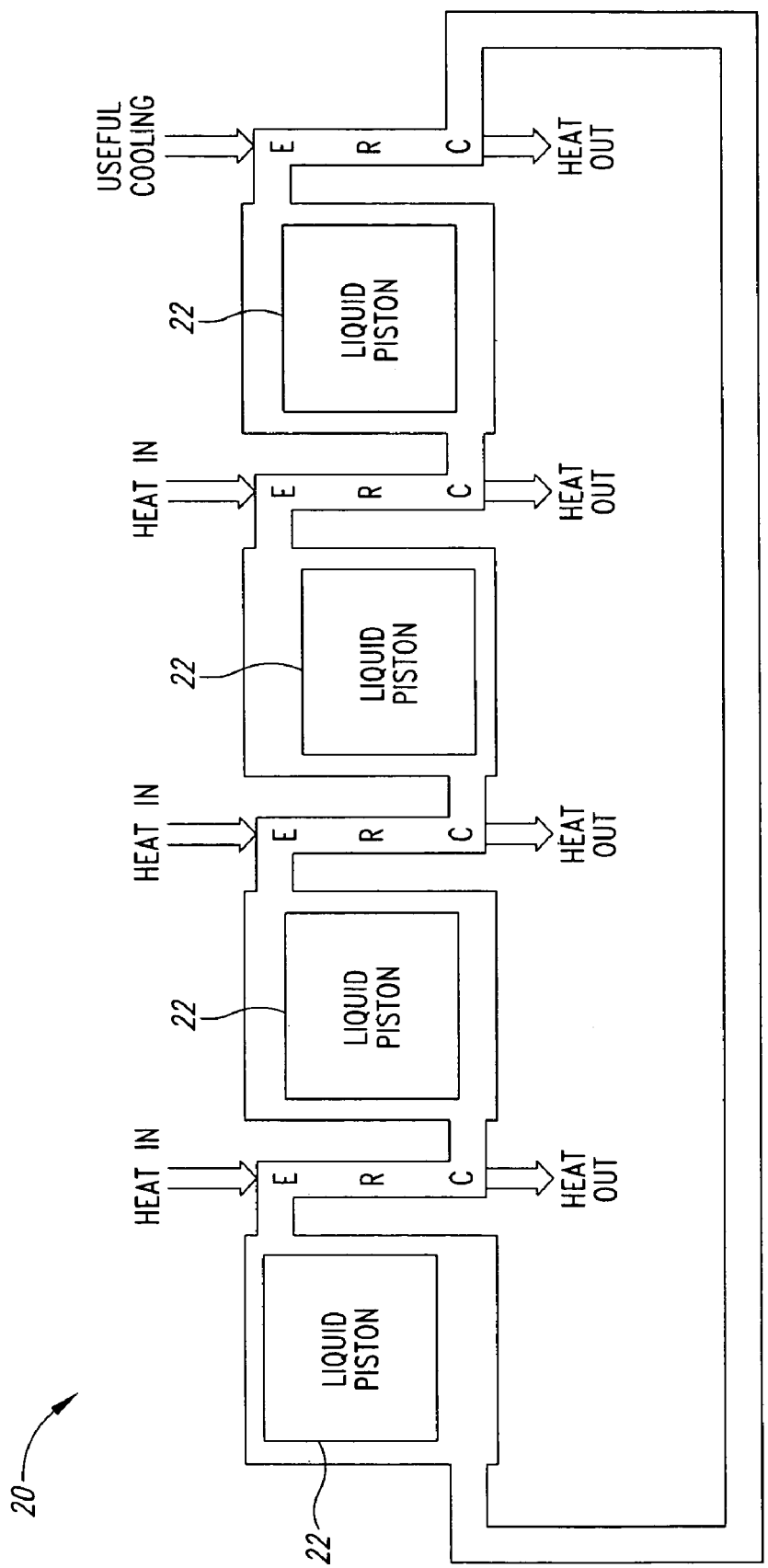
FIG. 3 is a schematic diagram of a conventional fluidic free-piston multicylinder Stirling system.

The pistons 102 are labeled as "overstroke inhibited non-fluid free-pistons" in FIG. 2 to clarify some of the differences between the system 100 and a conventional liquid piston system 20 schematically depicted in FIG. 3. The liquid piston system 20 includes liquid pistons 22 that consist of liquid and are not mechanically coupled together. Due to the liquid nature of the liquid piston 22, the conventional liquid piston system 20 does not provide a direct means to prevent overstroking of its pistons as is found with the system 100 since overstroking is avoided indirectly by maintaining the temperature difference between heat in and heat out at a sufficiently low level. This in turn greatly inhibits the ability to extract significant levels of useful work.

Since the pistons 102 of the system 100 are not mechanically coupled together as found in conventional alpha multi-cylinder Stirling machines, it is highly likely that without proper overstroke prohibition, the pistons can travel too far in their strokes and either be damaged or damage another component of the system. The conventional teaching using mechanically coupled pistons, however, does not address or suggest a method for overstroke prohibition regarding any free-piston multicylinder Stirling machine and such overstroke prohibition has been conceived of or reduced to practice until the present system 100.

Again referring to FIG. 2, to provide overstroke prohibition, the system 100 includes a piston rod 121 coupled to each of the pistons 102. In turn, an overstroke preventer 122 is coupled to each of the piston rods 121. Depending upon the implementation of the system 100, the overstroke preventer 122 can either extract work from the piston movement or supply work to the piston movement. When extracting work, the overstroke preventer 122 can take forms such as an alternator, a pump, a compressor, a pneumatic device or another electrical device, another mechanical device, or another electro-mechanical device that extracts work. When supplying work, the overstroke preventer 122 can take forms such as a motor, an engine, a turbine, or another electrical device, another mechanical device, or another electro-mechanical device that supplies work. Some of these electrical devices, mechanical devices, or electro-mechanical devices that either extract work or supply work will be discussed below in greater detail to provide representative examples but are not intended to limit the type of electrical devices, mechanical devices, or electro-mechanical devices that can be used as the overstroke preventer 122.

There are many advantages of conventional multi-cylinder kinematic non-free-piston Stirling machines relative to conventional single-cylinder kinematic non-free-piston that advantageously will apply to the system 100 having both multi-cylinders and free-pistons compared with conventional free-piston single cylinder Stirling machines. Such advantages include increased power density as a result of using double-acting pistons that are driven by the pressure difference between two adjacent thermodynamic cycles rather than by the conventional approach of using substantially smaller pressure difference between one cycle and an average-pressure buffer space. In other words, the system 100 can have a more effective utilization of the thermodynamic circuits involved as a result of using an alpha configuration in a non-conventional implementation of free-pistons.

The system 100 can have advantages relative to kinematic non-free-piston Stirling machines such as having few or absolutely no complex kinematic linkages to limit life and reliability, such as having few or absolutely no limitations to durability or reliability due to sliding seals that must segregate oil vapors and working cycle gas, little or no lubricants required, and reduction or total elimination of conventional kinematic friction losses related to crankshaft bearings, swash plates, sliding seals, or other linkages. In a typical kinematic engine design, useful work is first transmitted into an energy storage device, such as a flywheel or swash-plate, and then extracted through linkages or a crankshaft to drive the forced work for each cycle. Implementations of the system 100 can eliminate several kinematic reliability issues, as well as inherent power dissipation through kinematic linkage transmission inefficiency, by simply removing the linkages and adding overstroke preventers. In addition, implementations of the system 100 can be entirely linear, without rotating shafts or leaky, high-maintenance, rotating or sliding oil seals that severely limit the life and reliability of kinematic non-free-piston Stirling machines.

The mechanical configuration of the system 100 in an exemplary four-cylinder implementation is simplified relative to four separate single-cylinder free-piston Stirling machines by reducing from two to one moving members per cycle. In conventional single cylinder free-piston Stirling machines, there are two discrete moving parts, the displacer piston, which helps convert the input heat energy into a pressure wave, and the power piston, which is attached to the mover of the linear alternator. In the system 100, this arrangement is replaced by a single piston that converts the input heat energy directly into mover oscillation. Gaining a simplified mechanical configuration by reducing from two moving members per cycle of the conventional single free-piston Stirling machines to one moving member per cycle of the system and method can be a significant improvement. In other words, one moving member per cycle is mechanically simpler than two moving members per cycle and the transition to a single class of mover greatly simplifies the analytical requirements and practical operation of the machine.

An important reliability advantage to the system 100, relative to conventional free-piston Stirling machines, is the complete removal of the free displacer in favor of double-acting free-pistons. The four double-acting pistons with hot caps effectively perform the functions of both a displacer and a power piston. This can be seen in FIG. 2 as each of the four pistons has a hot side and a cold side simultaneously communicating with two different Stirling cycles. Removing the conventional displacer reduces the number of parts per Stirling cycle and increases the controllability of the machine operation, since all moving parts can be tied to electromagnetic or other control systems. Free displacers in gamma- and beta-style Stirling machines are driven only by gas pressure oscillations, and their motion is very sensitive to pressure, temperature, and casing displacements. Using only electromagnetically-coupled pistons can provide avenues for improved amplitude and frequency control, compared to a displacer-type machine, over a much broader range of operating conditions.

As each of the pairs of the pistons 102 and cylinders 104 of the system 100 are thermodynamically linked and locked into a given phase arrangement, most design and post-design tuning issues that tend to dominate single-cylinder free-piston Stirling machine design are eliminated. The frequency, at which the pistons 102 reciprocate in the system 100 and the resulting output power, can be controlled by simply altering the mass and spring characteristics of the pistons in a similar manner for each piston. This is accomplished in practice by adding or removing flexures or other mechanical springs, or by adding or removing mass from the pistons 102 or related moving components of the system 100. Naturally, it is preferable to keep the mass and spring characteristics closely similar for all the pistons 102 for a relatively easy approach to tuning of the system 100.

The system 100 has further potential advantages over free-piston single cylinder Stirling machines including use of the pistons 102 as double-acting pistons, which increases Pressure-Volume (P-V) work relative to conventional single-acting pistons. Another advantage relates to potential increases in the associated pressure wave amplitude relative to conventional gamma configurations, as a result of reducing effective dead volume, to boost performance of the system 100. Further, power transfer can increase by changing phase angle between pistons (such as an enhanced 90° (four-cylinder) or 120° phase angle (three-cylinder) compared with conventional 60°–70° values for phase angles in existing single-cylinder free-piston Stirling engines.

Other potential advantages over free-piston single cylinder Stirling machines include the potential for connecting opposite alternators to reinforce a desired 180 degrees phase difference between free-pistons of the alpha configuration. Another potential advantage is that a substantially large portion of the free-piston tuning issues found with the single cylinder free-piston Stirling machines are avoided by having one class of resonantly-tuned moving members (all the moving members are power pistons) with fully symmetrical disposition as found with the some embodiments of the present system and method, rather than having two classes of asymmetrically disposed and tuned resonant movers (some moving members are power pistons and other moving members are displacement pistons) with widely differing spring/mass/damper characteristics as found with the conventional single cylinder free-piston Stirling machines.

In short, use of a single class of moving members (all moving members are power pistons) afforded by the system 100 greatly simplifies tuning of the system. It can been seen that a corollary advantage is that frequency of piston movement with the system 100 can be readily modified by adding or removing flexure bearings (or other spring force elements) or by adding or removing piston/mover mass in a similar manner on all pistons in a straightforward manner with little, if any, need of the sophisticated extreme higher order analysis commonly required with the conventional single cylinder free-piston implementations.

In contrast, the system 100 has a favorable potential that nominally similar spring-mass-damper characteristics will result in stable operation at a resonant frequency. With the system 100, simply changing the spring rate and/or moving mass in a consistent fashion with the power piston components will alter the operational frequency in a readily predictable manner and without proper operation being dependent on sophisticated analysis and sensitive selection of operational tuning parameters.

Further potential benefits exist with the system 100. For instance, the system and method can have simplified alignment requirements compared with single cylinder, free-piston Stirling machines. The system 100 also can reduce complexity with heat exchanger design for large scale implementations. The system 100 can have many potential advantages in life and reliability over the kinematic machines, as well as numerous potential performance advantages over existing multi-cylinder kinematic or single-cylinder free-piston machines.

Some of these additional potential advantages include practical implementation benefits. Implementations of the system 100 can be controlled through use of conventional technology applied to this non-conventional system so that existing equipment already available can be readily modified for use in the system. For instance, standard or advanced controllers can be used to prohibit piston overstroke of the system 100 without requiring extremely sophisticated analysis and implementation procedures.

Another practical advancement with the system 100 is that opposing alternators placed in parallel can further reinforce desired 180° phase differences between the pistons 102, which are particularly applicable for 4- and 6-cylinder configurations and such paired configurations. A separate and different, but somewhat related, alternator approach is afforded by the system 100 by offering opportunity to implement a new class of compact duplex linear alternators as further discussed below.

As mentioned, the system 100 allows for higher capacities and power-densities. In conjunction with this, the system 100 also allows for scalable configurations to provide large scale operations while still providing reliability comparable to single cylinder free-piston Stirling machines. For instance, electrical capacities of 10 kW to 100 kW and more can be built as multi-cylinder free-piston Stirling machines without requirements to greatly extend linear alternator state-of-the-art. Other associated Stirling based technologies can also be utilized to further increase generation capacity such as through the use of platelet heater elements and other advanced alternators.

Space Applications

Potential space applications of the system 100 include nuclear-reactor power and/or propulsion systems for manned and unmanned flights. Several potential deep space, planetary lander and moon infrastructure missions, including the Jupiter Icy Moons Orbiter (JIMO), could significantly benefit from the reduced weight, improved stability, and potentially higher energy conversion efficiency of the system 100. The system 100 is also likely to have a significant mass (specific power) advantage as well. This efficiency (and mass) advantage provides mission planners with much more flexibility. The additional power can be used to power more science modules and/or the additional efficiency can be used to reduce the size of the reactor and of the overall power system, including the heat rejection system. These operational advantages provide mission planners with more flexibility.

Stirling machines are rapidly gaining recognition as a truly viable technology for nuclear energy conversion in space. Nuclear power systems are being viewed as increasingly necessary for extended deep space and long term planetary missions. Project Prometheus is actively developing nuclear reactors for deep space exploration missions such as the Jupiter Icy Moons Orbiter (JIMO) that will require larger space-ready power converters than are presently available. The system 100 could offer a much larger and more power dense Stirling Converter system than has ever been available, while maintaining the reliability and longevity characteristics of current systems required for deep space exploration. The system 100 has potential to be scaled up to provide 100 kW or more with superior power density and reliability.

Additional potential applications of the system 100 for space include solar dynamic power and/or propulsion systems for manned and unmanned flights, and for government and commercial solar power for high power consumption satellites that is resistant to electromagnetic pulse and other forms of radiation which can adversely affect photovoltaic cells.

Additionally, space cryocoolers based on the proposed innovation could be implemented for higher efficiency and power density than current Stirling cryocoolers. Technology based on successful use by the system 100 of flexure-supported Stirling power converters can be designed to have the long life and reliability needed for space applications such as power converters, solar-satellite and other power converters such as radioisotope generators.

The system 100 can be scaled for large scale applications such as solar dynamic satellite power systems and power converters in the tens of kilowatts or hundreds of kilowatts ranges. As communication satellites increase in size and power demand, the currently used solar panels have difficulty providing adequate power for spacecraft. The inherent manufacturability of power converters based on the system 100 can provide for potential lower costs and less environmental impact than can be realized by photovoltaic technology.

Commercial Applications

A wide array of terrestrial applications exist for the system 100. The system 100 can provide increased value in many cases, including remote off-grid applications of high reliability power loads and distributed power generation, residential and industrial cogeneration, and solar power conversion. The system 100 can serve a significant portion of the remote power market for high reliability power. The system 100 could replace existing thermoelectric and Rankine cycle technology. In addition, the system 100 can be used for engines/generators, heat pumps, or cryocoolers. Any of these devices could be assisted by the system 100 with its higher power density, efficiency, reliability, and scalability than is currently available from the conventional Stirling technology. The system 100 can replace many existing systems using gasoline, diesel, propane, natural gas, biomass, solar, or other heat sources. Potential power generation markets include combined heat and power applications, remote stand alone high reliability power, solar/dish renewable power, biogas renewable power, and auxiliary power generators for boats and recreational vehicles.

Generator sales in the U.S. alone were over $2 billion in 2003 and are expected to grow rapidly in the next several years. The system 100 would represent a premium product in the generator market, offering high value features in many applications, such as multi-fuel capability, silent operation, reduced maintenance, and long life.

Combined heat and power (CHP) production is gaining a great deal of popularity in Europe. The Netherlands, for example, produces nearly 30% of its power in CHP applications and expects that percentage to increase significantly over the next 20 years. Application of the system 100 in a cogeneration system could include small scale or micro-cogeneration (micro-combined heat and power (mCHP)) systems capable of supplying heat and power to a single building or multi-family dwelling. Affordable micro-cogeneration systems could provide enough power to postpone expensive grid expansions and prevent power shortages during periods of peak load.

The system 100 would allow scaling to much higher power levels. Both characteristics would provide significant advantages in the European, Asian and U.S. mCHP markets. Alternative Stirling cogeneration applications that could also benefit from the system 100 include portable and stationary food service facilities using combined heat and power, and military applications such as field kitchens, laundries and hospitals.

Remote high reliability power applications include communications systems for telecommunications and small power applications along gas and oil pipelines and offshore oil platforms. These power requirements are usually indispensable to the operation of the application and have to perform reliably under extreme environmental conditions. A remote power stand-alone system could be based on a 1 kW version of the system 100 to allow entry into a large portion of this remote high reliability power market with single and multiple systems. The same or similar value characteristics for the remote high reliability power implementations of the system 100 exist in power applications with considerably higher power requirements (5 to 100 kW).

North American utilities are arguably behind their European counterparts in implementing green power alternatives. Large scale Stirling machines for cogeneration and solar power applications are possible with the system 100 and would increase green power use. Initiatives already exist at state and federal levels to fund testing and deployment of 25 to 50 kW Stirling solar dish applications, which have been held up in the past by the lack of reliable Stirling engines of sufficient power output.

The system 100 could be used by government departments and Investor Owned Utilities in conjunction with a Stirling Dish technology. In addition, many local city wastewater treatment plants across the U.S. are viable candidates for power generation using renewable digester methane gas, if reliable engine generators can be developed with acceptable economic returns to the cities. Currently fuel treatment costs for reciprocating engines and micro turbines have not been as viable as hoped. 50 to 100 kW implementations of the system 100 could be reliably used for biogas operation on a multitude of renewable fuels. The system 100 would be also useful for supporting applications where only electrical power is needed. Examples include military field generators, where nearly silent, maintenance-free operation is a valuable attribute. Solar power applications include distributed power generation and even large arrays for utility scale power as envisioned by the current DOE initiative for 1,000 MW of solar power by 2010.

According to the World Bank, over 2.5 billion people, or approximately 500 million households in the world, do not have access to adequate electricity. These households spend over $40 billion each year on inferior energy services from kerosene, candles, and battery charging, often times at power costs that exceed $1.50 to $2.00 per kWh. The power from a single Stirling micro-cogeneration implementation of the system 100, potentially powered by biomass or solar heat, could provide electricity and hot water for a multi-family dwelling, a hospital, or even a small village.

The system 100 can be used to supply off-grid residential power, and recreational vehicle or marine auxiliary power. Estimates show that for Stirling technology to be successful in these applications, power outputs of 5 to 75 kW will be required, which are currently outside the practical range of free-piston single cylinder ("FPSC") Stirling machines. Fortunately, the present system 100 should be able to handle this range.

Regarding the power requirements of developing nations, in order to accomplish a successful introduction of this technology in developing countries at small residential population centers (the location where most households are without power and without the economic and health benefits of having power), the attributes of the Stirling technology need to be incorporated into generators of sufficient size to make a meaningful difference. Existing internal combustion engine generators are undesirable for this application because of their emissions, noise, and extensive maintenance requirements, so the system 100 would be an attractive alternative.

The system 100 allows implementations to serve markets and applications that require the unique advantages of free-piston technology, such as high reliability with little to no noise or maintenance, in larger power systems than can presently be served by conventional free-piston single cylinder Stirling machines.

Military Applications

With advanced communications equipment, the U.S. military requires increasingly more electricity in the field. These power requirements are currently provided primarily by diesel engine generators that impact their environment with noise and foul emissions. The system 100 could distinctly serve various branches of the armed forces, including the Army, Navy and Marine Corps, with its scalable, nearly-silent, nearly maintenance-free, low emissions power systems. Implementations of the system 100 have potential to provide a large, power dense Stirling energy system capable of providing reliable power with virtually no noise and using comparable or less fuel than existing tactical generators. The manufacturability of implementations of the system 100 and its ability to run on military logistics fuels also has potential to provide much lower infrastructure and operations costs than fuel cells and other emerging technologies, without sacrificing benefits or reliability.

Applications for Renewables

Programs in many state governments are providing incentives for utilities to increase their proportion of renewable power, such as electricity generated from solar, wind and biomass fuel sources. The system 100 could serve markets for concentrated solar power (CSP) as well as a wide variety of waste to energy and dedicated energy crop applications better than most technologies available today since, for instance, relatively large power output requirements for some applications can be very challenging if not impossible for conventional single-cylinder free-piston approaches. Unlike fuel cells, which require expensive reformers, the versatility of the system 100 makes it easy and cost-effective to adapt for virtually any renewable fuel source. The same generator with different combustor technology could be run on everything from landfill gas and agricultural methane to hydrogen and CSP, greatly improving production economies. The expected long life, high reliability, scalability for larger sized generators, and zero-maintenance of the system 100 makes it a preferred technology, compared with conventional Stirling and other conventional machines such as internal combustion engines for distributed generation in remote locations where no one may be around to monitor it.

Given the many benefits, advantages, and applications, including those enumerated herein, of various implementations of the system 100, one may wonder why the system 100 is just now appearing on the scene. It is speculative as to why the timing of some if not much innovation occurs the way it does. The following is offered instead as an observation as to the differences in thinking behind the conventional Stirling systems and the system 100.

The implementations of the system 100 have taken an approach contrary to long established beliefs that a multi-cylinder free-piston thermodynamically resonant alpha Stirling machine would be too complex to be worth pursuing in either a conceptual or actual functional machine. Conventional wisdom has stayed with the conventional single cylinder free-piston approach without venturing forth into the realm of the system 100. The system 100 was conceived by going beyond conventional wisdom to realize multicylinder free-piston alpha configurations without the undue complexity imagined by the conventional wisdom.

Simplifications involved with the system 100 compared with conventional approaches can include displacer piston elimination, resonant harmonic oscillators (pistons) being nominally identical, and the thermodynamic circuits interacting with the pistons in a symmetric manner. As a result, present implementations of the system 100 can be "tuned" for desired operational performance to operate at a given frequency based on the net mass-spring-damper forces on the pistons. Contrary to conventional wisdom, implementations of the system 100 are forgiving regarding associated tuning parameters in contrast to the highly sensitive tuning parameters of conventional free-piston Stirling machines. The tuning parameters of the present implementation of the system 100 can easily be adjusted by changing, for example, the spring rate or mass of all pistons in a similar manner.

Contrary to conventional wisdom, present implementations of the system 100 do not require the elaborate conventional free-piston interactive dynamic analysis used for conventional single cylinder free-piston machines, whereas conventional wisdom would expect that any attempts in building a multi-cylinder free-piston alpha machine would require at least as much if not more analysis than a conventional single cylinder free-piston Stirling machine. Contrary to conventional wisdom, present implementations of the system 100 can operate at a net resonant frequency even if there are substantial parameter differences or unknown parameters normally essential for getting a conventional single-cylinder free-piston Stirling machine to even nominally function.

These factors were clearly confirmed in the first operation of a multi-cylinder free-piston Stirling machine by a demonstration implementation of the system 100 through actual operation in a manner that would have been totally unacceptable for any conventional free-piston Stirling machine to the point that by conventional wisdom it would be more than reasonable to expect failure of the demonstration implementation rather than the successfully demonstrated operation that occurred. If the same degree of non-integration were to occur, as with the operational version of the demonstration implementation of the system 100 with mismatched and disparate parts being used, with a conventional free-piston Stirling machine, the convention free-piston Stirling machine would fail. Yet; for the demonstration implementation of the system 100, operation was successful on the first attempt with little or no need for implementation adjustments.

Some aspects of the demonstration implementation involved with the feasibility demonstration proved benefits by opposing conventional free-piston machine design norms. The demonstration implementation used portions of a conventional four-cylinder kinematic engine hot end design for the basic structure with the kinematic components removed. The conventional engine was designed to use nitrogen working fluid whereas the demonstration engine used helium. Further, design frequency was 25 Hz whereas operation was at 52 Hz. Design was for a 20-mm stroke whereas operation was at 11 mm. The design rod-to-piston area ratio of 17% needed no adjustment which is unheard of with this parameter which almost always demands precise fine tuning for conventional free-piston single cylinder Stirling machines. Although the regenerator porosity and heat exchanger geometry were unknown, this was not a factor for successful operation and would again have meant failure for a conventional free-piston Stirling machine.

To construct the feasibility demonstration implementation, four obsolete cryocooler linear alternators were salvaged from another totally different Stirling machine for the demonstration implementation having a 60 Hz Design (different than 52 Hz operation), having a 12-mm stroke limit (different than 11 mm operation). Further, the implementation had two different design generations involved with the linear alternators. There was 9% unit-to-unit motor constant variation. Also there was an awkward two-level mounting because piston spacing limitation forced major asymmetry.

Given all the imperfections and mismatching of the equipment, the conventional wisdom would have expected the demonstration implementation not to work because first, a free-piston alpha configuration Stirling machine had never been attempted before; and second, no conventional free-piston Stirling machine could operate with a similar mismatched configuration. Furthermore, all the components were assembled and integrated "as-is" with no dynamics or thermodynamics analysis prior to assembly.

Widely varying piston ring friction levels (a residual from kinematic engine components) resulted in 30 to 55 W drive power required to motor various alternators at 60% stroke in open air. Little adjustment was done leaving a crude alignment in both axial and radial directions for the operating implementation. Yet with all these factors that would doom a conventional free-piston Stirling machine, the demonstration implementation successfully operated in a stable manner on the first attempt with no modifications before or after operation. Laboratory measurements revealed that positions of the four free-pistons involved had a 12% stroke variation caused by the numerous factors. Even with this stroke variation and numerous other drawbacks, the demonstration implementation operated with a near 90 degree phase lag between adjacent pistons—totally contrary to conventional wisdom.

Given the many decades of exclusive focus on single cylinder Stirling machines whenever a free-piston machine was to be designed and/or built, it is understandable that these relatively hassle-free results would come as a great surprise to the conventionally minded. Hassle-free is a term not equaled with the conventional world of free-piston Stirling machines given the rigorous analysis required for the sole conventional version: the single cylinder machine. The inventors are unaware of any attempt to actually build an alpha free-piston multicylinder machine as is found with the system 100. Further, the inventors know of no references whether alone or in combination that teach and/or suggest sufficient aspects to conceive of the system 100. For instance, since the pistons 102 are of a non-fluid type, a form of over-stroke prevention is needed to prevent a piston from traveling too far and hitting another component or otherwise damaging or reducing performance of the system.

The inventors were, and are still, unaware of any teaching as to what to do to implement any sort of overstroke prohibition with a free-piston multicylinder machine such as the system 100. The extreme reluctance of the conventional wisdom to do anything other than the tried and true single cylinder for free-piston machines is evidenced in past by the lack of anyone trying to build a free-piston multicylinder machine and by the absence of any teaching anywhere in the literature or elsewhere as best is known by the inventors as to what to do about overstroke protection for a free-piston multicylinder machine either for an actual or a theoretical machine or any other possible type of free-piston multicylinder machine.

Figure 4:
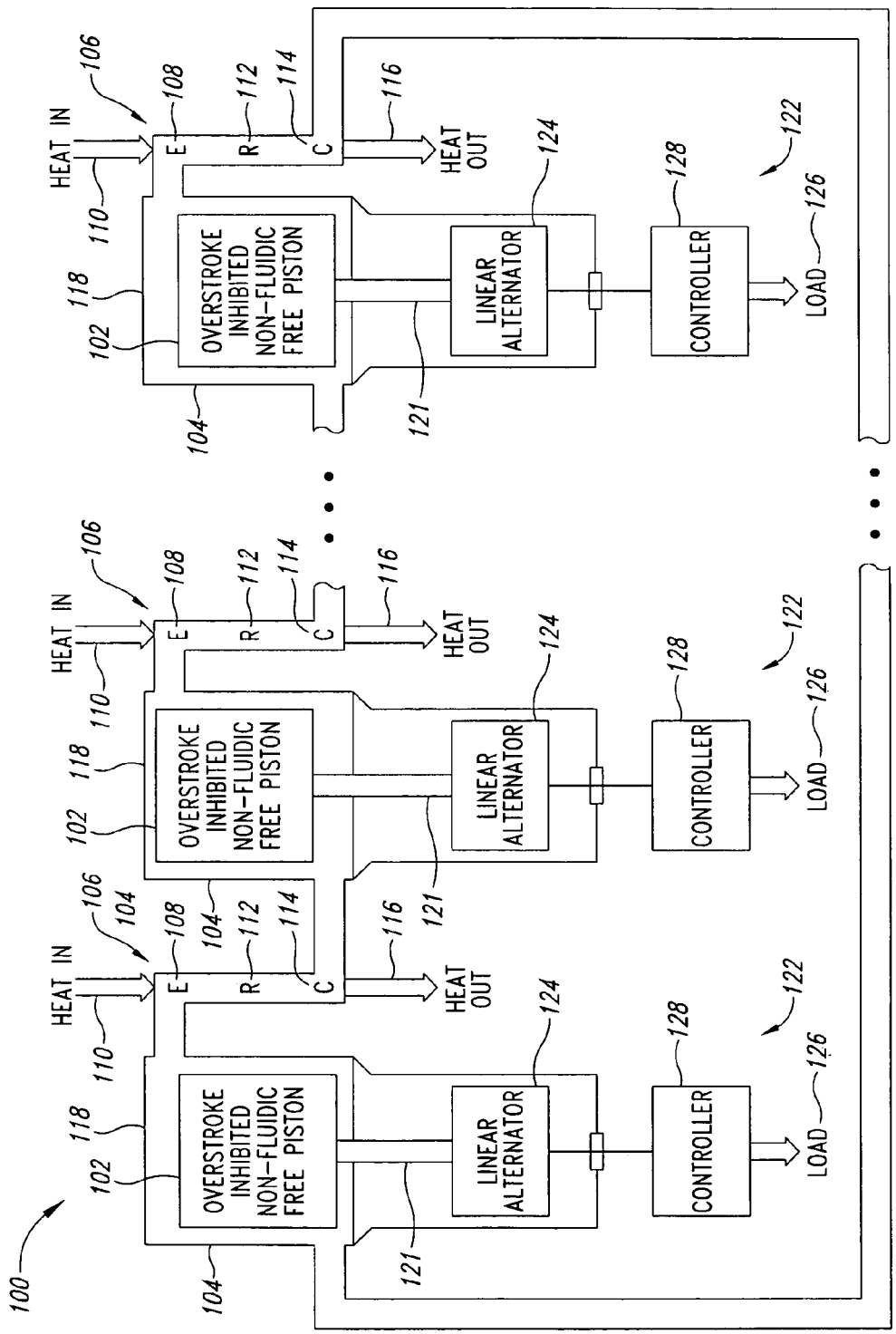
FIG. 4 is a schematic diagram of an implementation of the non-fluidic free-piston multicylinder Stirling system depicted in FIG. 2 wherein overstroke prevention involves a linear alternator and a controller.

An exemplary linear alternator implementation of the system 100 is schematically depicted in FIG. 4 as having a linear alternator 124 for each of the pistons 102. Each of the linear alternators 124 is coupled to its respective one of the pistons 102 by the piston rod 121 to translate reciprocal piston motion into electrical power to a load 126. The system 100 further has a controller 128 to control the linear alternators 124, for instance, regarding prevention of piston overstroke.

An output controller, such as the controller 128, serves to control piston stroke in such a way that it provides good performance but prevents potentially damaging piston overstroke. Aspects of controlling piston stroke for conventional single cylinder free-piston Stirling machines are taught in such publications as U.S. Pat. Nos. 6,050,092, 6,094,912, 6,330,800, and 6,782,700 and Patent Publication No. WO02073768. Significantly, such references do not teach or suggest piston stroke control for free-piston multicylinder configurations. Piston stroke control for free-piston multi-cylinder Stirling machines is part of the inventive concepts discussed herein. One breakthrough disclosed herein is that the controller 128 can use principles of conventional controllers for single cylinder free-piston machines. The controller 128 may also serve other useful purposes such as providing an interface between the linear alternator and the load that meets load requirements and prevents load changes from adversely affecting piston or linear alternator operation. Further background on piston stroke control is presented below.

Figure 5:
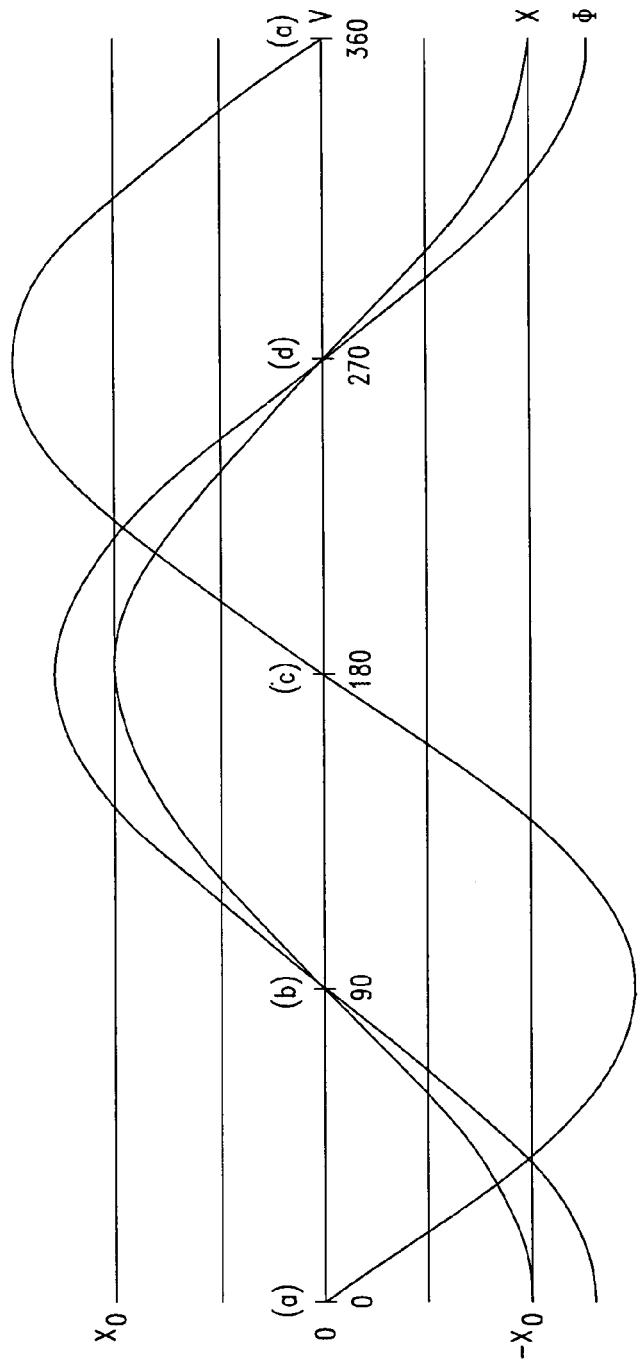
FIG. 5 is a graphical plot showing relationships between associated mover position, flux and generated voltage wave forms.
Figure 6A:
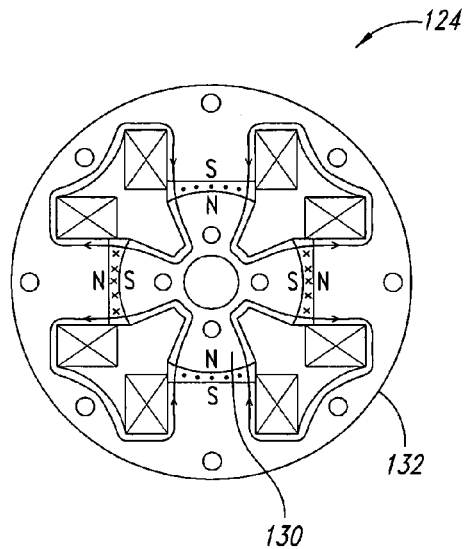
FIG. 6A is a top plan view of a representative implementation of a mover relative to a stator of a linear alternator used in implementations of the system for position a of FIG. 5.
Figure 6C:
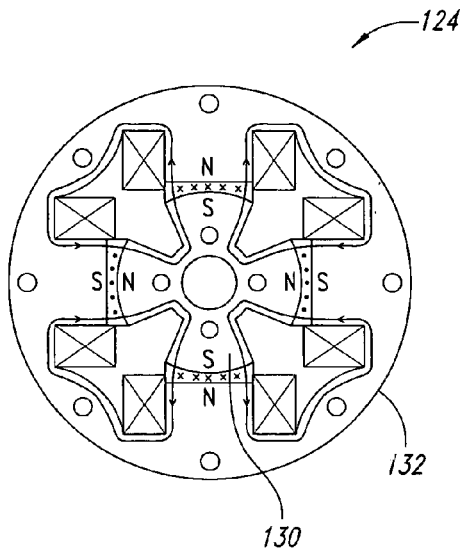
FIG. 6C is a top plan view of a representative implementation of a mover relative to a stator of a linear alternator used in implementations of the system for position c of FIG. 5.
Figure 6B:
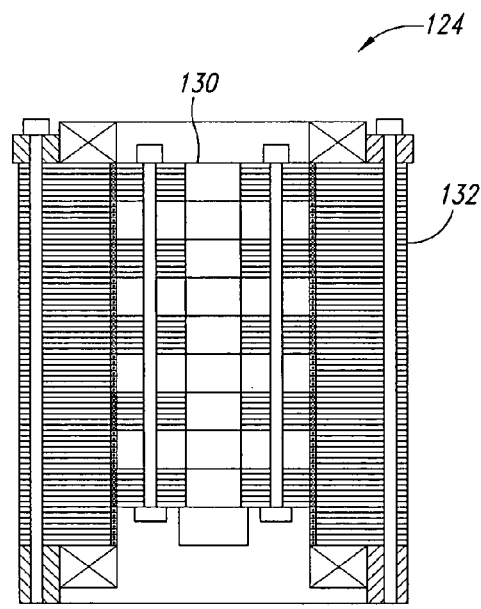
FIG. 6B is a side elevational view of the representative implementation of the linear alternator shown in FIG. 6A.
Figure 6D:
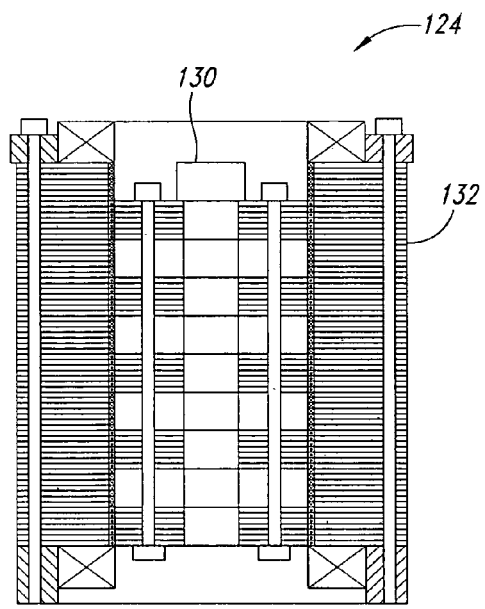
FIG. 6D is a side elevational view of the representative implementation of the linear alternator shown in FIG. 6C.
Figure 7A:
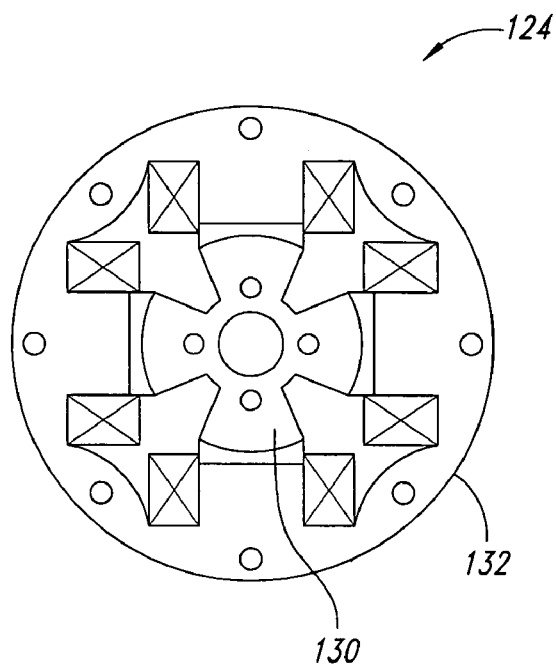
FIG. 7A is a top plan view of a representative implementation of a mover relative to a stator of a linear alternator used in implementations of the system for positions b and d of FIG. 5.
Figure 7B:
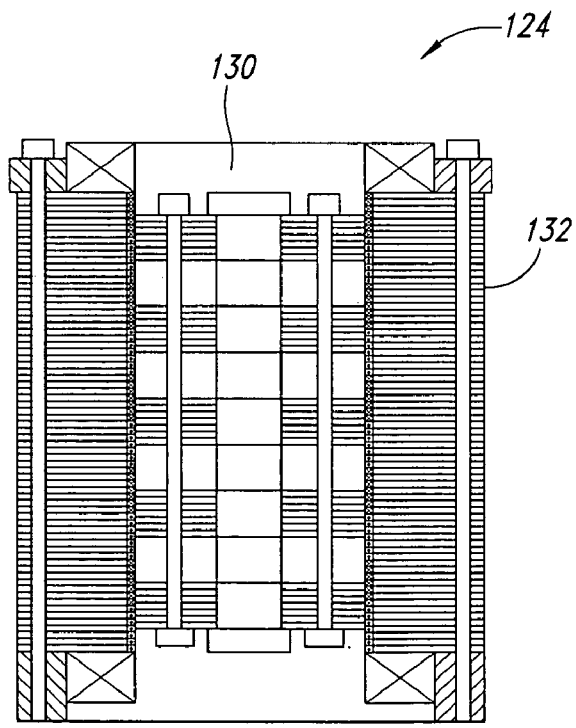
FIG. 7B is a side elevational view of the representative implementation of the linear alternator shown in FIG. 7A.

Generally a Zener controller or any other controller to control linear motor or alternator stroke can be used to control piston stroke in a multi-cylinder engine. One way to control stroke is by maintaining a specific back electromagnetic force to control amplitude. To do so, terminal voltage is limited to maintain a specific back electromagnetic force therefore limiting and consequently controlling the piston stroke. Associated relationships between stroke and voltage via expansion of Faraday's law are now discussed. FIG. 5 shows relationships between associated mover position, flux and generated voltage wave forms. FIGS. 6A–6D and 7A–7B show corresponding locations of a representative implementation of a mover 130 relative to a stator 132 of the linear alternator 124 at FIG. 5 positions a (shown in FIGS. 6A and 6B), and c (shown in FIGS. 6C and 6D) and FIG. 5 positions b and d (shown in FIGS. 7A and 7B).

Figure 8:
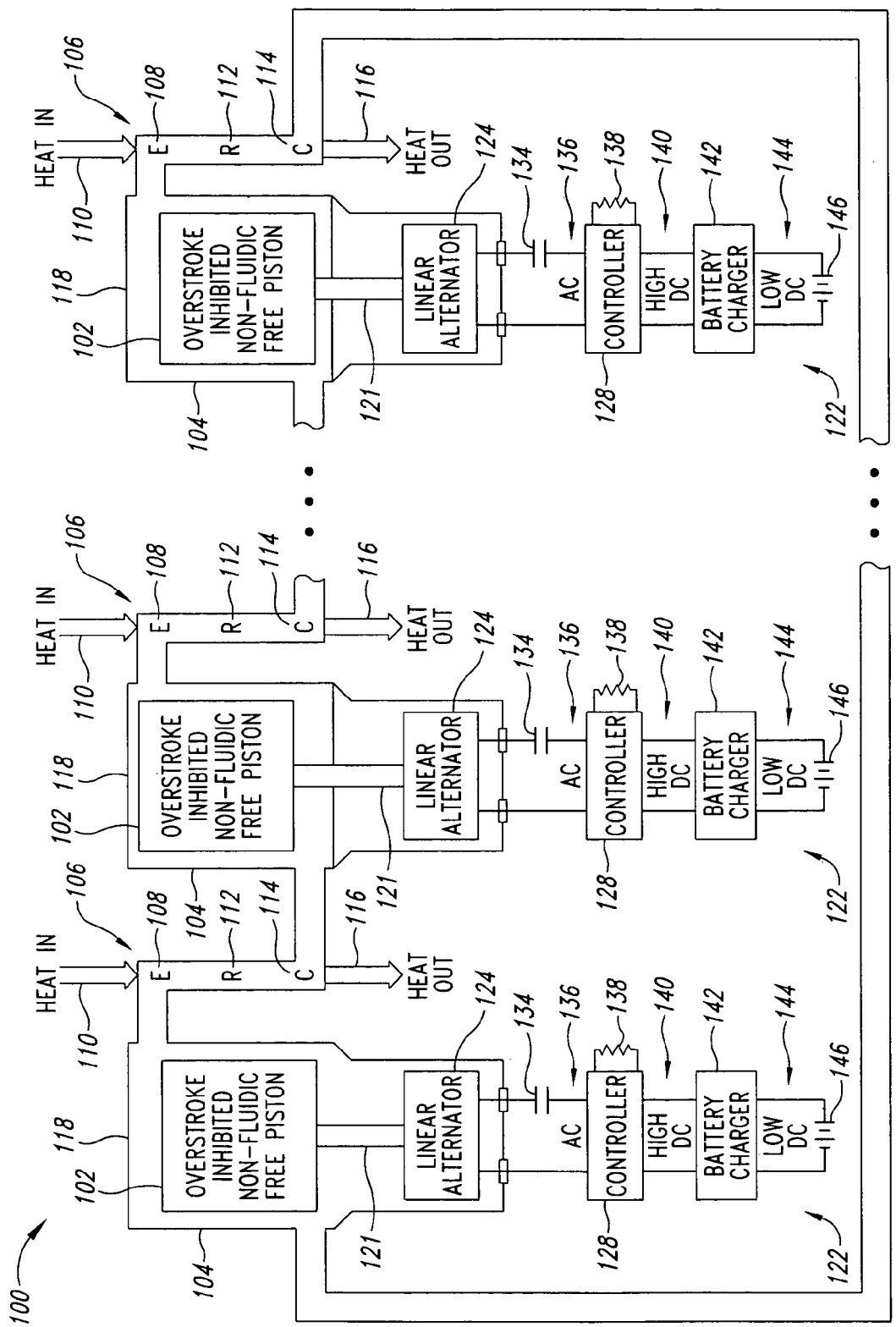
FIG. 8 is a schematic diagram of an implementation of the non-fluidic free-piston multicylinder Stirling system depicted in FIG. 2 wherein overstroke prevention involves a battery charger and a controller.

A battery charging implementation for controlling the linear alternators 124 of the system 100 to prevent piston overstroke is shown in FIG. 8. The linear alternators 124 are each coupled with a capacitor 134 to input alternating current (AC) electrical power 136 into the controller 128 of the linear alternator. Each of the controllers 128 is coupled to a dump resistor 138 to receive some of the electrical power 136 as further discussed below. Each of the controllers 128 is coupled to transfer high voltage direct current (DC) electric power 140 to a battery charger 142. Each of the battery chargers 142 then outputs low voltage DC electric power 144 to charge a battery load 146.

All electrical power created by each of the linear alternators 124 of the system 100 for the battery charging implementation depicted in FIG. 8 is directed to charging batteries or if excess power exists, using resistive conversion of the excess power to dissipate the excess power as thermal energy. In particular, when each of the battery loads 146 cannot accept the entire amount of electrical power generated by its respective one of the linear alternators 124, the respective one of the controllers 128 then dissipates any power in excess of what is required to charge the battery load into the respective dump resistor 138.

As discussed further below each of the dump resistors 138 can actually be a collection of individual resistors (not shown) in which the controller 128 determines which one or ones of the individual resistors is used to dissipate excess electrical power. An alternative implementation uses each of the controllers 128 to also adjust the amount of heat input that is being received by each of the expansion exchangers 108 instead of or in addition to the use of the dump resistors 138. These implementations use a type of the battery chargers 142 that is current limited with respective to output capacity of its linear alternator 124 to avoid stalling out the respective piston 102. The high DC electric power 140 is represented in FIG. 8 for implementations of the linear alternators 124 involving 110 or 220 VAC RMS. In other implementations, the linear alternator 124 can be configured to operate at a lower voltage to more closely match voltage levels of the battery loads 146.

Figure 9:
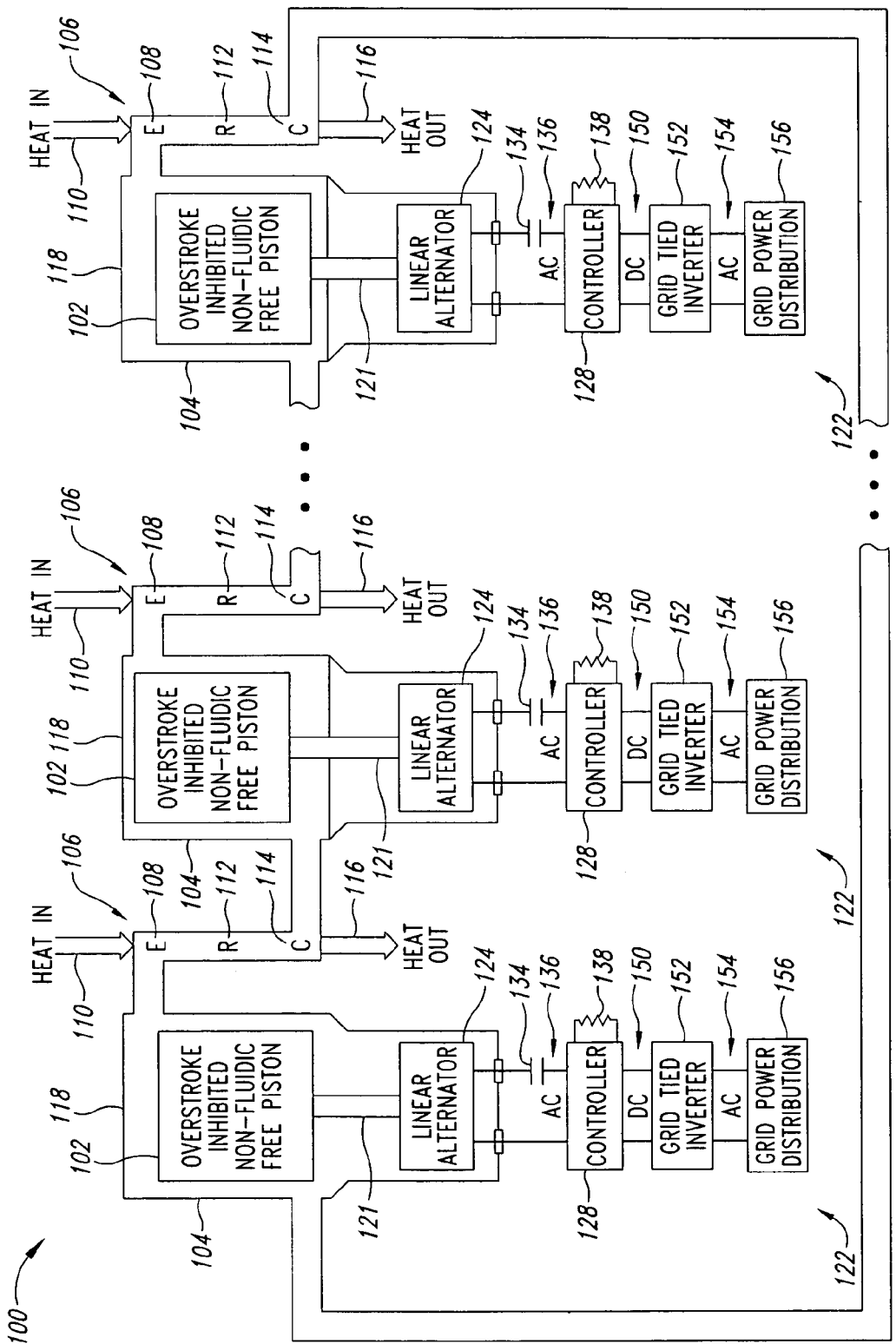
FIG. 9 is a schematic diagram of an implementation of the non-fluidic free-piston multicylinder Stirling system depicted in FIG. 2 wherein overstroke prevention involves a grid tied inverter and a controller.

An inverter based power conditioning implementation for power grid applications to control the linear alternators 124 of the system 100 to prevent piston overstroke is shown in FIG. 9. In this implementation, the controllers 128 are incorporated to manage any unused power during startup, shut-down and grid interrupts. The controllers 128 can be analog type such as those commercially available from Infinia Corporation or Enatec Corporation. Each of the controllers 128 is coupled to a DC-AC inverter 152 that is in turn coupled to an AC grid power distribution 156 (generally the same grid power distribution is coupled to all of the inverters of the system 100). The inverters 152 are configured to convert varying voltage and frequency of the electrical power generated by the linear alternators 124 to the necessary voltage and frequency specification of the particular implementation of the grid power distribution 156.

Figure 10:
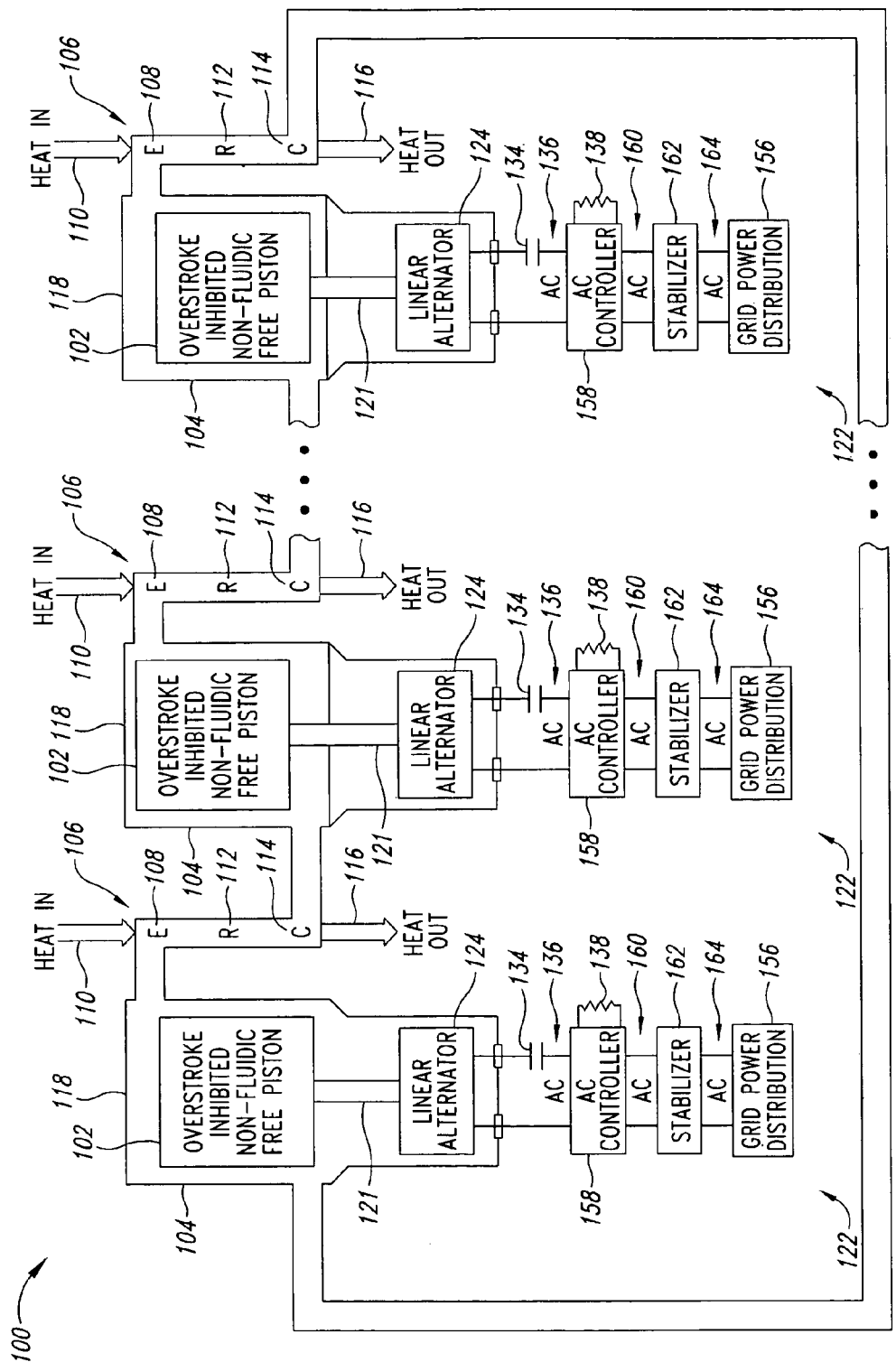
FIG. 10 is a schematic diagram of an implementation of the non-fluidic free-piston multicylinder Stirling system depicted in FIG. 2 wherein overstroke prevention involves a stabilizer and a controller.

A stabilizer based power conditioning implementation for power grid applications to control the linear alternators 124 of the system 100 to prevent piston overstroke is shown in FIG. 10. In this implementation, each of a plurality of AC controllers 158 is coupled to a different one of the linear alternators 124 of the system 100 to receive AC electrical power 136 and in turn output AC electrical power 160. A stabilizer 162 is coupled to the AC controllers 158, such as manufactured as a grid box by Enatec corporation, to condition the AC electrical power 160 to specifications associated with the grid power distribution 156. The AC controllers 158 are used to manage unused power during start-up, shut-down, and grid interrupts.

Typically, the stabilizers 162 can be particularly useful when the natural frequencies of piston reciprocation are different (typically by several Hertz) than the design criteria of the grid power distribution 156. Without the stabilizer 162 in this implementation of the system 100, piston reciprocation can become unstable if the natural frequency of piston reciprocation is too far from grid frequency. The stabilizer 162 is configured to monitor output frequency and voltage levels of the AC controller 158 and of the grid power distribution 156.

The stabilizer 162 manipulates the phase of the AC electrical power 160 from the AC controller 158 to match the phase of the grid power distribution 156. It is possible in certain implementations, that once startup of the system 100 is accomplished, the AC controller 158 can be directly coupled to the grid power distribution 156 with the piston reciprocation being synchronized with the grid power distribution to match and to respond to changes in grid voltage, phase, and frequency.

With implementations of the controller 128 and the AC controller 158, overstroke protection is achieved by dumping power to the dump resistor 138. Another approach uses a voltage divider (not shown) having input into a Zener diode in series with a plurality of resistors coupled to an appropriate number of operational amplifiers and being compared to a fixed volt reference. The full wave bridge rectifier (riot shown) using Schottky diodes and capacitance establishes a DC rail. The AC component of the DC rail is used for piston overstroke prevention.

If the DC rail voltage exceeds the voltage of the Zener diode due to an increase in the stroke amplitude of the respective piston 102, a first op amp will go high to turn on a field effect transistor (FET) in series with a first individual resistor, as explained above, being collectively part of the dump resistor 138. If the resistive load is not enough to pull down the DC rail, a next op amp will go high turning on a next FET, and so on. An object of some implementations is to provide enough power dissipation ability in the collective individual resistors of the dump resistor 138 to prevent piston overstroke even if the battery load 146 of FIG. 8, or other load, or grid power distribution 156 is disconnected.

Figure 11:
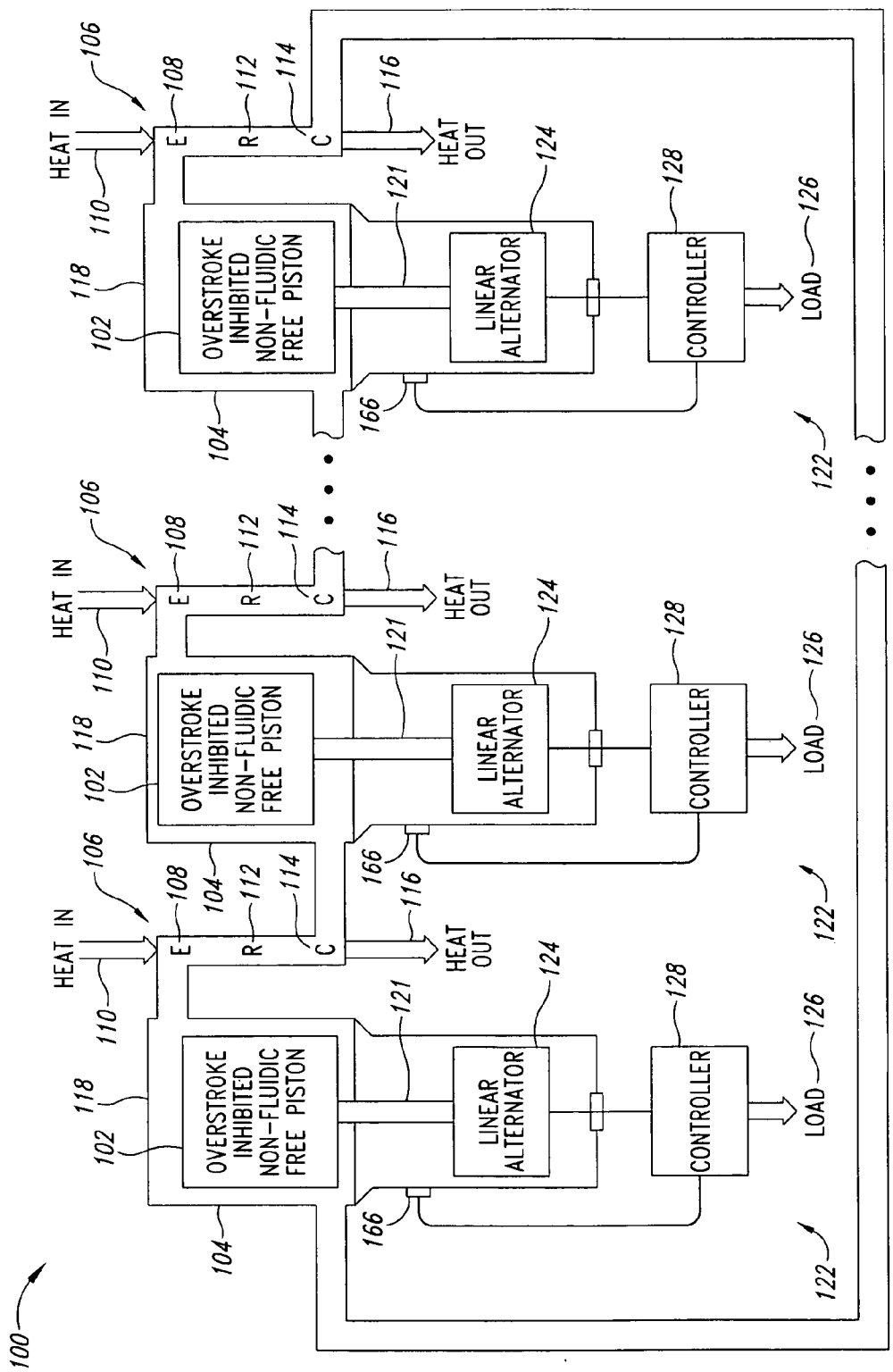
FIG. 11 is a schematic diagram of an implementation of the non-fluidic free-piston multicylinder Stirling system depicted in FIG. 2 wherein overstroke prevention involves a linear alternator and controller with feedback.

Piston overstroke prevention can also be accomplished through use of amplitude control in which a stroke position sensor 166 shown in FIG. 11 provides piston position information regarding the respective piston 102 to the respective controller 128. The controller 128 based on this piston position information adjusts the amount of output power sent to the load 126.

Figure 12:
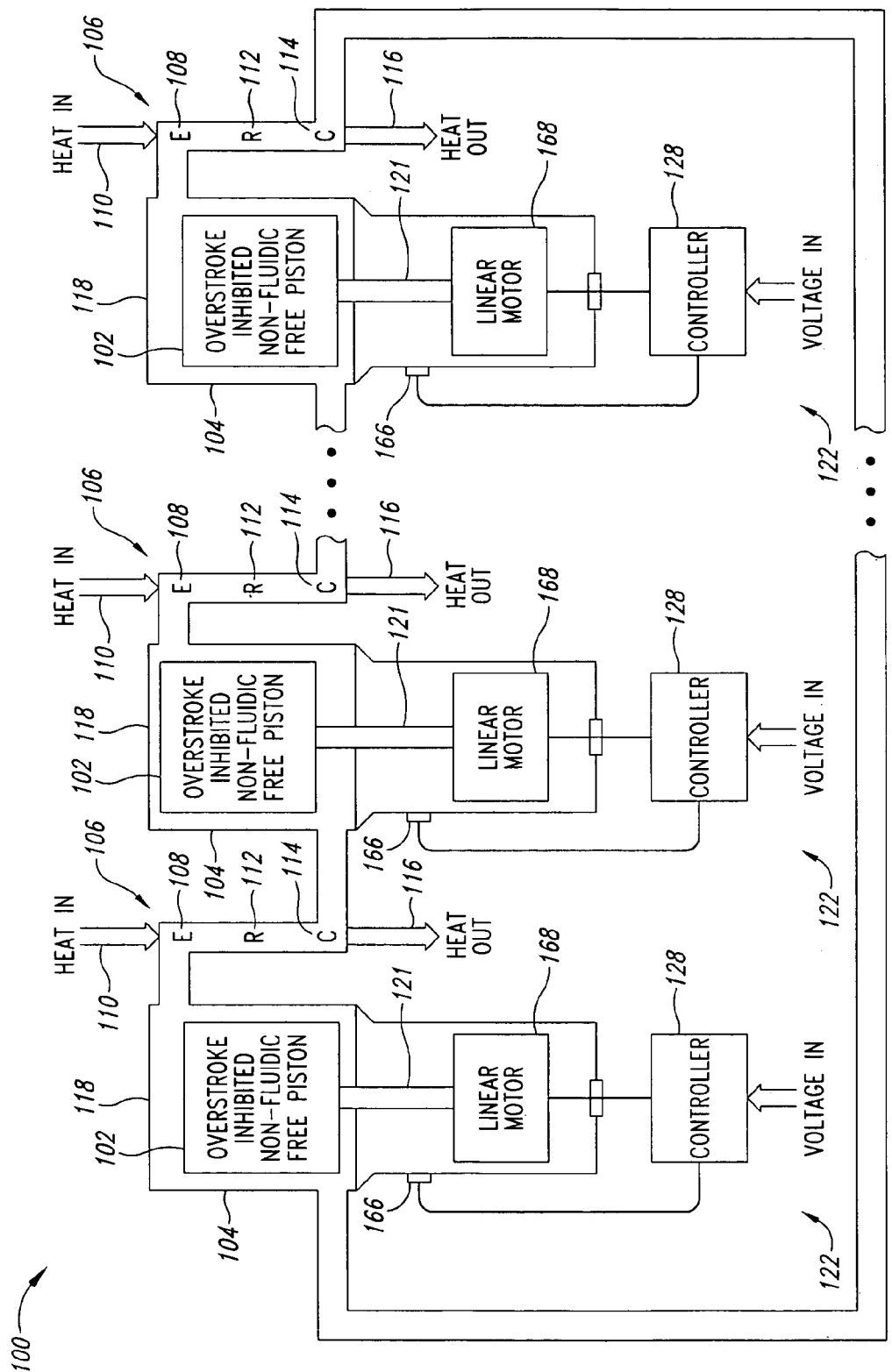
FIG. 12 is a schematic diagram of an implementation of the non-fluidic free-piston multicylinder Stirling system depicted in FIG. 2 wherein overstroke prevention involves a linear motor and controller with feedback.

A linear motor-implementation of the system 100 having linear motors 168 instead of the linear alternator 124 is shown in FIG. 12. Piston overstroke is prevented by the controller 128 controlling electrical power to the linear motor 168 based upon position information of the positions of piston 102 sent from the position sensor 166 to the controller. The linear motor implementation can be used for applications such as heat pump or cooler configurations of the system 100.

The advantages identified above for the system 100 in general and described with regard to an engine using linear alternators also generally apply to the system 100 as a cryocooler or a refrigerator. For the motor implementation, external heat input is not required. Instead, the driving force for the thermodynamic cooling cycle is the input of electricity to the linear motors 168 that cause the pistons 102 to reciprocate. The piston motion then results in a useful cooling or refrigeration effect in the expansion exchangers 108 of the cylinders 104. Waste heat is then rejected to ambient from the compression exchangers 114. Motion of the pistons 102 is driven to ensure proper phase lags between adjacent pistons. In the case of four piston machines, a quadrature relationship exists with a 90 degree electrical phase lag between the piston linear motors 168. This in turn implies that opposite piston motions are electrically and mechanically 180 degrees out of phase.

Synchronizing opposite piston motions does not require separate provision of a further quadrature phase shift in the electrical supply, because oppositely positioned linear motors 168 having the proper polarity will force the pistons 102 to move with the desired 180 degree phase relationship. Consequently, a minimum of two electrical sources are provided as "voltage in" in FIG. 12 that operate with a 90 degree phase shift in order to drive a four piston cooler. One desirable mode for driving a multi-cylinder free-piston refrigerating system is to provide three of the cylinders 104 operating with 120 degree phase lags and driving the three associated ones linear motors 168 with widely available three-phase electrical power. This simplifies piston control functions required to establish the proper stroke and phase relationships for the pistons 102 and for overstroke prevention. A related configuration that accomplishes similar results is to incorporate six cylinders with 60 degree phase angles between adjacent pistons. In this instance, three phase power can also be used, with each phase driving two opposite linear motors 180 degrees out of phase.

One configuration for cases where the generated power will be provided to a utility grid or other 3-phase load is to construct the system 100 using three (or other multiples of 3 such as 6) of the cylinders 104, which therefore generates 3-phase power directly. This approach can simplify useful power extraction from the system 100 and can also provide the desired piston overstroke prevention capability. Opportunity exists for increased efficiency because there are no losses associated with typically required intermediate electrical or electronic conversion mechanisms. Further, the 120 degree phase lag associated with the 3-phase power can improve basic thermodynamic cycle efficiency.

Similar benefits can be realized with a six-cylinder machine in which adjacent ones of the pistons 102 operates 60 degrees out of phase with one another. Opposingly arranged ones of the pistons 102 can have their respective ones of the linear alternators 124 coupled together so that 180 degrees out-of-phase motion associated with a pair of opposing pistons is reinforced.

Figure 13:
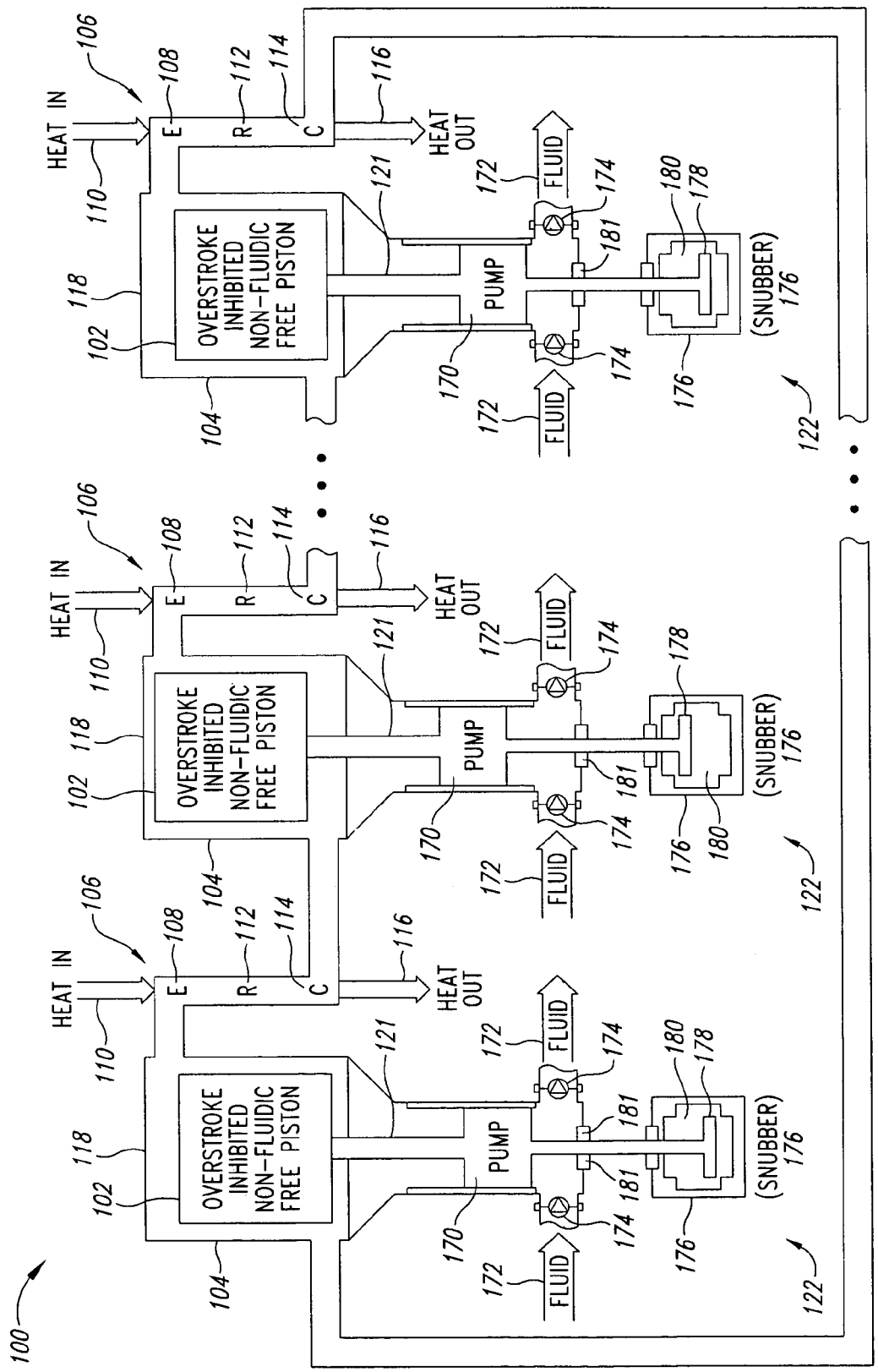
FIG. 13 is a schematic diagram of a pump implementation of the non-fluidic free-piston multicylinder Stirling system depicted in FIG. 2 in which stroke limiting is accomplished through control of a pump by use of an external pneumatic or liquid snubber.

Alternative implementations of the system 100 involve imparting work to fluids. For instance, in FIG. 13 the pistons 102 are coupled to pumps 170 for pumping fluid 172 through check valves 174. Overstroke prevention is accomplished through use of snubbers 176 coupled to the pumps 170. The snubbers 176 can include plungers 178, and chambers 180 having seals 181 that receive the plungers and snub out motion that would otherwise cause overstroke of the pistons 102.

Figure 14:
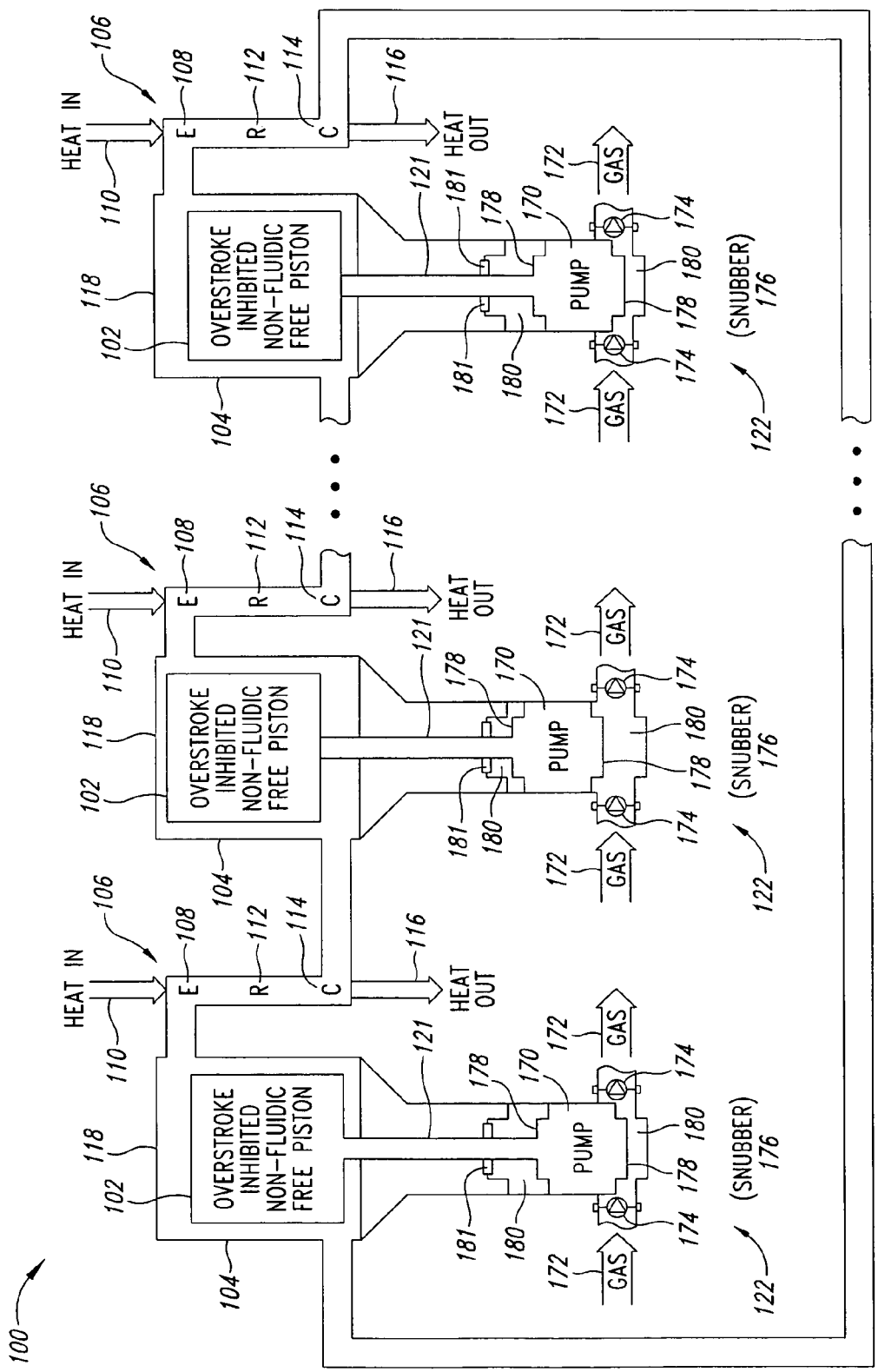
FIG. 14 is a schematic diagram of a compressor implementation of the non-fluidic free-piston multicylinder Stirling system depicted in FIG. 2 in which stroke limiting is accomplished through control of a pump used in a compressor with a pneumatic snubber internal to the compressor.

An implementation of the system 100 directed to gaseous fluids are schematically depicted in FIG. 14 showing the system configured as a gas compressor. The pump 170 for this gas implementation has end portions that serve as the plungers 178 of the snubber 176 that are received by the chambers 180 located to receive the plunger portions of the pump. In this case, the reciprocating motion of the pistons 102 is used to compress the fluid 172 as a gas. For example, the piston rods 121 may move in the cylinders 104 having the check valves 174 installed in such a manner that the gas to be pumped is drawn in at a lower pressure when the pistons 102 move in one direction and the gas is pumped out at a higher pressure when the pistons 102 move in the other direction. In this case of power extraction as pumped gas, an additional element is required to prevent the piston from stroking too far. This may, by way of example, but without limitation, take the form of additional chambers (such as the chambers 180 shown in FIG. 14) that the pistons 102 or the piston rods 121 enter near the end of the desired stroke that causes the pressure resisting piston motion to rise rapidly and provide the force necessary to stop the piston motion in the given direction.

Figure 15:
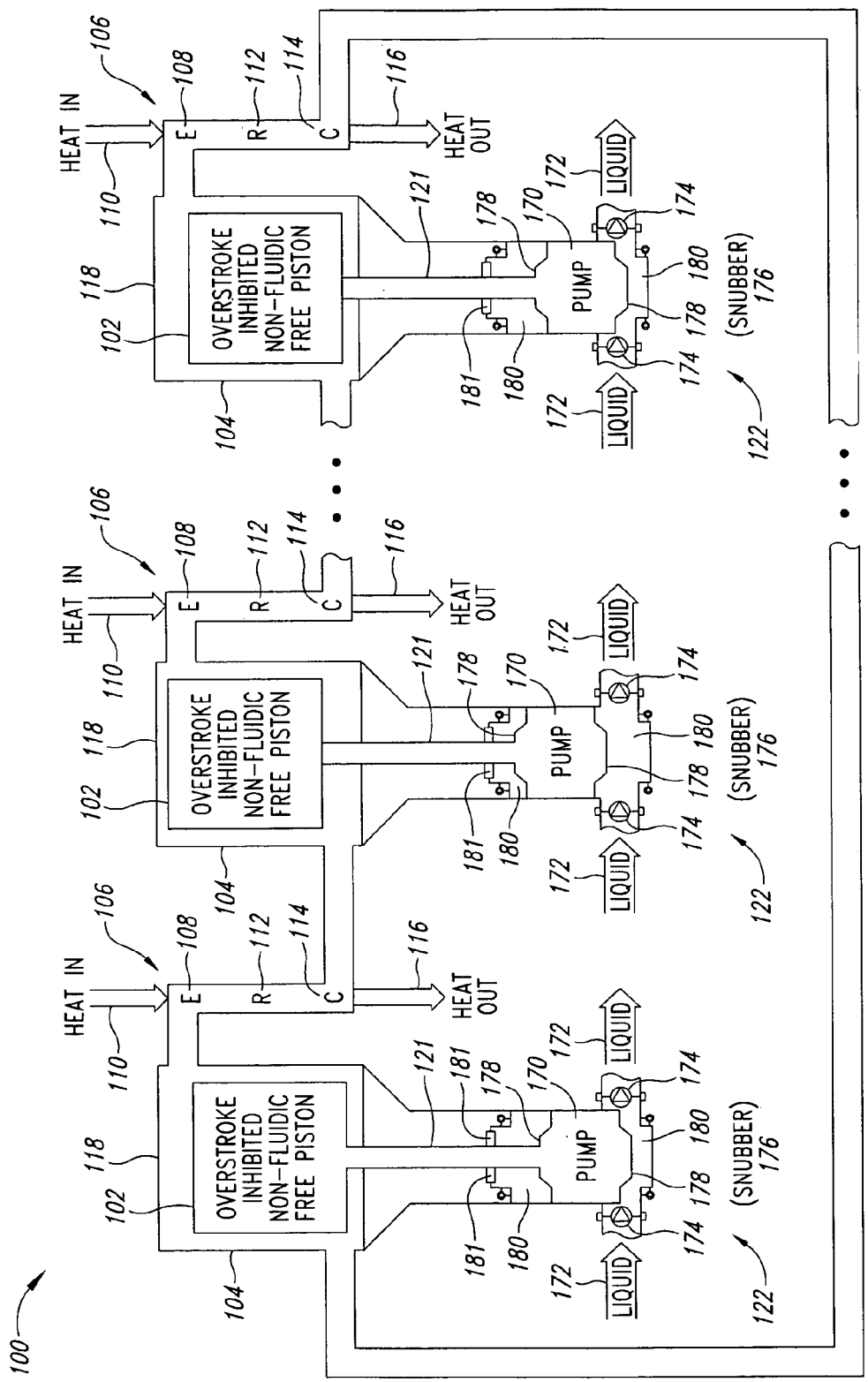
FIG. 15 is a schematic diagram of a second pump implementation of the non-fluidic free-piston multicylinder Stirling system depicted in FIG. 2 in which stroke limiting is accomplished through control of a pump by a liquid snubber internal to the pump.

A liquid implementation of the system 100 illustrated in FIG. 15 enables the system to function as a liquid pump. In this case, the reciprocating motion of the pistons 102 is used to pump a liquid. Operation is analogous to that described for the gas compressor implementation depicted in FIG. 14. At least one exception exists: for the liquid pumping, a suitable seal 181 must be provided to maintain separation of the liquid being pumped from the working gas charge in the system 100. For the gas pumping implementation of the system 100 depicted in FIG. 14. The seal 181 separates different gases would be used if the pumped gas is different from the working gas.

Figure 16:
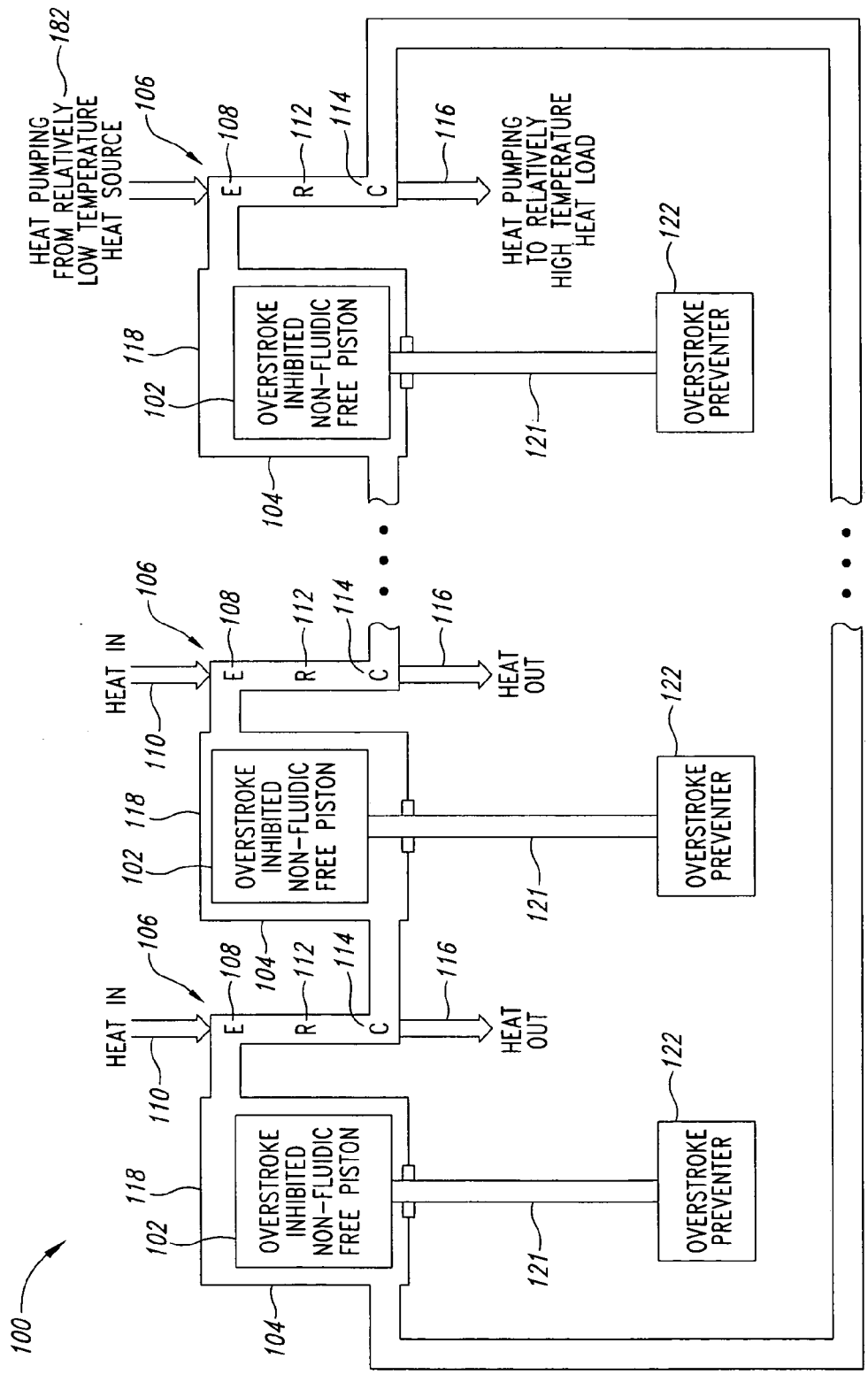
FIG. 16 is a schematic diagram of a heat pump implementation of the non-fluidic free-piston multicylinder Stirling system depicted in FIG. 2 with stroke limiting generally represented to include those stroke limiting methods mentioned herein.

Implementation of the system 100 as a heat pump is illustrated in FIG. 16. The system is driven by the addition of high grade heat (as the "heat in 110" in FIG. 16) to one or more expansion exchangers 108 of the multiple piston system. This heat input causes the pistons to reciprocate with the potential for providing useful work. In this case, one or more expansion spaces are used to absorb heat to provide a refrigerating or heat pumping effect. The heat pump implementation of FIG. 16 also includes the overstroke preventers 122 that may be implemented as the pump 170 for various fluids 172, the controller 128, or the AC controller 158.

Exemplary Demonstration Implementation

Figure 17:
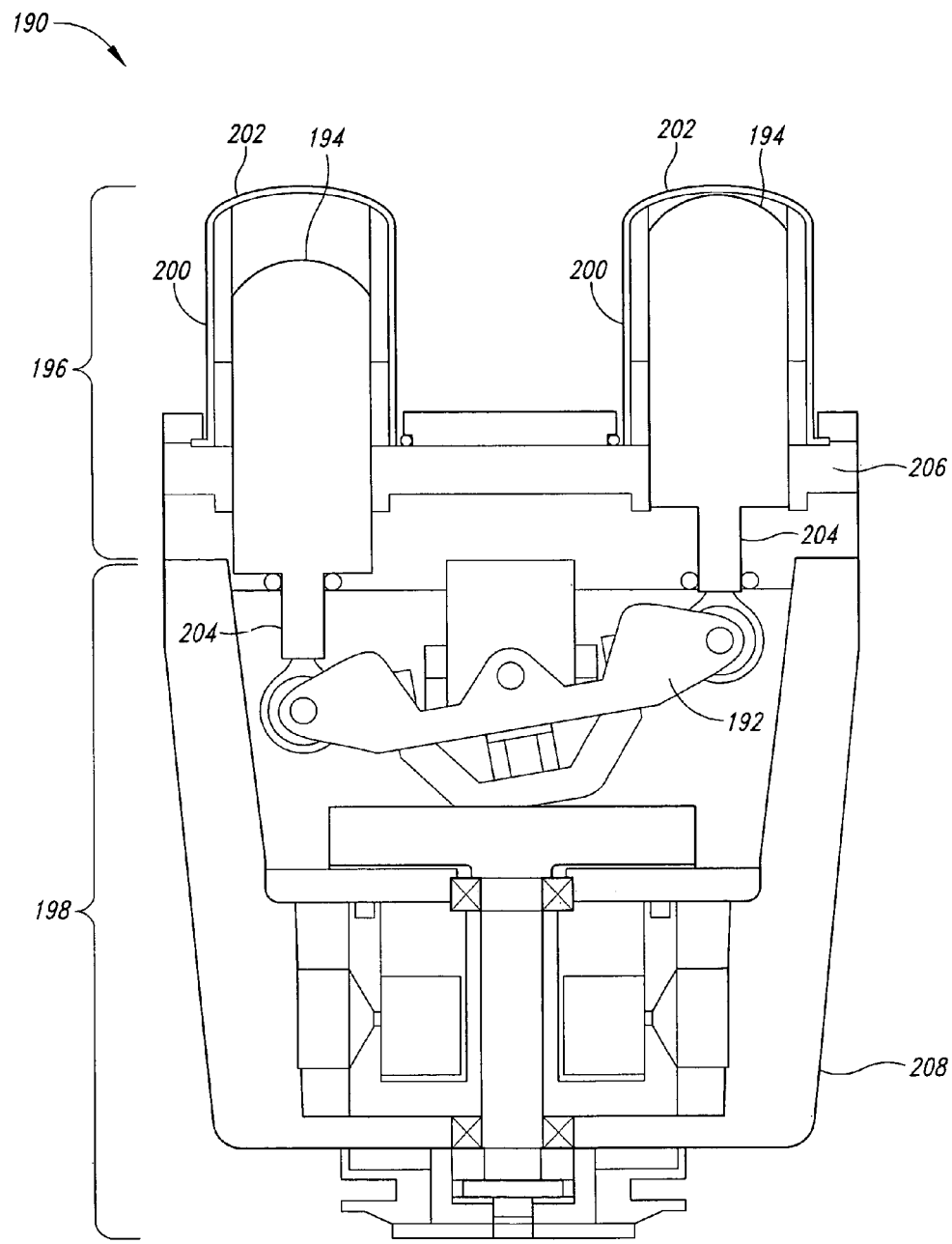
FIG. 17 is a cross-sectional elevational side view of a conventional kinematic multicylinder Stirling system.

The demonstration implementation of the system 100 was constructed by first going against conventional thinking. An operational kinematic multicylinder Stirling machine in FIG. 17 was gutted with its kinematics removed, thereby to the conventionally minded dooming the machine to the scrap heap. Contrary to this conventional expectation, removal of the kinematics was the first step to enhancement. A multicylinder kinematic machine 190, a WhisperGen generator by Whisper Tech, Christchurch, New Zealand, shown in FIG. 17, was used as a source for some components of an implementation of the system 100. The machine 190 is a four-cylinder Siemens or Rinnia arrangement of a kinematic engine that uses a wobble-yoke drive kinematic mechanism 192, which was removed. Using portions of the previously operational multicylinder kinematic machine 190 without the kinematics was an efficient and cost-effective way to prove the free-piston multicylinder concepts with an integrated four-cylinder hot end of the multicylinder kinematic machine 190 assembly.

Figure 18:
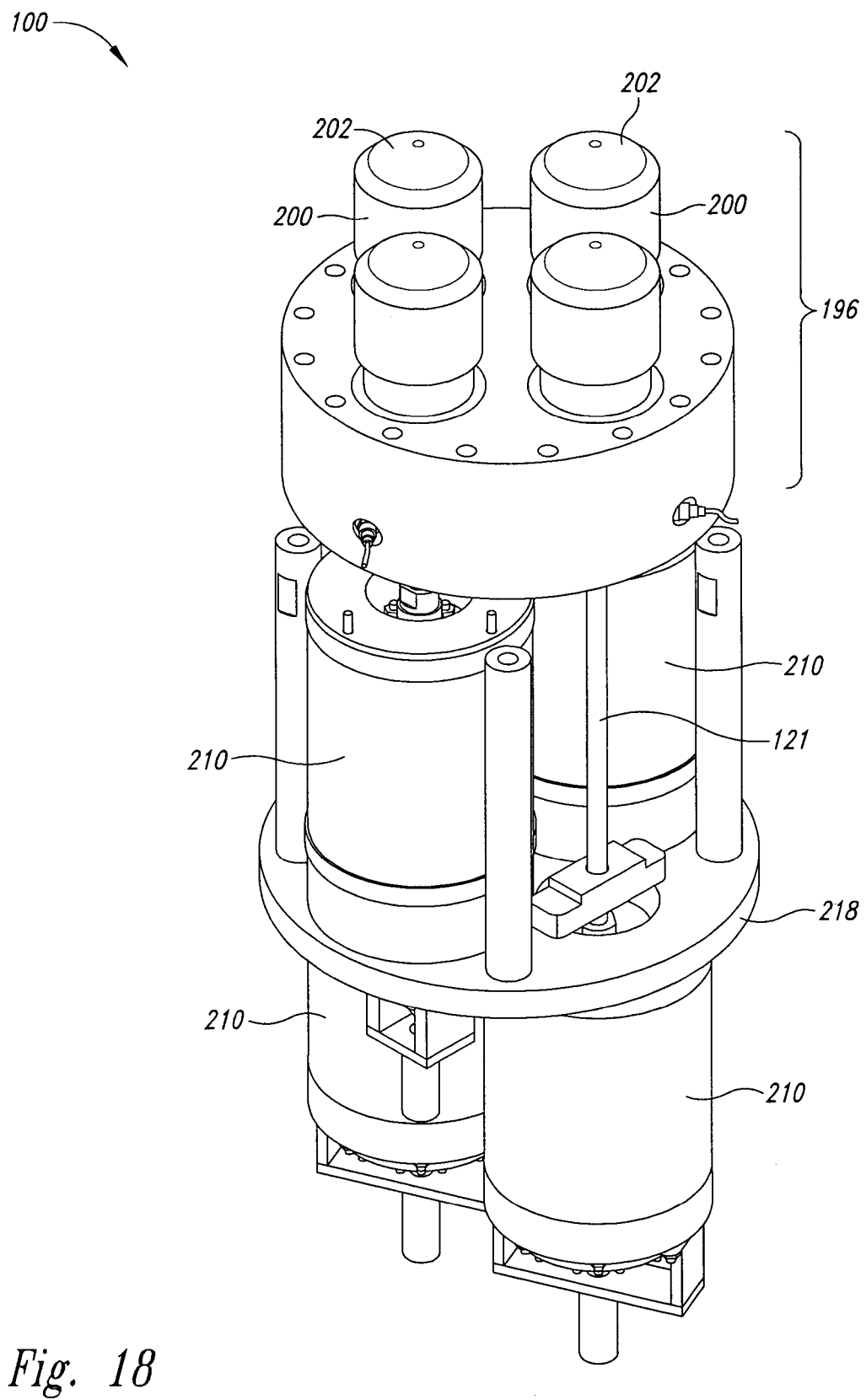
FIG. 18 is an isometric view of an implementation of the non-fluidic free-piston multicylinder Stirling system depicted in FIG. 2.
Figure 19:
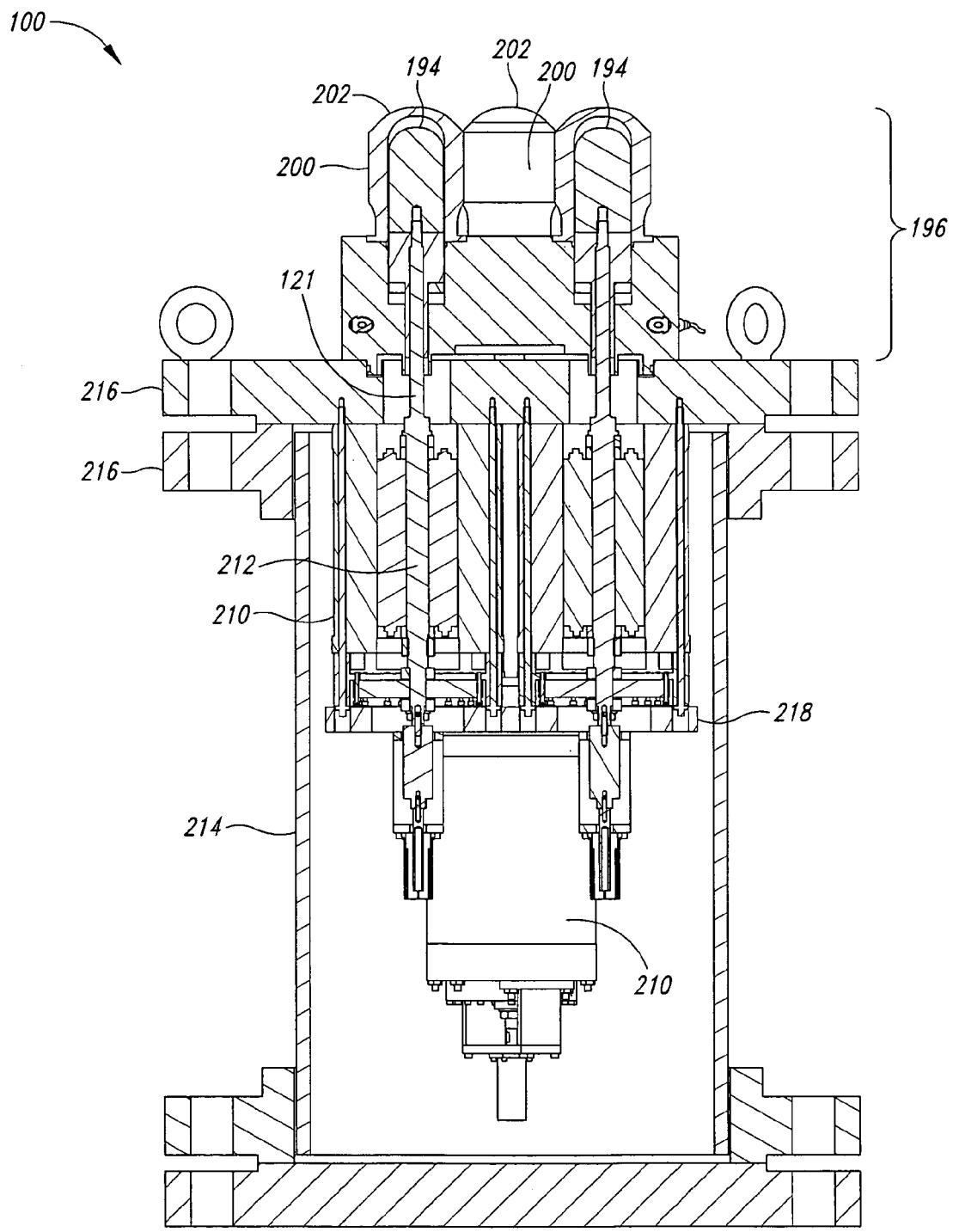
FIG. 19 is a cross-sectional view of the implementation of the non-fluidic free-piston multicylinder Stirling system depicted in FIG. 18.
Figure 20:
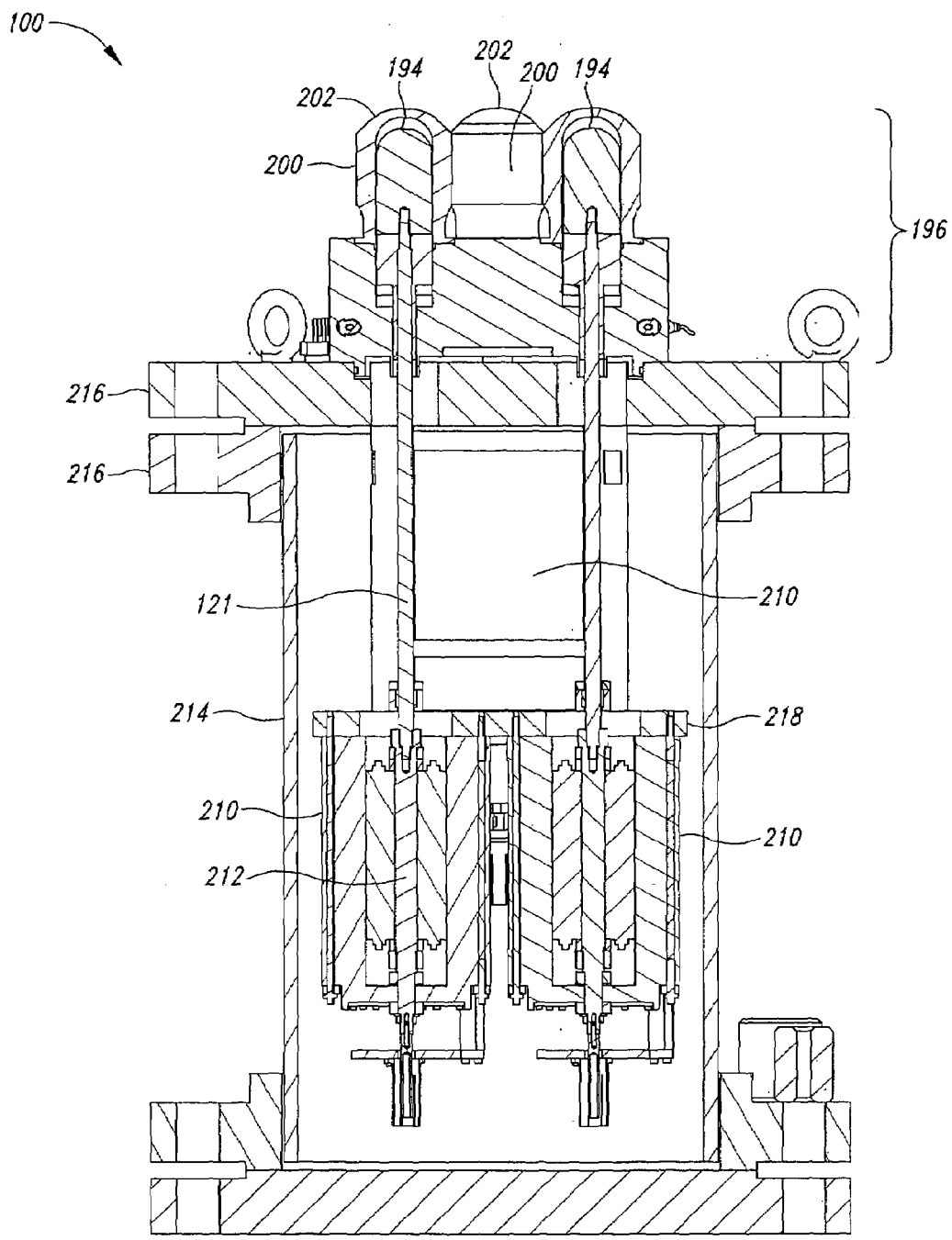
FIG. 20 is a second cross-sectional view of the implementation of the non-fluidic free-piston multicylinder Stirling system depicted in FIG. 18.
Figure 21:
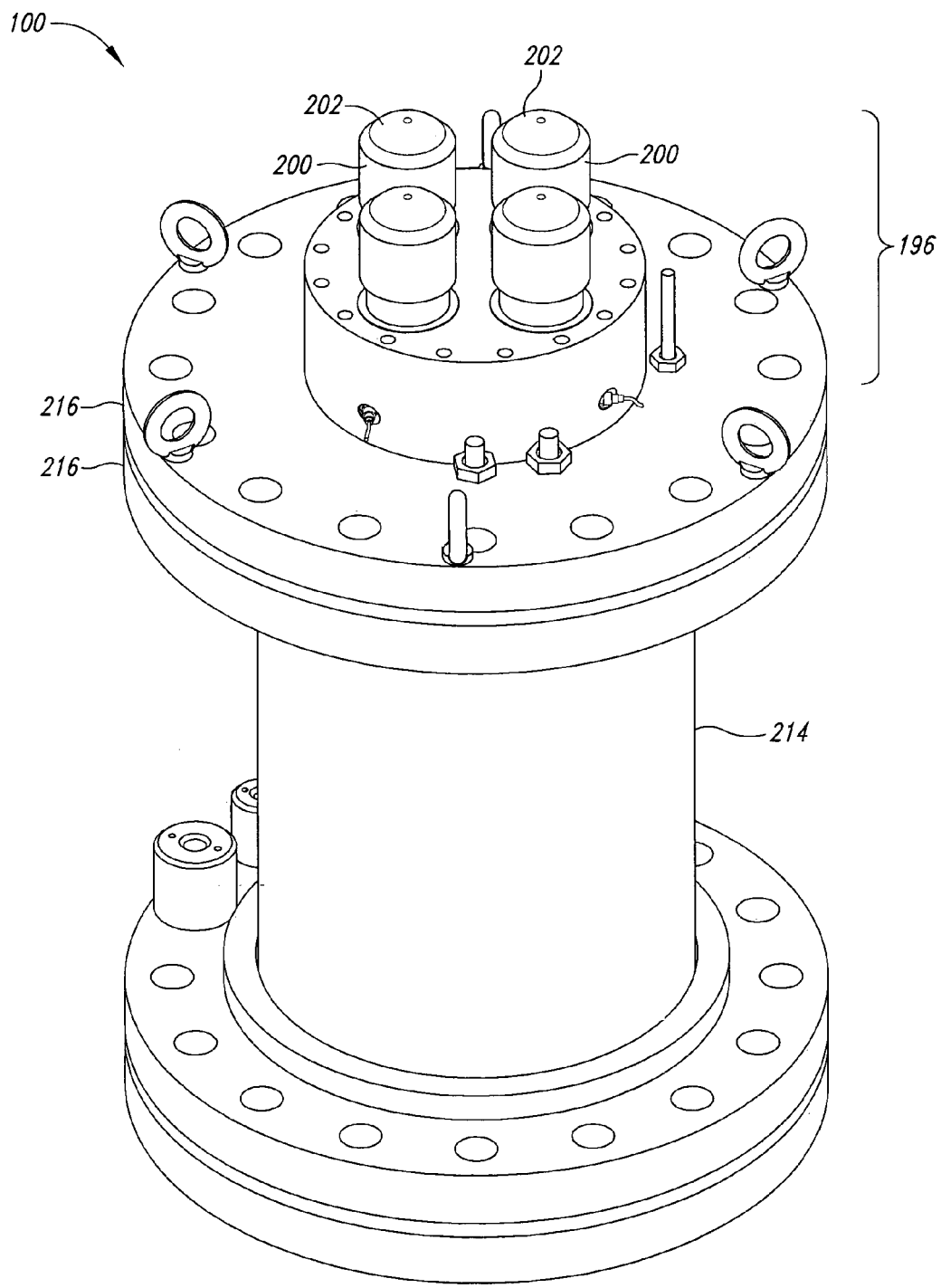
FIG. 21 is an isometric view of the implementation of the non-fluidic free-piston multicylinder Stirling system depicted in FIG. 18 shown with an associated pressure vessel.

The multicylinder kinematic machine 190 had the integrated hot end assembly as a first section 196 that was used as part of the exemplary demonstration implementation of the system 100. The multicylinder kinematic machine 190 also had a second section 198 that was not used. The first section 196 has components that include a diesel burner system (not shown); four integrated heat exchanger circuits 200 including heater heads 202 with internal heaters, regenerators, and coolers; cycle-to-cycle interconnecting flow passages integrated into housing 206 that connect the gas cooler of one piston to the compression space of the next piston; the four pistons 194 with ring seals integrated into both the piston bodies and integral hollow piston rods 204; and four hot caps that thread onto connecting rods that pass through the hollow pistons 194, and the integral piston rods. To convert the kinematic machine 190 into the demonstration implementation of the system 100, the second section 198 was removed and replaced with components including four linear alternators 210 shown in FIGS. 18, 19, and 20. The second section 198 includes the connecting rods, the kinematic mechanisms including the wobble yoke 192 and outer housing 208 below the rods. New customized mover connector rods 212 (see FIGS. 19 and 20) for the linear alternators 210 were designed to integrate directly with the pistons 194 and hot caps, using features that reproduced dimensions in original connecting rod to piston interfaces. A boilerplate pressure vessel 214, as shown in FIGS. 19–21, was constructed from standard commercial piping elements to enclose the four linear alternators 210.

For integration of the first section 196 with the linear alternators 210, a customized flange 216 interfaces with the commercial piston housing 202 on one side and with the four linear alternators 210 on the other side. The linear alternators 210 used were obtained from four surplus BeCool™ cryocooler drive motors by Infinia Corporation (formerly Stirling Technology Company), which are similar to a linear alternator of a 350-W STC RG-350 converter. The linear alternators 210 were too large to interface directly with the first section 196, so the linear alternators are disposed in pairs at different distances from the pistons 194 as shown in FIGS. 18–20. The more distant pair of the linear alternators 210 is attached to an intermediate plate 218 for positioning independent from the close pair of alternators.

The system is started by heating the hot end above 500 C and motoring two of the linear alternators 210 180° out of phase until the P-V power generated is sufficient to produce self-sustained operation. At that point the motoring leads are disconnected and the system continues to operate until the head temperature drops below the level needed to overcome inherent friction losses. When the system is cold, but at the normal operating pressure of 400 psi, two of the alternators can be motored to produce near full-stroke operation using 200 watts of drive power, and the other two alternators are virtually motionless. As the system is heated and drive voltage remains constant, the motoring drive power gradually drops and the other two pistons increase in amplitude until the drive power reaches zero and the system continues in operation with only thermal input.

Other Implementations

Other implementations of the system 100 include configurations that include one or more modules of free-piston multicylinder Stirling machines. For instance, each of the free-piston multicylinder Stirling machine modules could be configured as Stirling engines in a readily identifiable capacity such as in a 25 kW output capacity. Then, for instance, a 1000 kW output capacity Stirling free-piston generation station could be constructed with the system 100 by integrating 40 of the 25 kW modules together. Larger output capacity modules could also be constructed with the system 100 so that even larger output capacity generation stations could be utilized.

Figure 22:
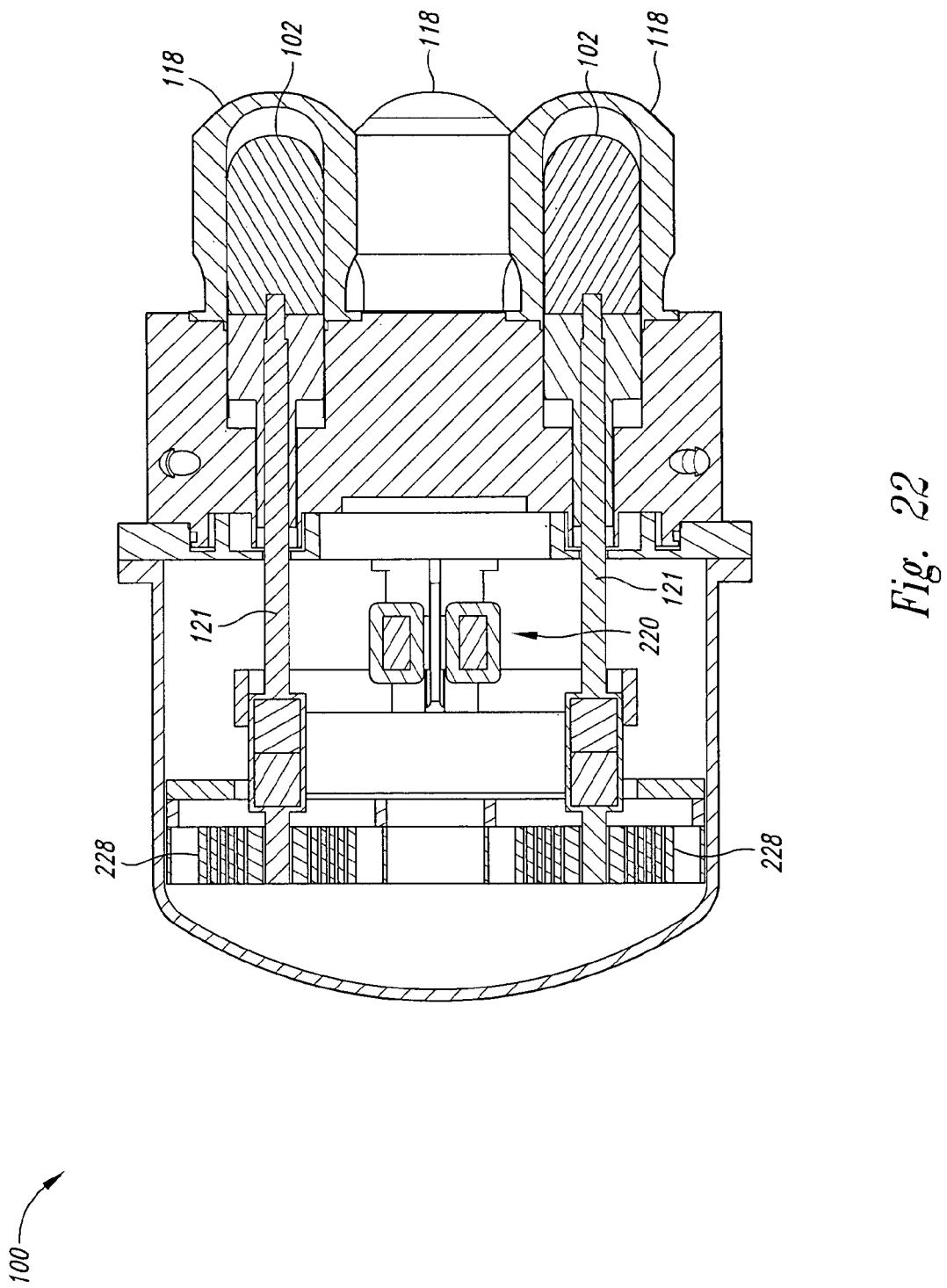
FIG. 22 is cross-sectional view of an implementation of the non-fluidic free-piston multicylinder Stirling system with overstroke prevention involving duplex linear alternators.

For example, a 25 kW multicylinder free-piston Stirling engine base module could have four of the cylinders 104 and four of the linear alternators 124. Alternatively, as shown in FIG. 22, two duplex linear alternators 220 further discussed below could be used instead of the four linear alternators 124. For a completely balanced system, the Stirling module implementation shown could be combined with a second Stirling module implementation to produce a 50 kW system. An aspect is that the balancing can be achieved either with the Stirling modules in an end-to-end configuration typically used with free-piston single cylinder Stirling engines or with the Stirling modules mounted in a side-by-side configuration.

The side-by-side configuration provides a certain amount of implementation flexibility. For instance, having the Stirling modules in a side-by-side configuration allows for placement of all of the heater heads together on one side of a heat source, which may allow for advantages in some applications. Alternatively, dynamic balancers could be incorporated into a single 25 kW module implementation of the system 100. Another alternative for the base Stirling module could use only three of the cylinders 104 and three linear alternators for the linear alternators 124.

Figure 23:
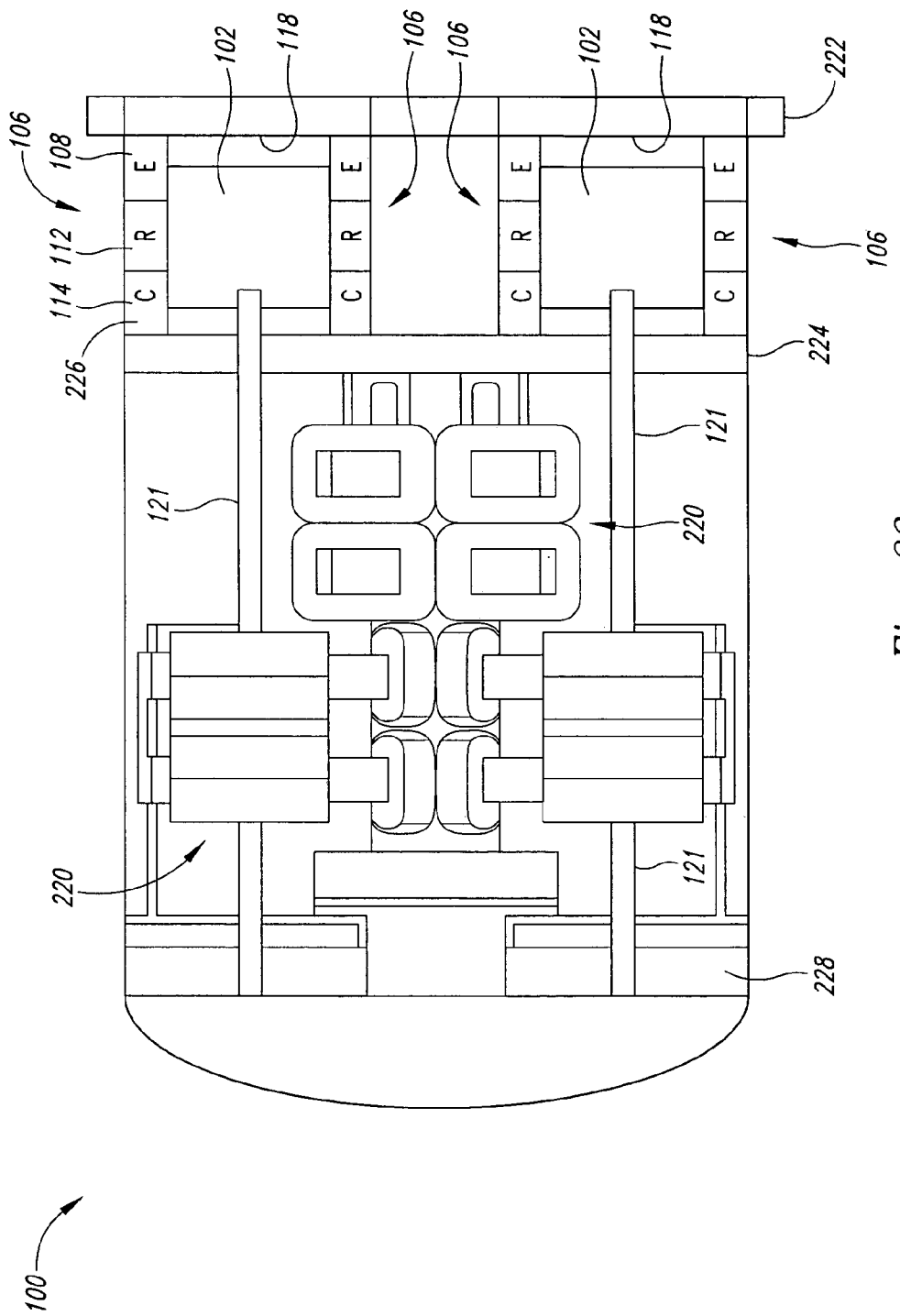
FIG. 23 is a schematic diagram of an alternative implementation of the non-fluidic free-piston multicylinder Stirling system involving duplex linear alternators and a platelet heater head.

Because of the asymmetric nature of the duplex linear alternators 220, the two duplex linear alternators are positioned to avoid interference with one another, further shown in FIG. 23. The duplex alternators 220 are each integrated with an opposing pair of the pistons 102. Other enhancements can include platelet implementations of hot ends, such as a platelet heater head 222, and cold ends, such as a platelet cooler 224. The platelet heater head 222 is well-suited for a wide range of heat sources. Furthermore, the platelet heater head 222 typically has high heat transfer rates, low weight, and scalability, such as tens of kWs per cylinder. Other implementations use other types of heater heads without platelet technology.

The Stirling module implementation of the system 100 shown in FIG. 23 further has gas bearings 226 at the end of the pistons 102 near the platelet cooler 224 and flexure bearings 228 at the ends of the piston rods 121 opposite the ends of the piston rods coupled to the pistons. Other various linear alternators could be used in alternative implementations of Stirling modules including moving magnet linear alternators, as well as moving iron, moving coil, or hybrids of two or more styles.

Other Considerations:

Implementations of the system 100 include enhancements to improve performance, reliability, or other aspects. For instance, a number of implementations use a clearance seal, gas bearing, or some other effective seal surrounding each of the pistons such that leakage flow between the cold side and hot side of each of the pistons is maintained at a sufficiently low level that leakage does not excessively degrade output from the engine.

The pistons 102 move reciprocally along a piston stroke such that each of the pistons has a mid-position in its respective stroke at which on average the piston is located. Another enhancement used by implementations involves one or more structures that prevent the mid-position of each of the pistons 102 from drifting excessively toward either end of their piston strokes to prevent collisions of the pistons with other portions of the system 100. The structures may be accomplished mechanically such as with an axial spring to give a tendency for the pistons 102 to return substantially toward a pre-defined location for the mid-position. Other structures could be used instead of the axial spring such as centering ports that pneumatically limit drift of the pistons 102.

Various approaches can be used for sealing and supporting pistons and rods of the present implementations. Some implementations can use piston and rod wear couple seals, for example in the form of split ring seals with spring loading or compatible low-wear, dry-lubricated or non-lubricated piston and piston housing materials. Further approaches are used in some of the implementations as described below to include various combinations of the approaches.

Figure 24:
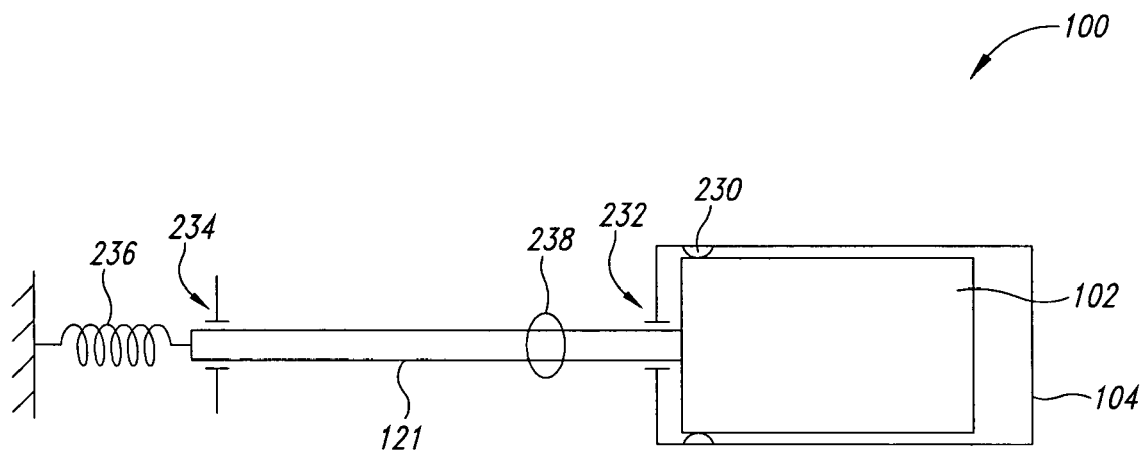
FIG. 24 is a schematic diagram depicting various enhancements that can be used to improve performance of the non-fluidic free-piston multicylinder Stirling system.

FIG. 24 depicts various enhancements that can be used to improve performance of the system 100. For instance, a piston cold end support bearing and seal 230 can be used to limit gas flow past each of the pistons 102. Here the primary gas flow is through the heat exchanger circuits 106 (shown in FIG. 2). A rod seal 232 can be used to limit leakage between cycle gas pressure variations inside the cylinder 104 adjacent the rod seal and average buffer pressure outside of the cylinder. A support bearing 234 can be used for that portion of the piston rod 121 distal from the piston 102. A mover assembly for the linear alternator 124 (shown in FIG. 4) could also be driven by the piston rod 121. An additional spring 236 in addition to the inherent working cycle gas spring can be included to help cause the piston 102 to reciprocate at a desired operating frequency. The multi-cylinder configuration tends to inherently simplify alignment requirements of the piston rod 121 between the rod bearing 234 and the piston bearing 230. Conventional approaches include using inherent flexibility of the piston rod 121 to assist with alignment.

Figure 25:
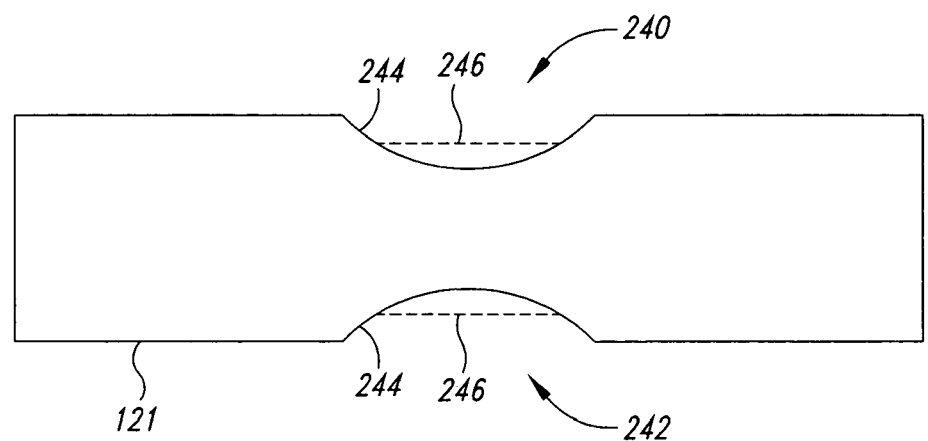
FIG. 25 is a schematic diagram of a portion of an implementation of a piston rod used in some of the implementations of the non-fluidic free-piston multicylinder Stirling system.

Non-conventional approaches that can be used with the present implementation include one or more universal joints 238 in the piston rod 121 near but outside of the cylinder 104. Many kinds of universal joints can be used including a universal joint that has two or more pairs of flats on the piston rod 121, which is generally easy to construct. As illustrated in FIG. 25, a pair of flats is two short sections where the piston rod 121 is relieved by circular cut away sections on a first side 240 and a second side 242 opposite the first side for a short distance so that the piston rod 121 can flex like a flat bar in that portion of the piston rod having the first side and the second side. Typically curved portions 244 are located at each end of the cutaway portions with a flat bottom portion 246 between the curved portions as represented by the dotted lines. Alternatively, two pairs of flats could be 90 degrees to one another and axially displaced so the piston rod 121 is not cut down too far. Another alternative would be to have three pairs of flats at 60 degrees. Other alternatives could be used.

Various combinations could be found in the implementations such as including the various combinations of different implementations of the piston bearing and seal 230, the rod seal 232, the rod bearing 234, and the spring 236. For instance, the piston bearing and seal 230 could be one of a gas bearing and seal, a wear couple bearing and seal, a flexure bearing and clearance seal, and a flexure bearing and wear couple seal. The other elements identified can be addressed by any combination of the approaches. Perhaps the most preferred embodiment is to use a gas bearing for the piston bearing and seal function, a clearance seal for the rod seal, and a flexure bearing for the rod bearing and spring functions. The rod seal 232 could be one of a clearance seal, or rubbing or wear couple seal. The rod bearing 234 could be one of a flexure bearing, gas bearing, or wear couple bearing. The spring 236 could be one of a flexure spring, a mechanical spring, or a gas spring.

Implementations of the system 100 can use a hydrodynamic spin bearing on the pistons 102 thereby reducing cyclic leakage associated with such. In those implementations where the linear alternators 124 are constructed non-axisymmetrically, a hydrostatic gas bearing is appropriate. In this type of gas bearing, high pressure gas is applied to the bearing region and subsequently leaks into spaces on both sides of the clearance seal at levels experienced by conventional Stirling machines.

Another observation is that the pistons 102 in the demonstration implementation of the system 100 serve as both seals and wear couple bearings for supporting engine side alignment requirements. As such, only one rear flexure stack is used in the demonstration implementation, which is in marked contrast to the typical conventional approach of using two remote sets of flexure bearings coupled with clearance seals.

The demonstration implementation experienced a great deal of friction loss produced by split ring sliding seals as part of the sealing system for the pistons 102. This seal approach was left over from the kinematic engine configuration of the Whisper Tech generator that was partially used to supply parts of the demonstration implementation. As part of the left over portion of the kinematic design of the Whisper Tech generator, the sealing system addresses an important requirement to keep oil vapors out of Stirling engine portions of the Whisper Tech. As a result, each of the four pistons 102 for the demonstration implementation uses four split ring seals on the main piston body and five more on the rod portion of the piston to keep kinematic mechanism lubricants separate from the Stirling cycle working fluid. Since there is no lubrication requirement generally in the system 100, this split ring friction producing approach is not necessary. These seals were retained anyway, because it was not practical to incorporate a second set of flexure bearings and introduce a clearance seal for the demonstration implementation based upon the machine 190 depicted in FIGS. 18–21. In general, for the implementations of the system 100, the potential exists for making various enhancements to reduce wear and frictional forces. For instance, the pistons 102 and piston rod 121 could be integrated with a Xylan-based wear couple bearing and seal combination.

Associated Observations

Another general observation regarding the conceptual operation of the system 100 is that adjacent pistons 102 of a multicylinder free-piston engine that are 180 degrees out of phase have high differences in pressure that oppose piston motion with no consequential pressure—volume loop so that any potential motion is damped out. Furthermore, any adjacent pistons that are in phase experience nearly the same pressure resulting in no significant force differences and consequently potential motion is damped out so that all pistons move to an end of a piston stroke and stop. On the other hand, when the pistons 102 move with a 90 degree phase lag there is a normal Rinnia configuration Pressure—Volume work loop on each the pistons. The frequency of piston reciprocation can be set by adjusting moving mass of the piston 102, the piston rod 121, etc., or by adjusting net spring rates involved. With this arrangement of the system 100 there are no complex frequency tuning requirements that are inherent with conventional single cylinder free-piston engines.

With the use of a multi-cylinder, flexure-supported, free-piston machine, each reciprocator can be used to drive a linear alternator assembly. Springs (mechanical, pneumatic, or electromagnetic) are then used to store cyclic energy instead of the typical flywheel on a kinematic device. The mechanically-independent reciprocators (free-pistons) of the feasibility demonstration unit described above remained in the proper phasing relative to one another during testing, due to the thermodynamics of the machine, but additional electromagnetic methods, such as phase-lock loops, for control of the reciprocators could be employed to reinforce proper operation if needed. This type of electromagnetic control would, however, require single-mover linear alternators rather the alternative duplex linear alternators and should not be necessary.

The duplex linear alternator concept (described in more detail below) is electromagnetically comparable to many existing linear alternators, but the physical arrangement involves using a single stator that provides for simultaneous extraction of power from two pistons operating 180° out of phase. The exemplary implementation incorporates two movers, each incorporating two axially-stacked flat magnets with opposite polarity. With one of the movers in a down-stroke position and the other of the movers in an extreme up position, the maximum flux is through the stator iron lamination sections and links the coils in a clockwise manner. At the other stroke extreme, both magnet polarities in the air gap regions are reversed and the flux linkage through the coils is maximal in a counterclockwise direction.

The resultant cyclic flux linkage reversal in the coils generates AC power output. This approach minimizes iron by providing only the minimal iron cross-section and flux path length needed to carry the requisite flux. Copper is also minimized because it is closely wound around the minimal iron cross-section area. The coils on each stator half can be tilted at an angle to accommodate piston rods for a second duplex alternator that couples the other two pistons in a four-cylinder square pattern. Unlike other moving-magnet linear alternators that use cantilevered cylindrical rings of magnets supported at only one end, this magnet configuration can be structurally caged around the outer edges with rigid non-magnetic material and supported by piston rods with bearings at each end of the magnet structure. This approach can be made to be very rugged and resistant to external forces such as space vehicle launch load vibrations experienced by a space power generator.

Tuning Operating Frequency

Operating frequency of the system 100 is determined by a combination of factors including amount of moving mass, amount of damping forces on the moving mass, and extent of any spring forces upon the moving mass. The amount of moving mass is dependent upon design and construction of members of the system 100 that are coupled to piston movement such as the pistons 102, the piston rods 121, and moving components of devices that input work into or extract work from the system (such as movers of linear alternators).

The damping forces are associated with a combination of factors such as friction, windage losses through the heat exchangers, and imposed loads in cases where work is being extracted from the system 100. Spring forces are determined by a combination of effects from Stirling cycle gas pressure variations acting on the piston, together with any mechanical, electromagnetic, and/or pneumatic springs that are involved. Largely because of the double-acting nature of multi-cylinder engines, the spring force based on the Stirling gas cycle involved is a more substantial contributor than it is for a comparable single-cylinder engine.

Because of this spring force based on the Stirling gas cycle, the operating frequency of the system 100 at which the pistons 102 reciprocate is relatively sensitive to the charge pressure of the Stirling cycle working fluid during operation. Although this sensitivity may pose problems if ignored, the sensitivity provides a new opportunity from which to benefit by allowing for directly managed change in piston reciprocation frequency during operation of the system. The ability to tune piston reciprocation frequency of the system 100 during operation to a desired frequency allows for more advanced operation. For instance, there may be situations in which the system 100 may be configured as a generator and tied into a grid distribution system. The system 100 could monitor fluctuations in operational electrical frequency of the grid distribution and adjust operational piston gas spring rate so that the system continues to generate electrical power with an optimal frequency that matches the frequency of the grid system. The system 100 could also monitor piston reciprocation frequency of the system and adjust the piston reciprocation frequency to keep it within desired tolerances should environmental or other influences, such as changes in ambient temperature, be present that would otherwise cause drift in piston reciprocation frequency.

Figure 26:
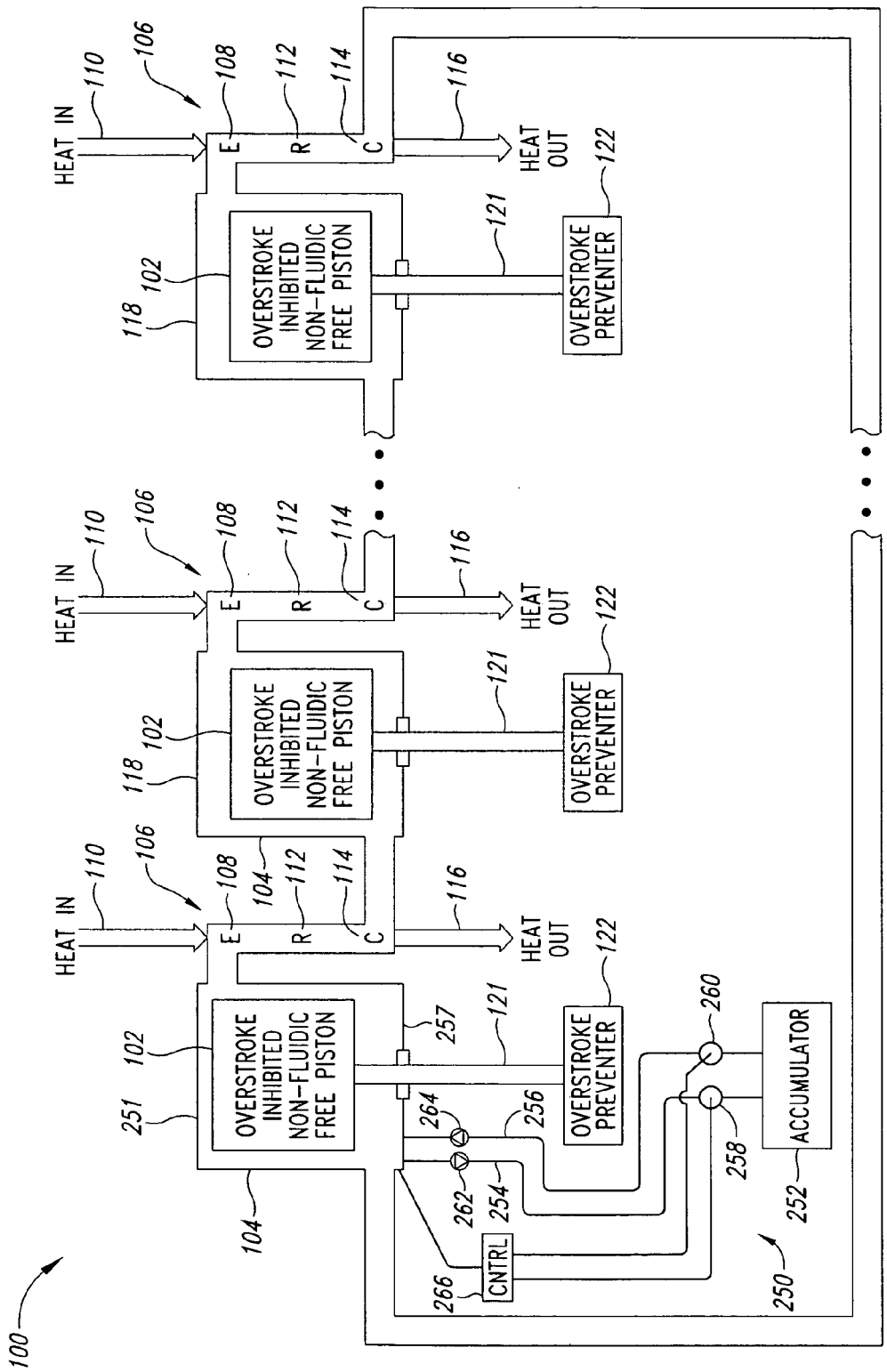
FIG. 26 is a schematic diagram of an implementation of the non-fluidic free-piston multicylinder Stirling system with additional components for frequency tuning.

The system 100 is shown in FIG. 26 with a tuning system 256 having an accumulator 252 to move working fluid in and out of at least a first one of the cylinders 104 ("first cylinder 251") in order to control average cylinder pressure to achieve the desired piston reciprocation frequency. As depicted, the accumulator 252 is fluidly coupled by a first fluid line 254 and a second fluid line 256 to a side of the first cylinder 251 near the compression space cold heat exchanger 114 ("compression side 257"). The tuning system 250 has a first solenoid valve 258 in the first fluid line 254 and a second solenoid valve 260 in the second fluid line 256. The tuning system 250 further has a first check valve 262 in the first fluid line 254 and a second check valve 264 in the second fluid line 256.

As depicted in FIG. 26, coupling of the accumulator 252 occurs with the first cylinder 251 through the first fluid line 254 or the second fluid line 256 only when either the first solenoid valve 258 or the second solenoid valve 260 is in the open position. In other implementations, coupling of the accumulator 252 (disposed as a single accumulator or multiple accumulators as illustrated in FIG. 26) can occur with more than just the first cylinder 251 in parallel with a parallel set of fluid lines, solenoid valves, and check valves connected to each of the coupled ones of the cylinders 104. The accumulator 252 may be internal or external to the rest of the system 100.

The accumulator 252 is charged with the same type of working fluid as the cylinders 104 and the rest of the system 100 to a pressure near the desired nominal operating pressure of the system ("accumulator pressure"). The pressure in the compression side 257 of the first cylinder 251 will vary between a pressure value higher than the accumulator pressure and a pressure value lower than the accumulator pressure as the piston 102 reciprocates within the first cylinder. Since the compression side 257 of the first cylinder 251 is fluidly coupled to the accumulator 252, working fluid can be caused to move from the first cylinder to the accumulator when the pressure in the compression side of the first cylinder is higher than the accumulator pressure. Working fluid can also be caused to move from the accumulator 252 to the first cylinder 251 when pressure of the working fluid in the compression side 257 of the first cylinder 251 is lower than the accumulator pressure.

During operation, if it is desired to increase working fluid pressure in the system 100, and consequently increase piston reciprocation frequency, the second solenoid valve 260 is momentarily opened one or more times. This enables working fluid to flow from the accumulator 252 through the second fluid line 256, the second solenoid valve 260 and the second check valve 264 into the first cylinder 251 at times when the pressure in the compression side 257 of the first cylinder is lower than the nominal operating pressure of the system 100. This momentary opening of the second solenoid valve 260 results in a decrease in pressure in the accumulator 252 and an increase in average pressure of the working fluid in the cylinders 104 and an increase the piston reciprocation frequency of the system 100 with such increases being dependent upon the cumulative amount of time that the second solenoid valve 260 stays open.

This gas and pressure transfer process can be continued up to a limiting condition where the accumulator pressure equals the minimum pressure that can exist in the cylinders 104 during a portion of the Stirling cycle pressure variation while the system 100 is operating. In a similar fashion, the first solenoid valve 258 may be opened to move gas from the first cylinder 251 to the accumulator 252 with the limiting pressure change being when the accumulator pressure reaches the maximum pressure that can exist in the cylinders 104 during a portion of the Stirling cycle while the system 100 is operating. A controller 266 can be used to make adjustments to maintain desired pressure conditions and consequentially maintain desired piston reciprocation frequency.

Vibration Reduction

According to Newton's third law of motion, for every action, there is an equal and opposite reaction. In terms of the system 100, when the overstroke preventer 122 is receiving work from the Stirling thermodynamic cycle, such as when the overstroke preventer is operating as the linear alternator 124, acceleration and deceleration forces due to local pressure conditions within the cylinder 104 on the hot end 118 having force H against the piston 102 and the cold end 120 having force C against the piston cause the piston to move. A third force applied to the piston 102 applied through the piston rod 121 comes from the overstroke preventer 122 and, depending upon the circumstances, can be with or against the momentary direction of travel by the piston.

Figure 27:
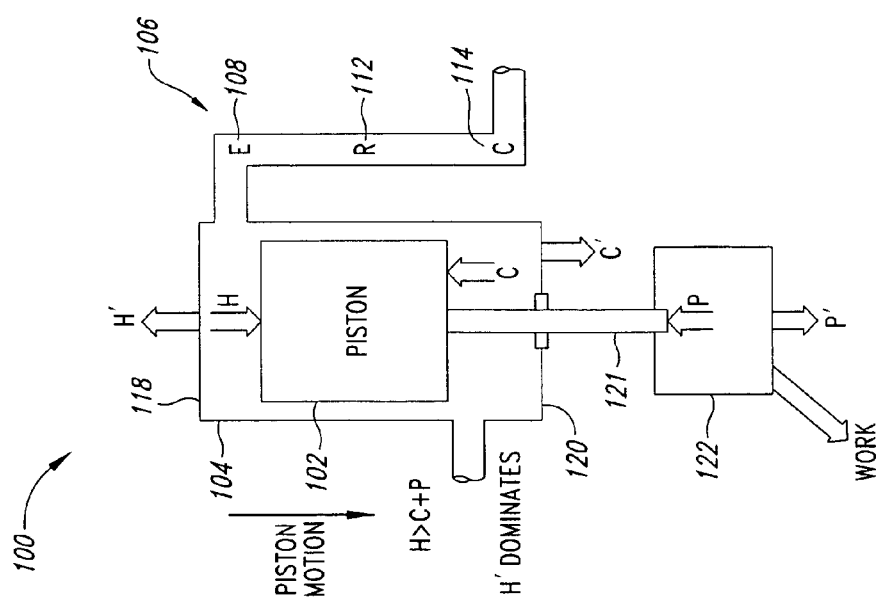
FIG. 27 is a schematic diagram of one of the cylinders and associated components of the non-fluidic free-piston multicylinder Stirling system for work extraction showing forces involved during an expansion portion of a piston stroke as related to vibration reduction.

For instance and with reference to FIG. 27, when the piston 102 is at a stroke position nearest the hot end 118 of the cylinder 104, at a certain point of the Stirling cycle the force H will be greater against the piston 102 than the force C. As configured to receive work from the Stirling cycle, the overstroke preventer 122 imparts a force P against the piston rod 121. As long as the overstroke preventer 122 is not configured to receive work at a greater rate than the Stirling cycle can furnish, the force P will be small enough so that the force H is greater than the sum of the force C and the force P. This momentary difference between the force H and the sum of the force P and the force C causes the piston 102 to accelerate in the direction of the cold end 120. Since piston travel is opposite the direction of the force P, work is extracted by the overstroke preventer 122 from the Stirling cycle as shown in FIG. 27. In this case, work is extracted due to excess of the force H compared with the sum of forces C and P.

Following Newton's third law for this case, the forces H, C, and P will have reaction forces, H', C', and P', respectively, in directions opposite to the forces H, C, and P. Consequently, the reaction forces H', C' and P' will be felt not by the piston 102, piston rod 121 and possibly other moving elements involved, but rather will be felt by stationery portions of the system 100 such as by the cylinder 104, other elements of the system involved with the Stirling cycle such as the heat exchanger circuit 106 and possibly other elements of the system (not shown) such as structural support elements.

Figure 28:
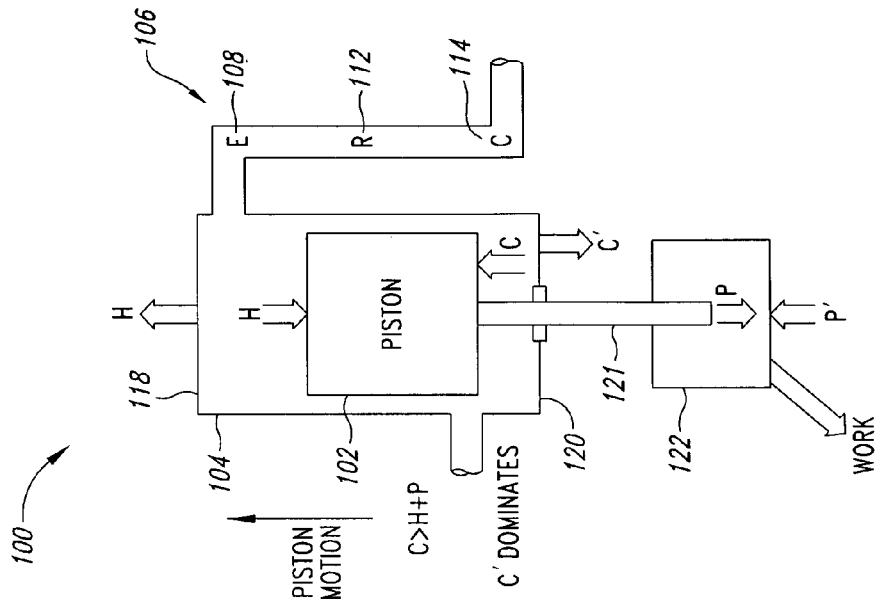
FIG. 28 is a schematic diagram of one of the cylinders and associated components of the non-fluidic free-piston multicylinder Stirling system for work extraction showing forces involved during an compression portion of a piston stroke as related to vibration reduction.

A case of the piston 102 traveling toward the hot end 118 with Work being extracted from the Stirling cycle by the overstroke preventer 122 is shown in FIG. 28 wherein the reaction force C' dominates. Consequently, when the overstroke preventer 122 extracts work from the Stirling cycle, the dominant reaction force alternates between force H' and force C' with these two forces being in opposite directions. Since the stationary portions of the system 100 are not configured to move in any appreciable sense, the alternating dominance of reaction forces H' and C' will cause vibration to occur in the stationary portions of the system due in part to the base frequency of the alternating dominant reaction forces and also due in part to higher order vibrational frequencies caused by momentary forces being imparted to stationary portions.

Figure 29:
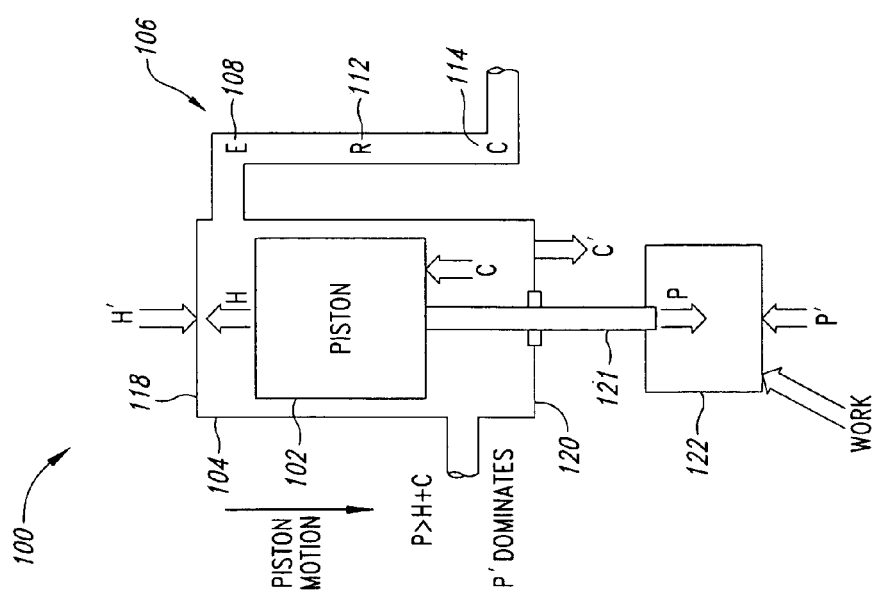
FIG. 29 is a schematic diagram of one of the cylinders and associated components of the non-fluidic free-piston multicylinder Stirling system for work input showing forces involved during an expansion portion of a piston stroke as related to vibration reduction.
Figure 30:
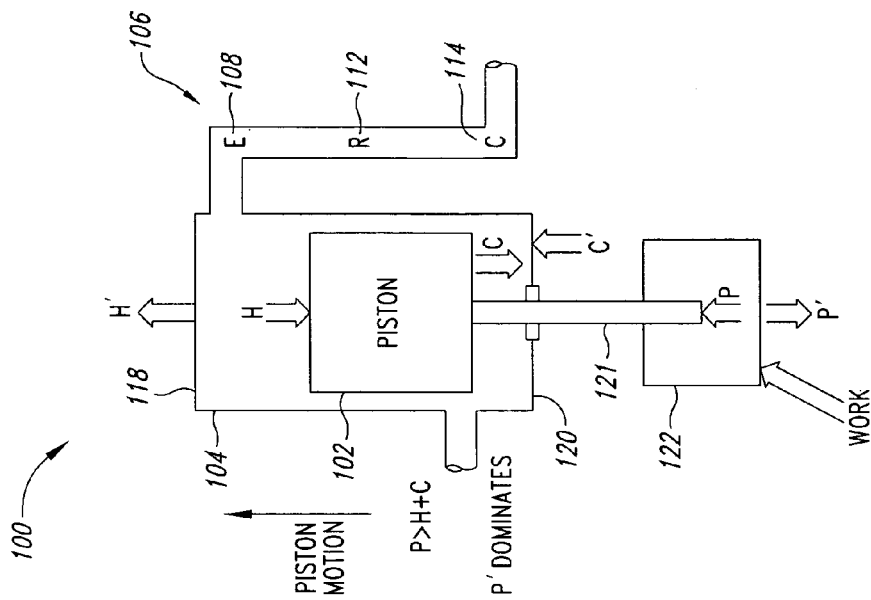
FIG. 30 is a schematic diagram of one of the cylinders and associated components of the non-fluidic free-piston multicylinder Stirling system for work input showing forces involved during an compression portion of a piston stroke as related to vibration reduction.

As is shown in FIGS. 29 and 30 for the case where the overstroke preventer 122 is furnishing work to the Stirling cycle, the reaction force P' of the overstroke preventer alternates in direction between when the piston 102 is approaching the hot end 118 (FIG. 29) and when the piston approaches the cold end 120 (FIG. 30). Since in this case, the reaction force P' dominates when the piston 102 is traveling in either direction, the reaction force P' will cause vibration to occur in the stationary portions of the overstroke preventer 122 and other stationary portions of the system 100 that are structurally linked to the overstroke preventer.

Vibration of an operational machine is undesirable to performance of the machine. A conventional solution is to try to isolate those portions of the machine causing vibration by inserting vibrational insulators between various portions of the machine to dampen vibrational forces. Other problems arise with this solution since structural integrity of the overall machine can be compromised due in part to structural weakness of the vibrational insulators.

Conventional attempts exist to directly cancel vibrations by using attenuation devices to produce attenuation forces to cancel out vibrations caused by reaction forces of the operational machines. Some attenuation devices use sensors with feedback. Other attenuation devices rely upon predictable vibrational patterns of the operational machines to produce vibration to counter the predictable vibrations. While these approaches may be effective to a certain degree, the attenuation devices tend to be somewhat of a bandaid solution since the attentuation devices or vibrational isolators attempt to mitigate already existing vibration rather than try to lessen the amount of vibration initially produced.

For large moving structures as can be found with large configurations of the system 100 or for applications where weight and bulk are undesirable or unacceptable, these conventional approaches to vibration reduction for the system 100 are not believed adequate. With all cases of the system 100, vibration reduction by reducing vibration caused by the system 100 would require less additional pieces of equipment to manufacture, assembly, operate, and maintain than conventional approaches that attempt to mitigate already caused vibration.

The system 100 allows for a modular approach due in part to the lack of kinematic connections amongst the cylinders regarding power transfer components. This modular approach has potential for very large capacities. With large capacities or other situations, such as where noise generation is a factor to be mitigated or where precise operation is needed, reduced vibration levels are to be desired or can even be a requirement at times for successful operation in certain instances. The system 100 has particular implementations that lend themselves to reduce vibration levels that take advantage of the modular nature of the system in the laying out the spatial relationships of the various cylinders.

Free-piston multi-cylinder machines offer far more versatility for incorporating this kind of arrangement than do kinematic multi-cylinder machines for two reasons. First, the pistons do not have to align with crankshafts or other mechanisms such as swash plates. This enables the piston cylinders to be arranged in any desired configuration and spatial orientation with respect to one another Second, in the case where power extraction is in the form of electricity produced by linear alternators, two thermodynamically independent machines can be synchronized together simply by appropriately connecting the alternator terminals together rather than requiring an awkward mechanical connection.

Implementations of vibration reduction for the system 100 are described below for sake of illustration using relatively simple configurations. Other implementations for vibration reduction for the system 100 also exist, which may require more sophisticated analysis to arrive at a proper configuration for spatial positioning of the various cylinders. A general theme is that the reaction forces associated with the various cylinders are used to cancel one another out.

Generally, more than one of the cylinders 104 are structurally coupled together in a group with the cylinders having a particular spatial orientation with one another so that the reaction forces of the individual cylinders of the group are so combined that the net reaction force is at least greatly reduced or nearly completely eliminated. Consequently, vibration reduction can be accomplished with the system 100 without use of additional devices such as the conventional vibrational insulators and attentuators mentioned above.

For a given number of the cylinders 104 to be structurally coupled in a group, there can be more than one spatial arrangement which may accomplish vibration reduction through cancellation of reaction forces. Suggested approaches to arrive at spatial configurations include mathematical analysis involving dynamics equations related to motion of the moving components of the system 100, such as motion of the pistons 102 and the piston rods 121, that could cause significant reaction forces. A related approach would include graphing motions of the pistons 102 relative to one another.

The vibration reduction principles described herein can be applied to any number of cylinders, but the most practical application is for three or four cylinder thermodynamic circuits, so the specific descriptions will be made for those cases. Specific examples of 6-cylinder and 8-cylinder configurations will be included, but these effectively represent a beneficial packaging approach for two three-cylinder and two four-cylinder machines, respectively. Other implementations have higher numbers of cylinders.

In exemplary cases, it is assumed that all pistons have the same masses and strokes and that the pistons are arrayed in a logical pattern. Other implementations have different combinations of moving mass parameters, or more random distributions of pistons, or achieving the same objectives without all piston axes being parallel.

Four Cylinder Implementation of Vibration Reduction

Figure 31:
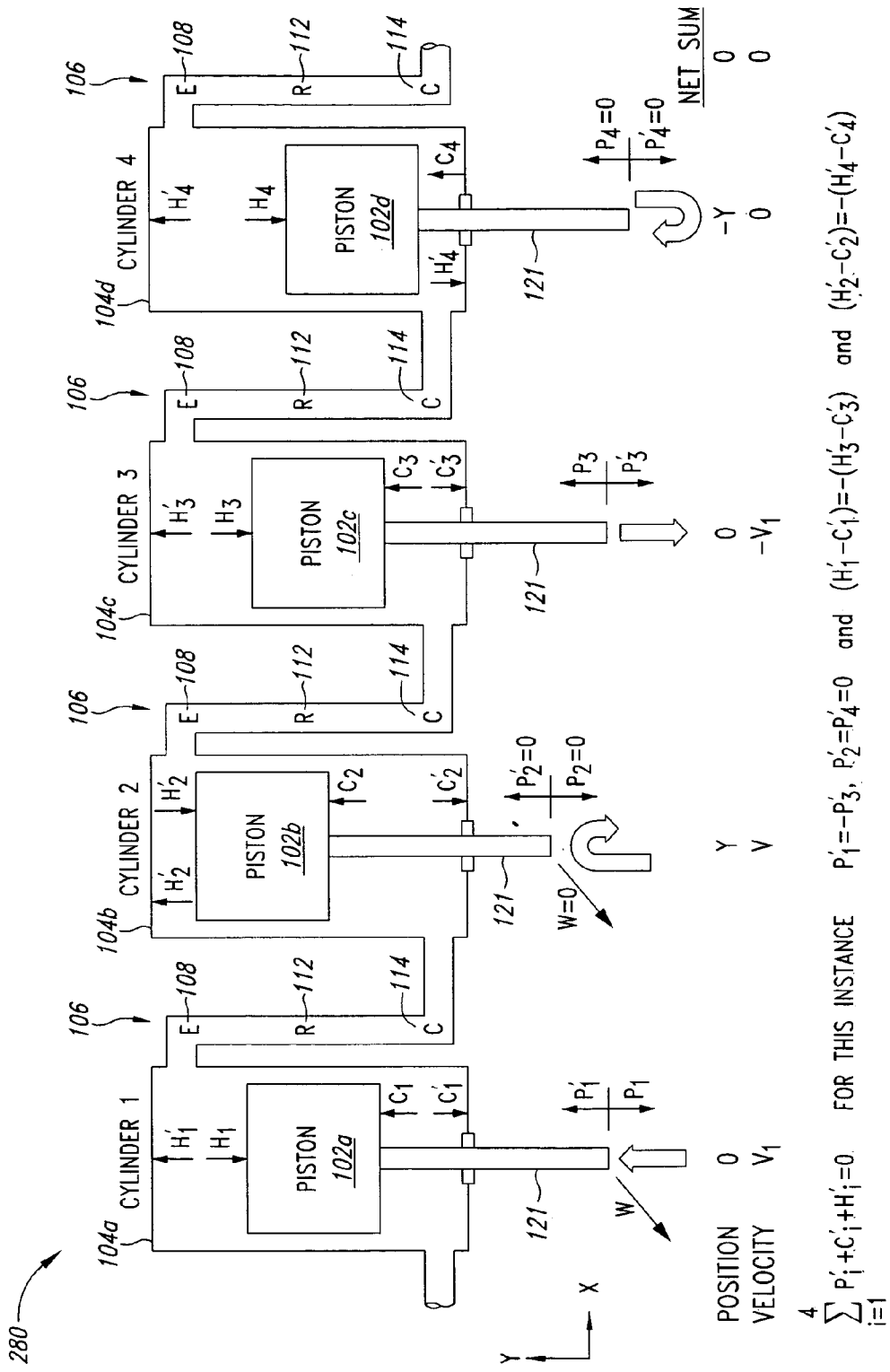
FIG. 31 is a schematic diagram of the non-fluidic free-piston multicylinder Stirling system depicted in FIG. 2 showing forces involved as related to vibration reduction.

An implementation of a four cylinder module 280 of the system 100 is schematically depicted in FIG. 31 with the pistons 102 and the cylinders 104 labeled from left to right as pistons 102a, 102b, 102c, and 102d in cylinders 104a, 104b, 104c, and 104d, respectively. In the depicted four cylinder module 280, the cylinders 104a–104d are aligned with one another in a common plane with the pistons 102a–102d each having an axis of reciprocal motion that is parallel with the axes of the other pistons.

In other module implementations include three, four, and other numbers of cylinders, at least some of the axes of reciprocal motion of the pistons 102 may be other than parallel with each other and/or the cylinders may not all share a common plane but desirably the reaction forces involved with all the various cylinders 104 and overstroke preventers 122 sum to at least substantially cancel each other out as discussed above. The pistons 102 are positioned with respect to one another with a 90° phase lag between pistons of adjacent cylinders. In FIG. 31, the piston 102a is shown at mid-stroke moving up and the piston 102c is shown at mid-stroke moving down.

The piston 102b is shown in FIG. 31 as reversing direction of motion at the top of its stroke while the piston 102d is shown reversing direction of motion at the bottom of its stroke. As each of the pistons 102 continues through its cyclical motion, the net summation of positions is zero, the net summation of velocities is zero, and the net summation of the accelerations is zero (at least in the case of equally weighted pistons) in a plane normal to the piston axes. Also, as indicated in FIG. 31, for the general case and for the particular depiction of FIG. 31, the reaction forces associated with the four cylinders 104 have a net sum of zero, again in a plane normal to the piston axes. Thus, unlike the case for a conventional single cylinder free-piston Stirling engine, there is no net reaction force across a plane normal to the piston axes, but there is a rocking or nutating force resulting from the fact that piston axes are not co-linear. The magnitude of this secondary vibration force is dependent on the separation distance of the piston axes.

Figure 32:
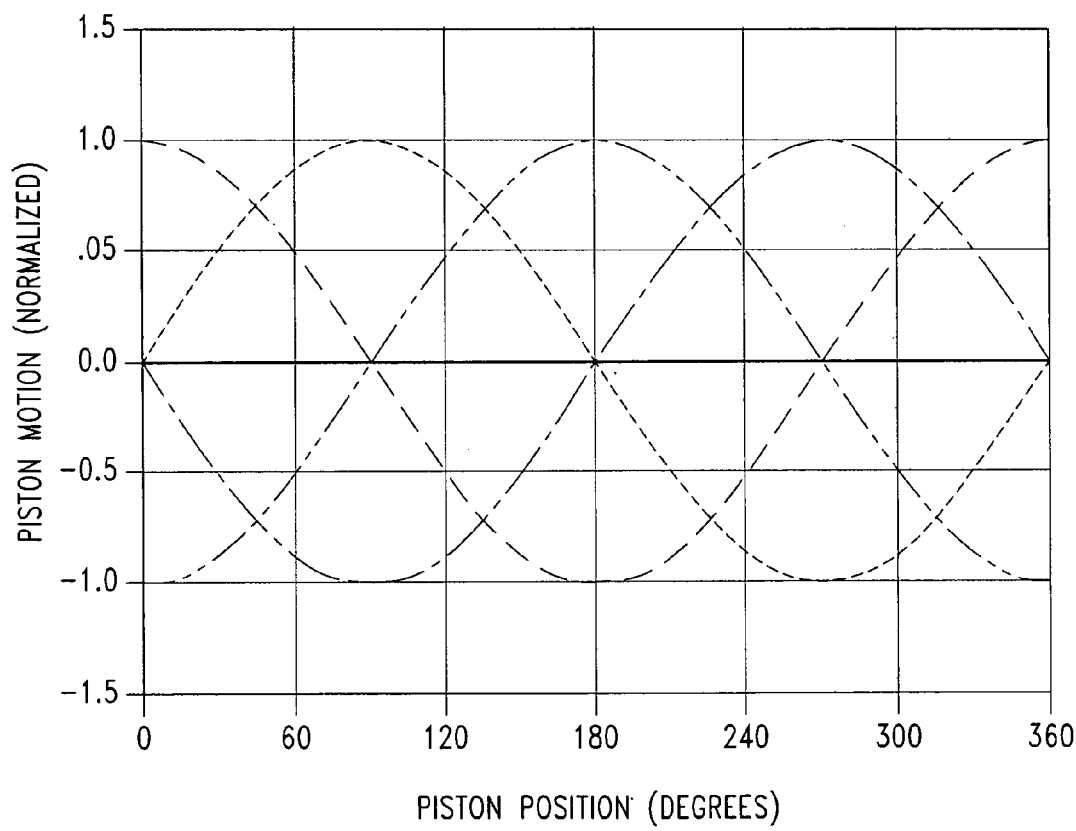
FIG. 32 is a graphical plot showing piston motion as related to vibration reduction for a four-cylinder implementation of the non-fluidic free-piston multicylinder Stirling system.

Idealized and normalized motions of the pistons 102 in the four cylinder module 280 can be represented as four sine waves with angular positions shifted by 90 degrees from one another. If Xp is the instantaneous position in degrees of the piston 102a of the four cylinder module 280, the equations of relative position for the four pistons of the four cylinder module 280, Xp102a through Xp102d, can be represented as below, with SUM (Xn) the composite sum of the four motions:

$Xp1=Xp102a=\sin(Xp)$ $Xp2=Xp102b=\sin(Xp+90)$ $Xp3=Xp102c=\sin(Xp+180)$ $Xp4=Xp102d=\sin(Xp+270)$ $\text{SUM}(Xn)=Xp1+Xp2+Xp3+Xp4=0$ A one cycle plot of these equations are shown in FIG. 32 with the SUM (Xn) being always zero. If all the moving elements of the system 100, such as the pistons 102 and such as the piston rods 121, have equal mass, this net zero sum of positions represents the motion of the center of mass of the system, which is zero in the direction of piston movement. Since the pistons 102a–102d have axes that are offset from one another, the system 100 experiences a rocking or nutating motion.

Velocities of the pistons 102a–102d are proportional to the mathematical derivative of the positions of the pistons 102a–102d, respectively. Normalized velocities of the pistons 102a–d can therefore be represented in a similar manner except with a cosine function such that there is a 90 degree phase shift between curves representing piston position and piston velocity.

Accelerations of the pistons 102a–102d are proportional to the mathematical second derivative of the positions of the pistons 102a–102d, respectively. Normalized accelerations of the pistons 102a–d can therefore be represented in a similar manner except with a negative sine function such that there is a 180 degree phase shift between curves representing piston position and piston acceleration.

Some three cylinder module implementations have advantages regarding efficiency and power density compared with other implementations of the system 100. Another advantage of three cylinder module implementations, whether generators, coolers, or compressors, is that they can be interfaced directly to a three phase electrical distribution system for simplicity and efficiency.

Also, if the system 100 is used for electrical power generation in which alternating current (AC) power output will be rectified and filtered to provide direct current (DC) power, three phase AC power output from a three cylinder module implementation can be converted to DC power with good efficiencies and simpler electronics.

Figure 33:
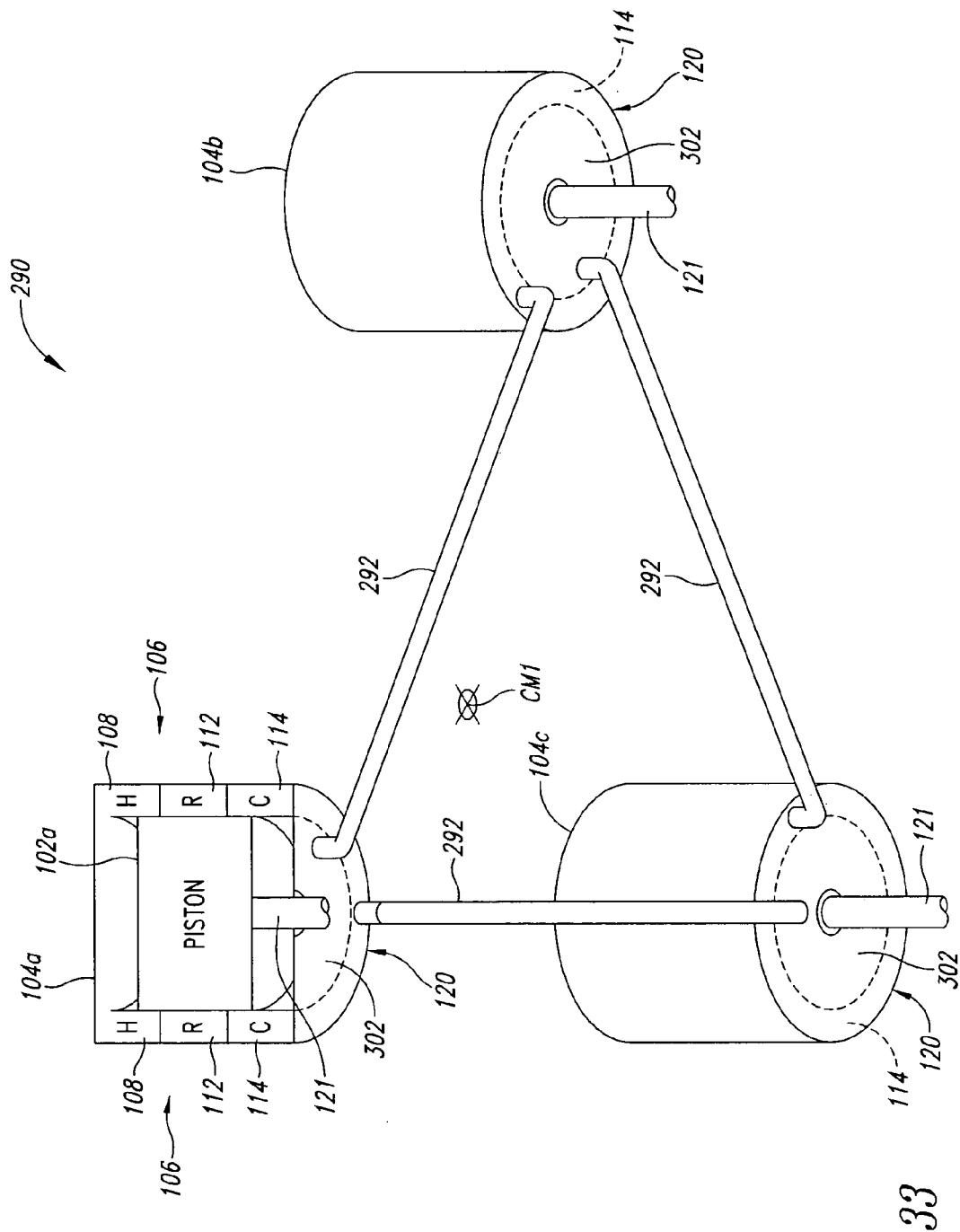
FIG. 33 is an isometric view with partial schematic cross-section of a first three cylinder module implementation for vibration reduction.

A first implementation of a three cylinder module 290 is depicted in FIG. 33 as having the three cylinders 104a–104c coupled together both structurally and fluidly by fluid routing portions 292. Each of the fluid routing portions 292 thermodynamically couples to a cold end 120 of one of the cylinders 104a–104c and the compression space cooler heat exchanger 114 of another of the cylinders. The three cylinders 104a–104c of the first three cylinder module 290 are positioned with respect to their moving components, such as the pistons 102 and the piston rods 121, so that a first center of moving mass (CM1) stays positioned in a central location shown in FIG. 33. Consequently, reaction forces involved with the cylinders 104 and the overstroke preventers 122 together cancel each other with respect to primary forces normal to the plane through CM1 that is normal to the piston axes. There are, however, secondary reaction forces in the form of couples resulting from the axial separation of the cylinders 104. These secondary forces are much easier to isolate with soft mounts, or to cancel with a second three cylinder module, than is the case for the major primary forces associated with a single cylinder free-piston Stirling machine.

An analysis similar to that used for the four cylinder module 280 can be applied toward the three cylinder module 290. For the first three cylinder module 290 there is a phase difference of 120 degrees between adjacent piston motions, between adjacent piston velocities, and between adjacent piston accelerations. This difference is analytically represented by the modified equations given below.

Figure 34:
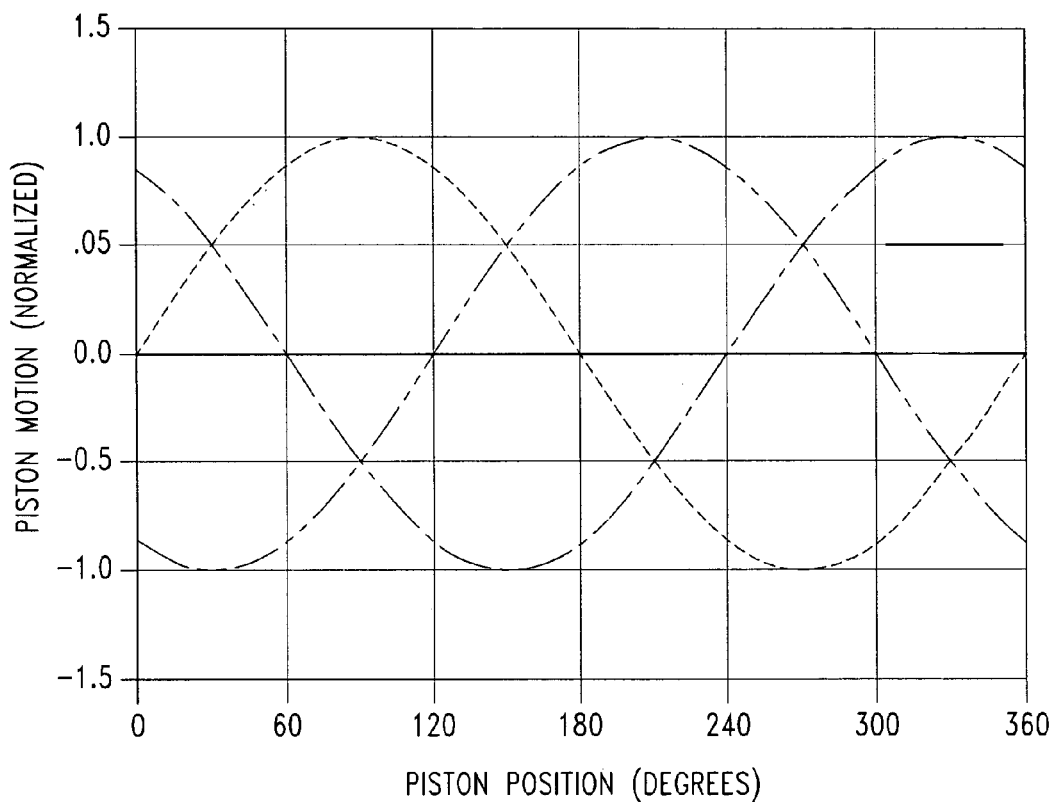
FIG. 34 is a graphical plot showing piston motion as related to vibration reduction for a three-cylinder implementation of the non-fluidic free-piston multicylinder Stirling system.
Figure 35:
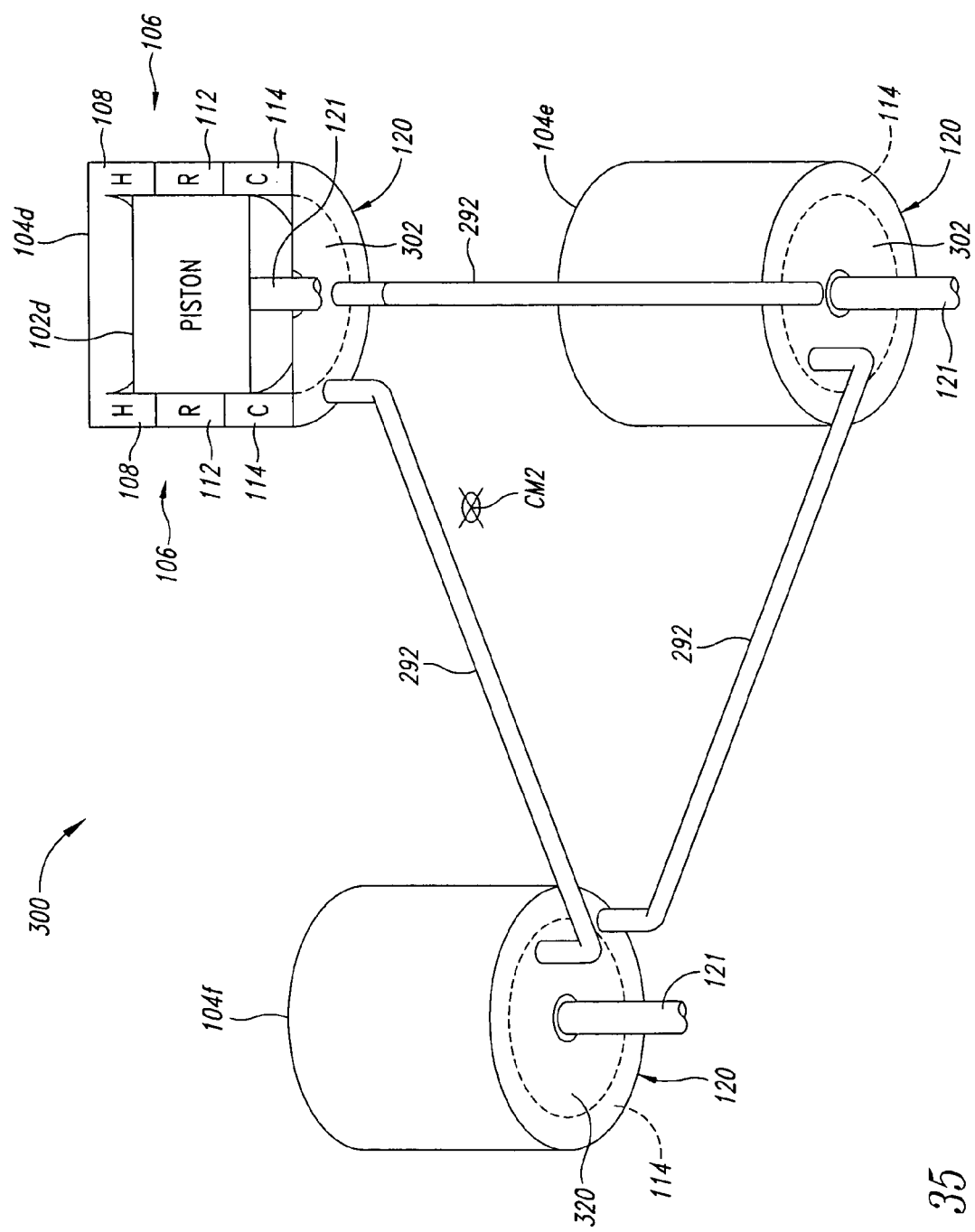
FIG. 35 is an isometric view with partial schematic cross-section of a second three cylinder module implementation for vibration reduction of the non-fluidic free-piston multicylinder Stirling system.

Idealized and normalized motions of the pistons 102 in the first three cylinder module 290 can be represented as three sine waves with angular positions shifted by 120 degrees from one another as shown in FIG. 34. If Xp is the instantaneous position in degrees of the piston 102a of the three cylinder module 290, the equations of relative position for the three pistons of the first three cylinder module 290, Xp102a through Xp102c, can be represented as below, with SUM (Xn) the composite sum of the three motions:

$Xp1=Xp102a=\sin(Xp)$ $Xp2=Xp102b=\sin(Xp+120)$ $Xp3=Xp102c=\sin(Xp+240)$ $\text{SUM}(Xn)=Xp1+Xp2+Xp3$ A second implementation of a three cylinder module 300 is depicted in FIG. 35 as having the three cylinders 104d–104f coupled together with fluid routing portions 292. Each of the fluid routing portions 292 couples to a cold end 120 of one of the cylinders 104d–104f and the compression exchanger 114 of another of the cylinders. For one of the cylinders 104, a cylindrical wall 302 separates the region associated with the compression exchanger 114 from the cold end 120 of the cylinder adjacent the piston 102. The series working fluid flow for one cycle of a first one and its adjacent of the cylinders 104 is from the cold end 120 side of the piston 102 of the first cylinder to and through fluid routing portion 292 to and through the compression exchanger 114, the regenerator 112 and the expansion exchanger 108 of the adjacent cylinder and onward to the hot side of the adjacent piston.

The three cylinders 104d–104f of the second three cylinder module 290 are positioned with respect to their moving components, such as the pistons 102 and the piston rods 121, so that a second center of moving mass (CM2) stays positioned in a central location shown in FIG. 35 so that reaction forces involved with the cylinders and overstroke preventers 122 together cancel each other in the manner described above for the first three cylinder module 290.

Figure 36:
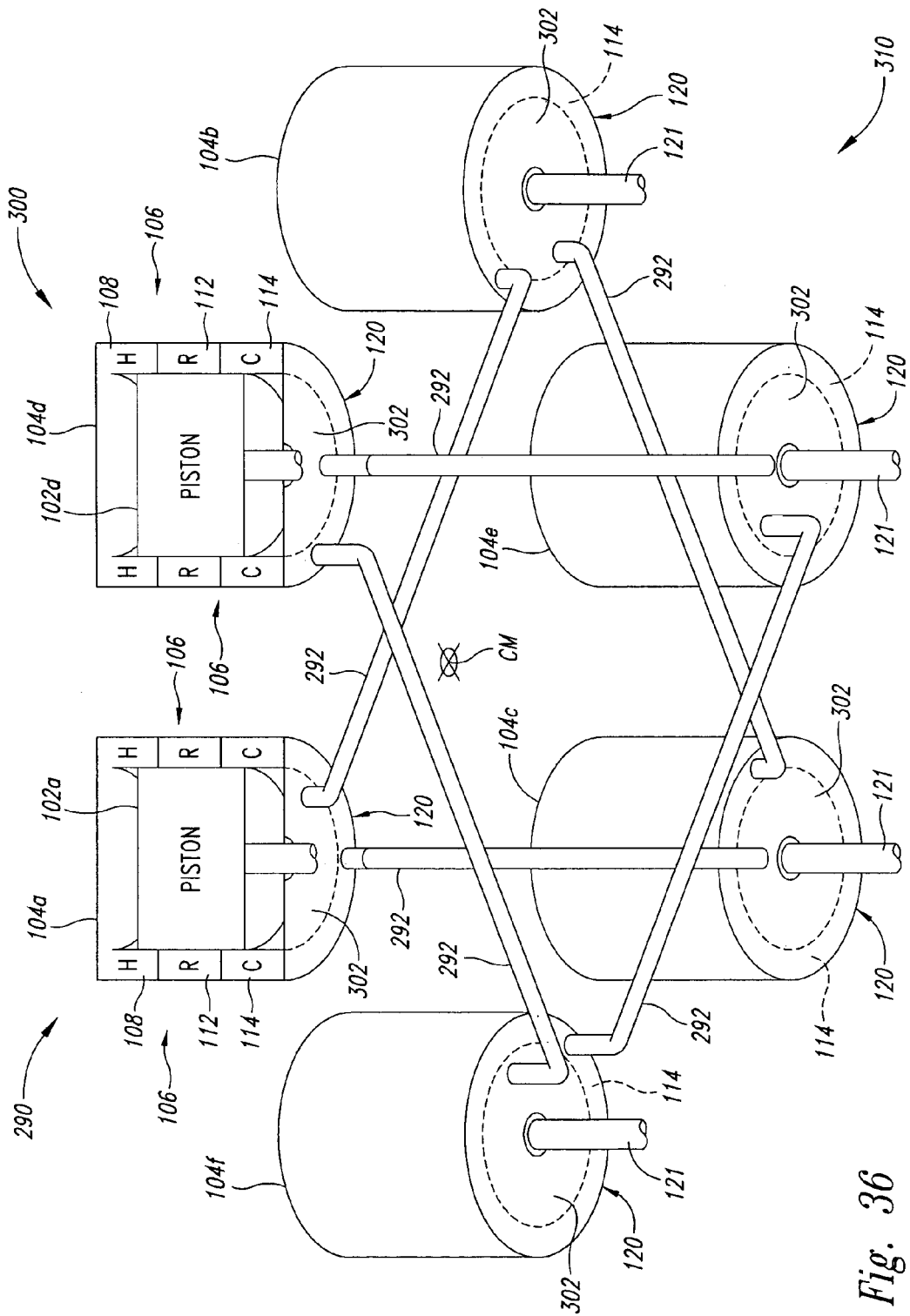
FIG. 36 is an isometric view with partial schematic cross-section of a six-cylinder assembly having the first three cylinder module implementation of FIG. 33 and the second three cylinder module implementation of FIG. 35 for vibration reduction of the non-fluidic free-piston multicylinder Stirling system.
Figure 37:
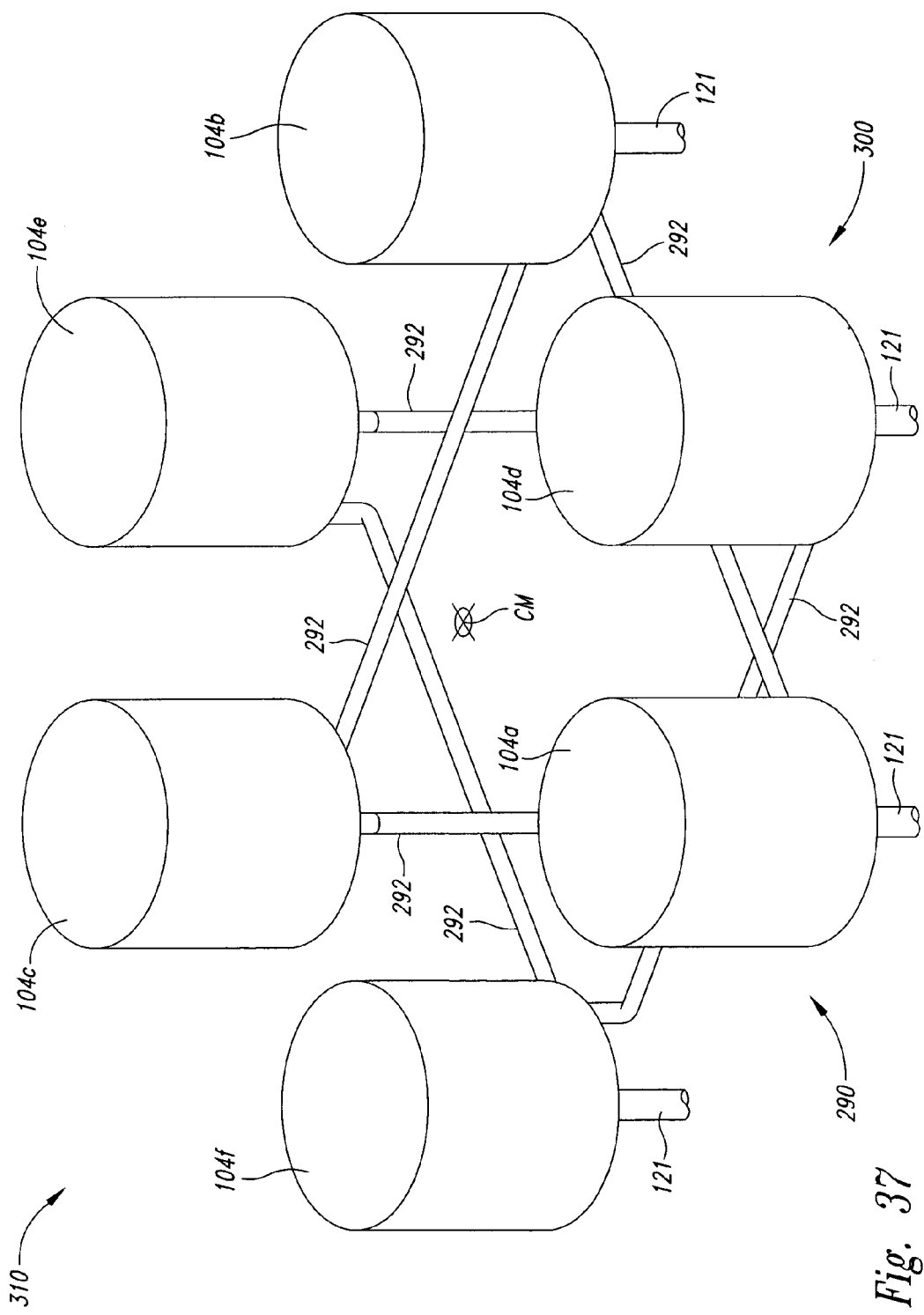
FIG. 37 is a second isometric view of the six-cylinder assembly shown in FIG. 36 for vibration reduction of the non-fluidic free-piston multicylinder Stirling system.

The first three cylinder module 290 having the first center of moving mass (CM1) and the second three cylinder module 300 having the second center of moving mass (CM2) can be assembled as a six cylinder implementation 310 such that both the first center of moving mass and the second center of moving mass share the same location position (CM) as shown in FIGS. 36 and 37. As a result, the reaction forces involved with both the first three cylinder module 290 and the reaction forces involved with the second three cylinder module 300 can be combined to substantially cancel each other out at the secondary level as well as at the primary level.

Figure 38:
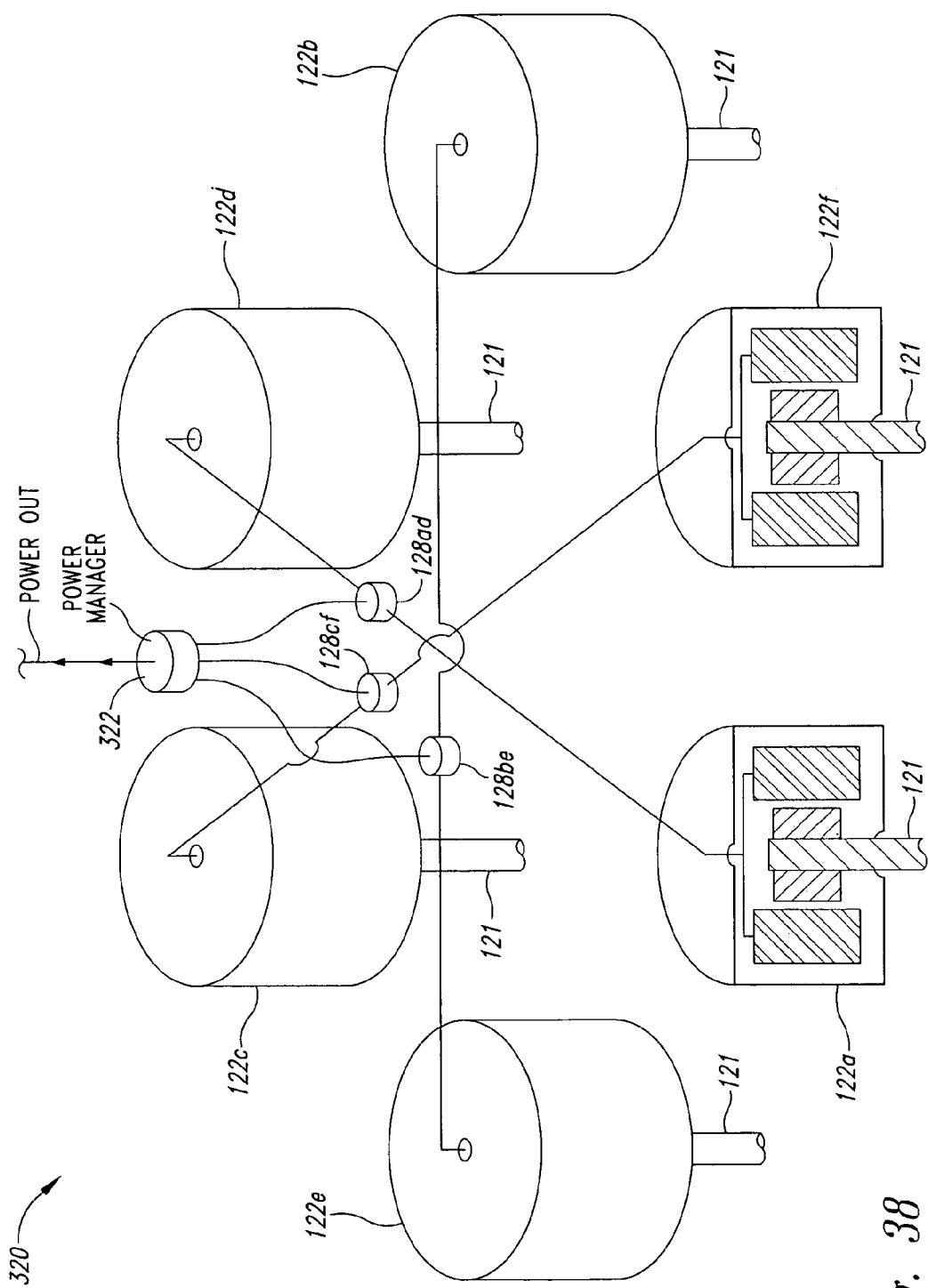
FIG. 38 is an isometric view with partial schematic cross-section of an overstroke assembly for a six cylinder implementation for vibration reduction of the non-fluidic free-piston multicylinder Stirling system.
Figure 39:
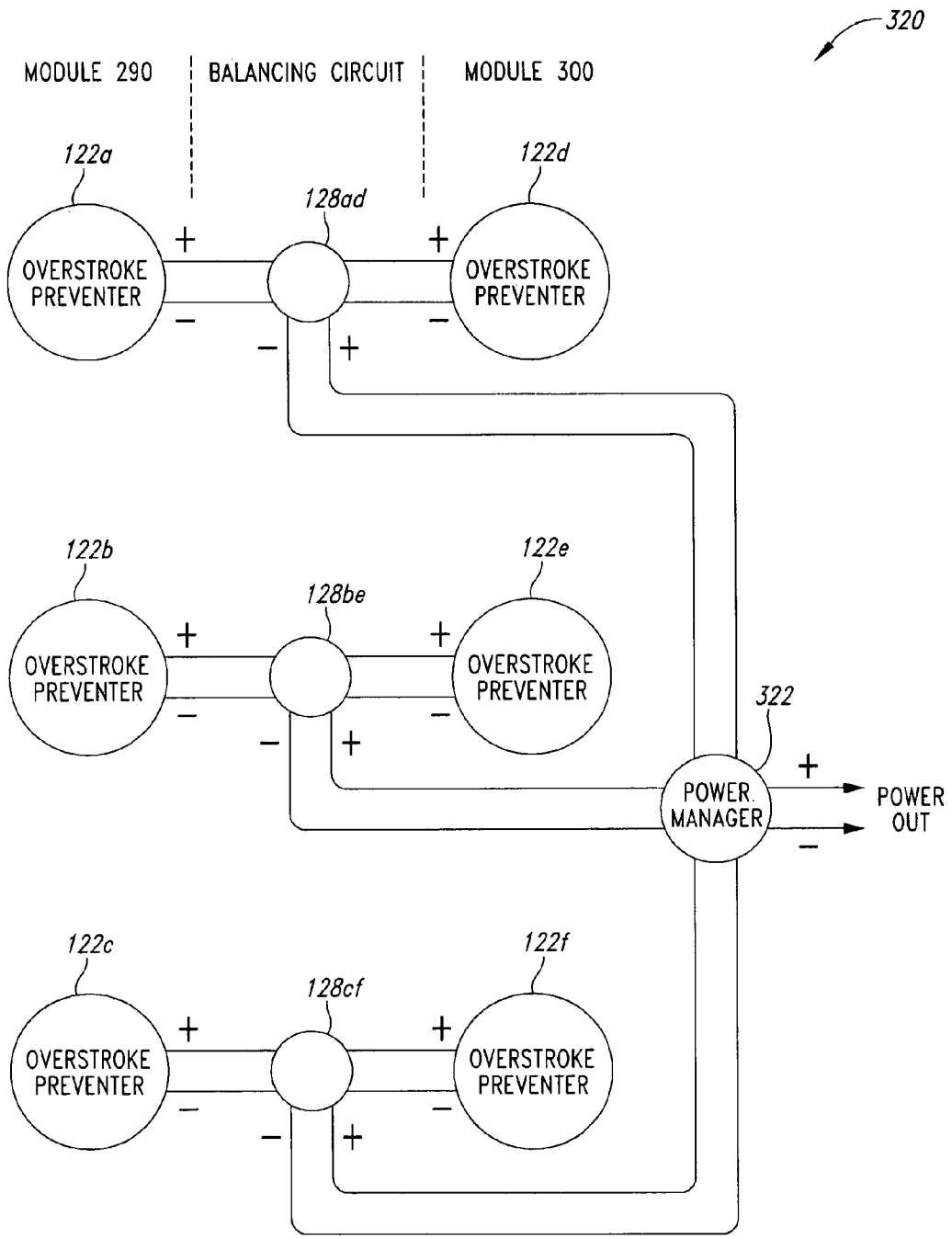
FIG. 39 is a schematic diagram of the overstroke assembly for the six cylinder implementation depicted in FIG. 38 showing electrical connections.

An overstroke assembly 320 for the six cylinder implementation 310 is shown in FIGS. 38 and 39 as having six overstroke preventers 122a–122f. The overstroke preventers are coupled as a first pair including the overstroke preventer 122a and the overstroke preventer 122d are paired up through a controller 128ad, as a second pair including the overstroke preventer 122b and the overstroke preventer 122e are paired up through a controller 128be, and as a third pair including the overstroke preventer 122c and the overstroke preventer 122f are paired up through a controller 128cf.

In the case of the overstroke assembly 320, each of the overstroke preventers 122 are electrodynamic such as being a linear alternator 124 for a Stirling generator implementation or a motor for a Stirling cooler or heat pump implementation. The controllers 128ad, 128be, and 128cf are coupled to a power manager 322, which controls the overall performance of the six cylinder implementation 310. The controllers 128ad, 128be, and 128cf are coupled to opposing pairs of the overstroke preventers 122 so that the pistons 102 of each of the pairs of cylinders 104 can be with parallel or opposite motions to allow for reaction forces of the moving elements for each pair of cylinders to sum together to effectively cancel vibration of the system 100. If the opposite pistons are moving in parallel, the ability to cancel vibration can be understood with reference to FIG. 34. As in the case of the three piston motions depicted in FIG. 34 summing to zero in a plane normal to the piston axes, the same holds true for all six piston motions when oppositely paired pistons move synchronously in the same direction. Furthermore, the moving masses of the synchronous parallel pistons are at the center point of the combined pair of moving masses rather than along individual piston axes. Thus the net motion of all three piston pairs occurs along the same central axis through the center of mass so there are no secondary couples caused by net piston motion along different axes.

Figure 40:
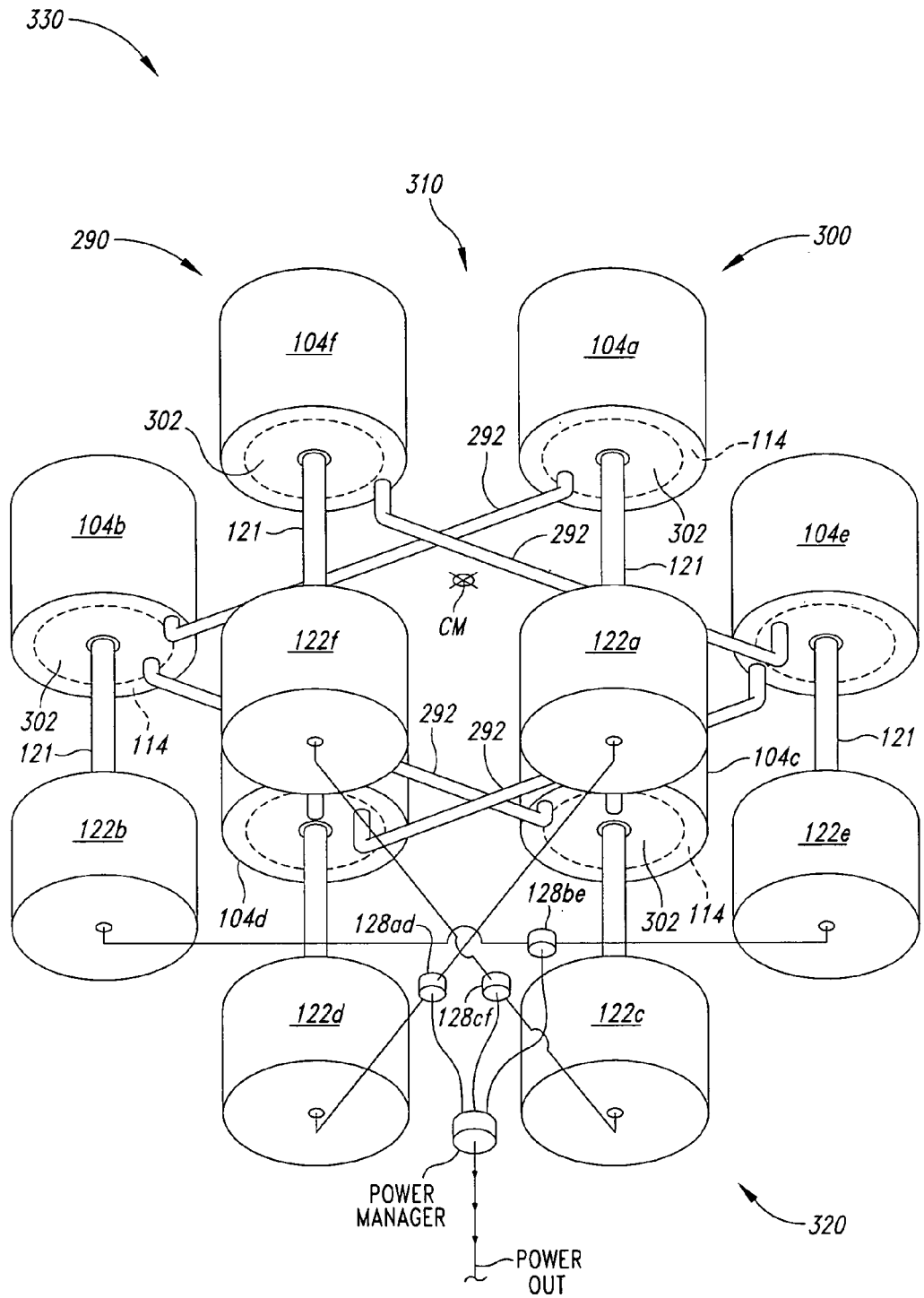
FIG. 40 is an isometric view of a combination of the six-cylinder assembly of FIGS. 36 and 37 with the overstroke assembly of FIG. 38 for vibration reduction of the non-fluidic free-piston multicylinder Stirling system.
Figure 41:
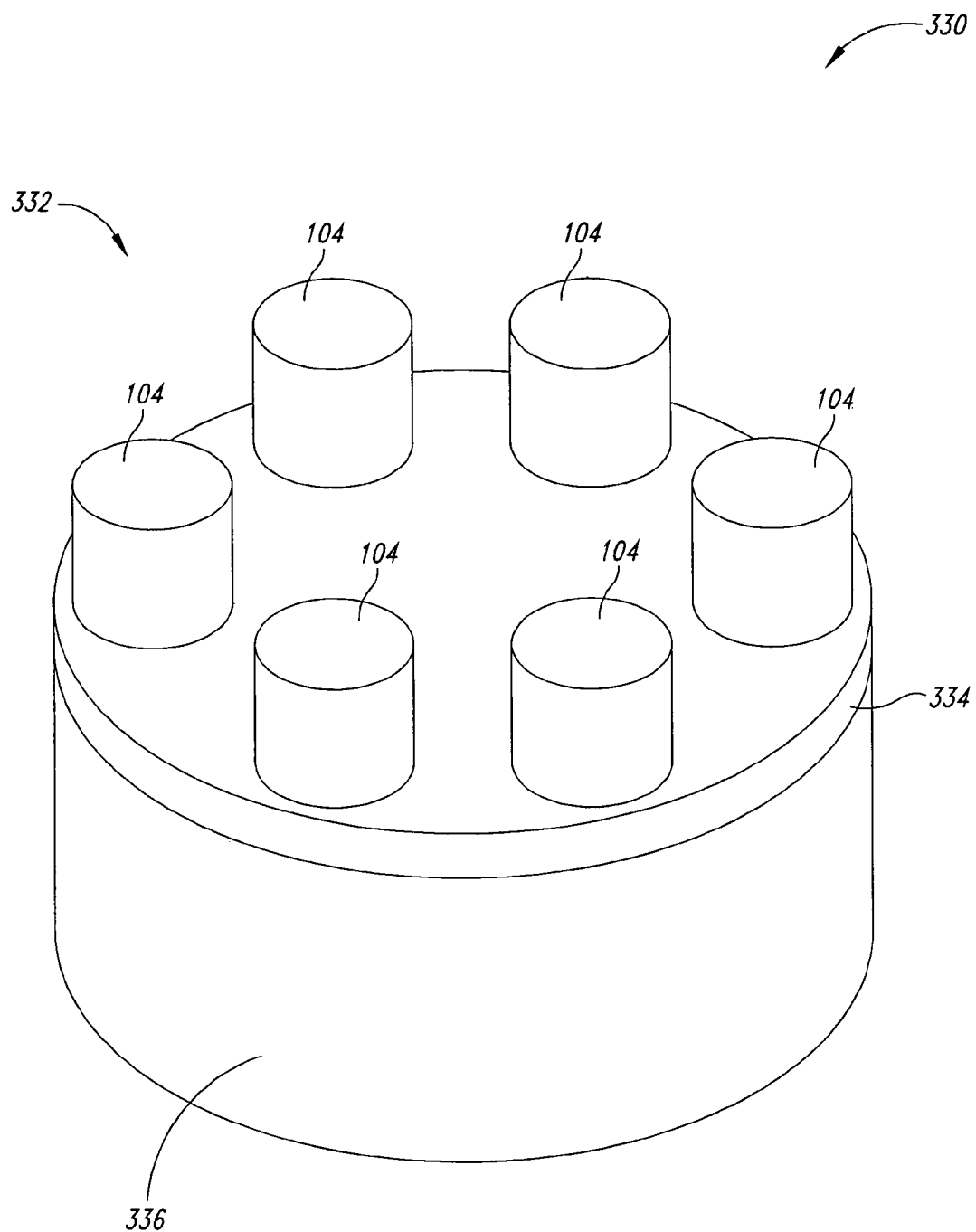
FIG. 41 is an external isometric view of the six-cylinder combination of FIG. 40.
Figure 42:
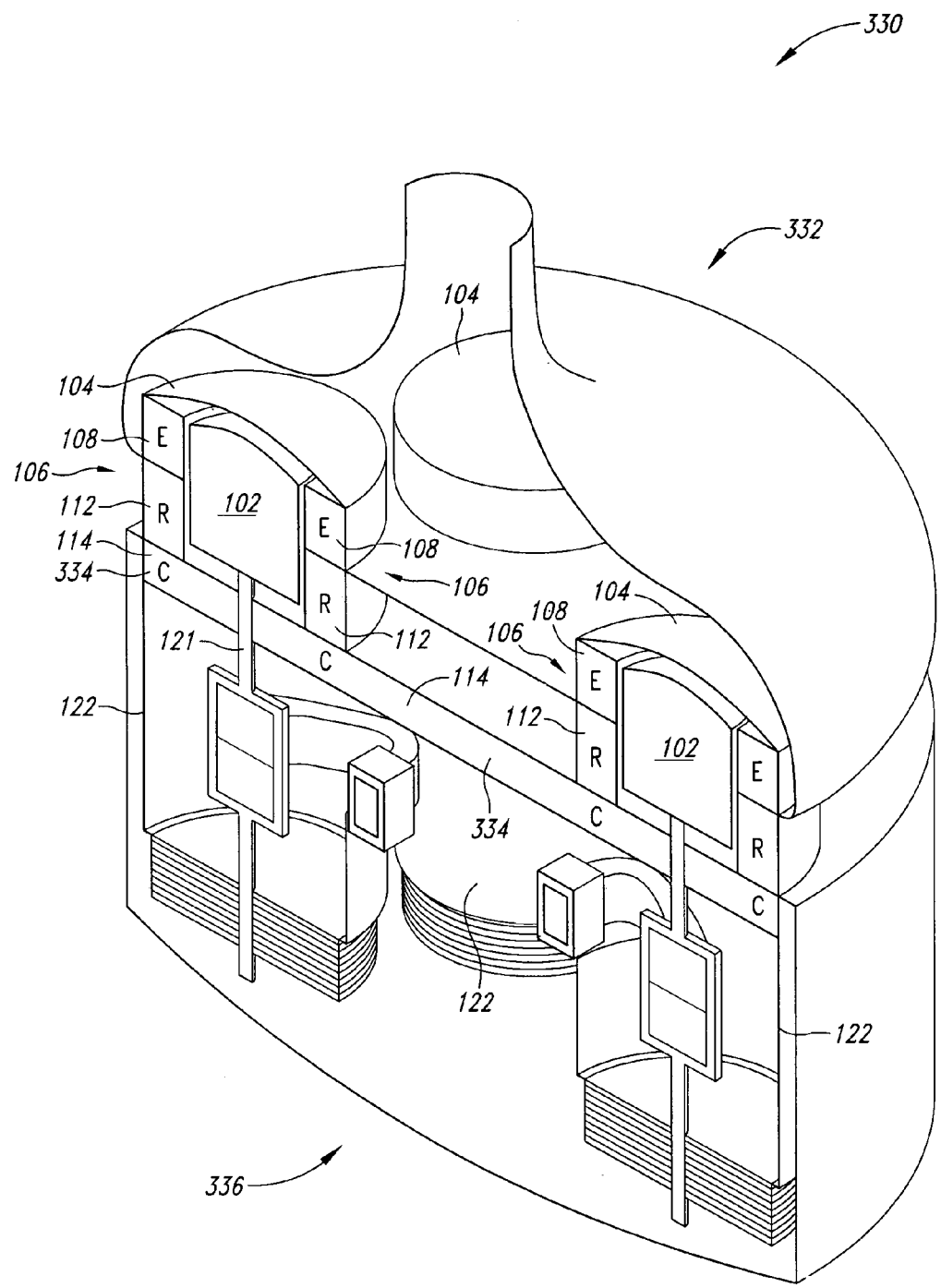
FIG. 42 is an isometric schematic diagram of a six-cylinder implementation of the non-fluidic free-piston multicylinder Stirling system.

The overstroke assembly 320 is shown coupled to the six cylinder implementation 310 in FIG. 40 to form a six cylinder system 330. The six cylinder system 330 is shown in generalized form in FIG. 41 as having a thermodynamic portion 332 with the cylinders 104 arranged in spatial relationship with one another to cancel out reaction forces, a fluid routing portion 334 to thermodynamically link the cylinders 104 and an overstroke prevention portion 336 having overstroke preventers 122 of either linear alternators and/or motors and/or mechanical devices. An isometric schematic diagram of an exemplary depiction of the six cylinder system 330 is shown in FIG. 42.

Figure 43:
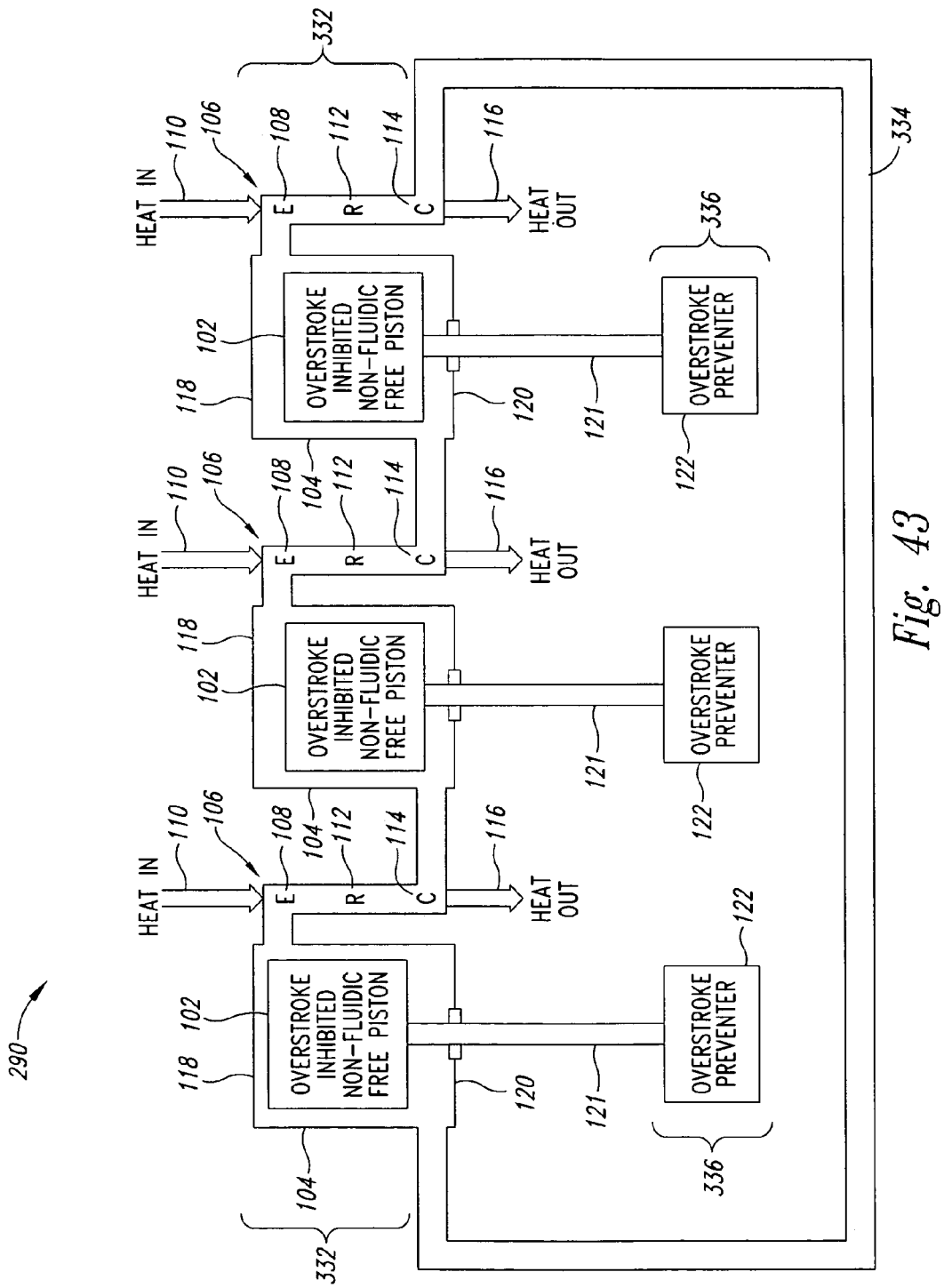
FIG. 43 is a schematic diagram of a first implementation for exchanger circuits of the three-cylinder modules of FIGS. 33 and 35 for the non-fluidic free-piston multicylinder Stirling system.
Figure 44:
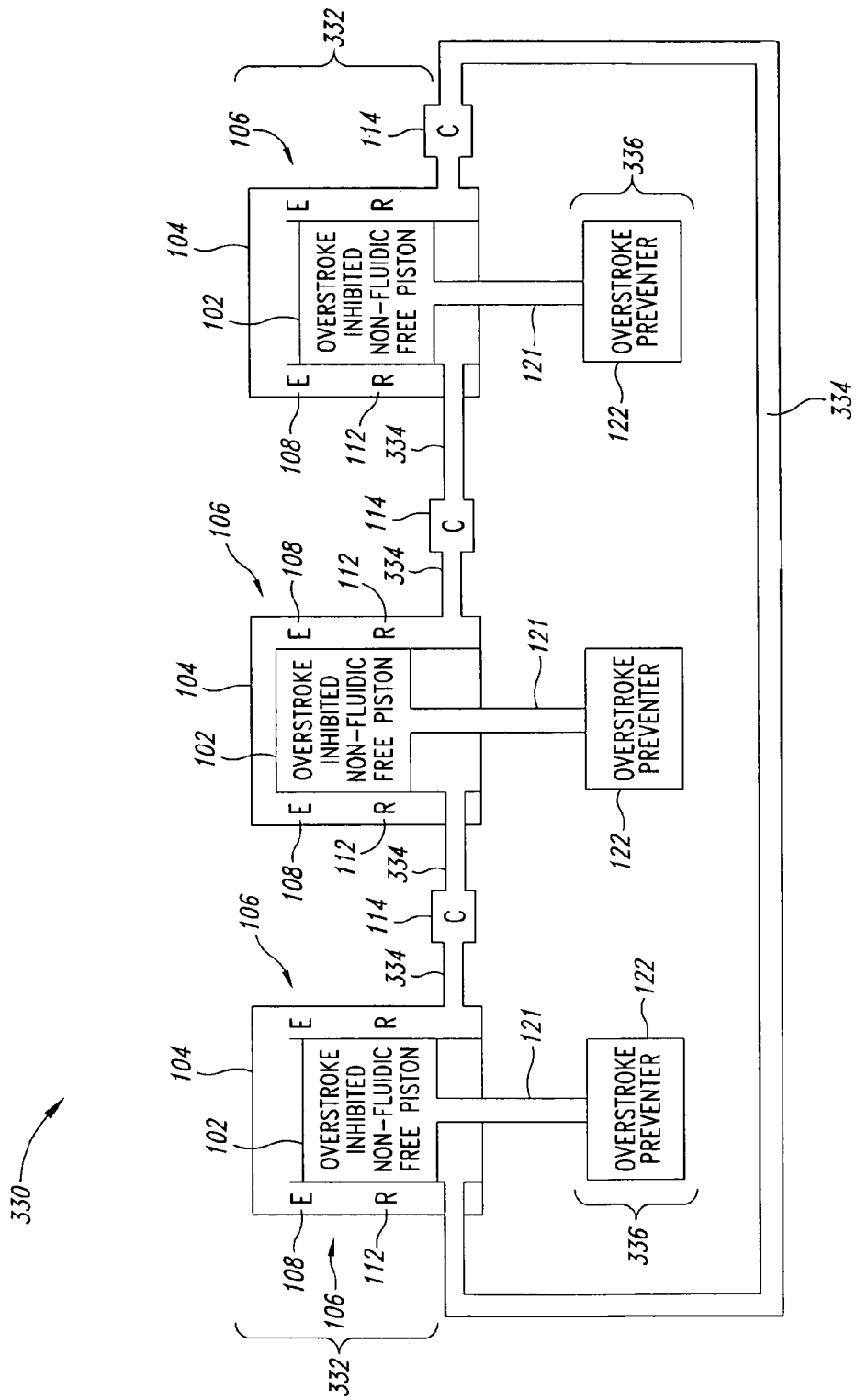
FIG. 44 is a schematic diagram of a second implementation for exchanger circuits of the three-cylinder modules of FIGS. 33 and 35 for the non-fluidic free-piston multicylinder Stirling system.

The heat exchanger circuit 106 can be configured a number of different ways for the system 100. For instance, the implementation of the three cylinder module 290 of FIG. 43 is depicted as having the heat exchanger circuit 106 with the expansion exchanger 108, the regenerator 112, and the condenser exchanger 114 being externally mounted relative to each of the cylinders 104. The heat exchanger circuit 106 for the implementation of the three cylinder module 290 of FIG. 44 has the expansion exchangers 108 and the regenerator 112 internal to the cylinders 104 and the compression exchanger 114 external to the cylinders.

Multi-cylinder machines, with typically three or four parallel-axis cylinders, should exhibit significantly lower net vibration than that produced by a single-cylinder machine. With three or four ideally sinusoidal piston motions at 120° or 90°, respectively, the net moving center of mass (and also velocity) remains in a single plane. There is, however, a rocking mode of vibration along a line or in a nutating pattern depending on whether the piston axes are in a single plane or distributed around a central axis. This secondary level of vibration can be substantially reduced by placing two similar machines with hot ends or cold ends together.

In other implementations vibration reduction is achieved for the system 100 by positioning various other configured multicylinder modules adjacent one another or by leaving two or more thermodynamically separate and distinct modules of the system 100 as separate and distinct, but integrating the two or more modules into a single structural unit. With this approach the different fluid routing portions of the different modules are not coupled together so that each different module has separated working fluid from one another. The different modules can use the same or different types of working fluid and the different modules can have the same number or different number of cylinders.

The different modules are, however, coupled together structurally and the various cylinders are spatially positioned with respect to one another so that the various reaction forces originating from the cylinders and overstroke preventers of the modules can sum to cancel one another out.

Implementations of this approach of structural integration of different modules of the system 100 can take advantage of a heat source that can be positioned adjacent to all of the expansion exchangers 108 involved and a heat sink that can be positioned adjacent to all of the compression exchangers 114 involved. Such arrangements that place all the expansion exchangers 108 in a single plane and all the compression exchangers 114 in a second plane can be integrated with various heat sources and heat sinks in a much more convenient manner than is the case for on-axis end-to-end balancing configurations used for balancing single cylinder engine vibrations.

Figure 50:
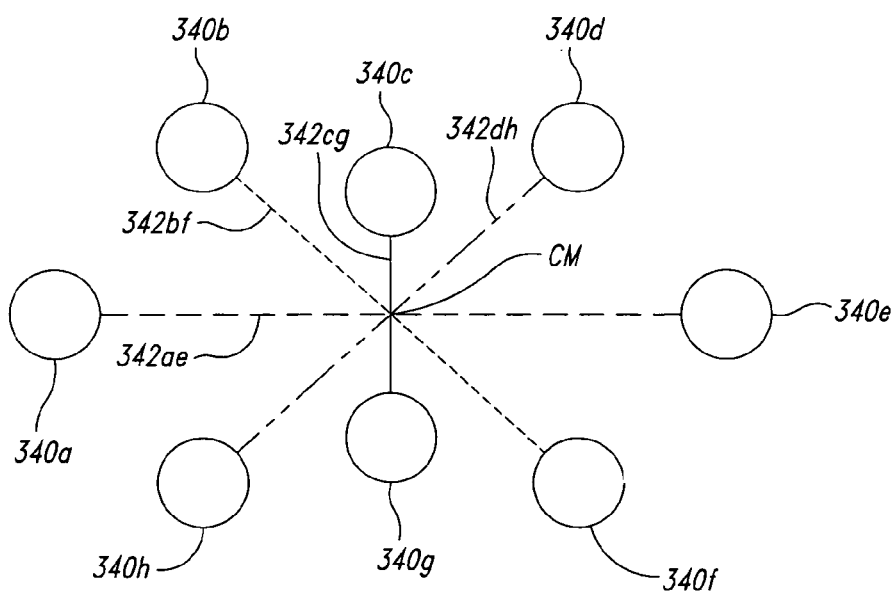
FIG. 50 is a topology of an assembly of a eight-cylinder implementation of the non-fluidic free-piston multicylinder Stirling system for vibration reduction.

Some ways in which two adjacent or otherwise structurally integrated modules of the system 100 can be positioned to achieve vibration reduction are shown in FIGS. 45–50 for modules of 6 and 8 Stirling units 340. Symmetrically disposed 6-cylinder implementations are depicted in FIGS. 45–49, and a symmetrically disposed 8-cylinder implementation is depicted in FIG. 50.

In general, implementations could have all cylinders involved connected thermodynamically to each other. Alternatively, two or more modules, depending upon the total number of cylinders for an implementation, could be structurally coupled together but not share working fluid. For instance, for a six or eight-cylinder implementation, two modules with three or four cylinders each, respectively, could be structurally coupled, but the two modules would not share working fluid. Structural coupling of the two or more modules could be accomplished by integration of the modules into a single piston housing, multiple closely coupled piston housings or multiple mechanically rigid housing connections.

The exemplary topologies of FIGS. 45, and 48–50 represent both a first type of implementation and a second type of implementation. The first type of implementation has two modules of the system 100 that do not share working fluid but are structurally coupled. The second type of implementation has all of the cylinders 104 and the overstroke preventers 122 both structurally coupled and having all the cylinders share working fluid.

Figure 45:
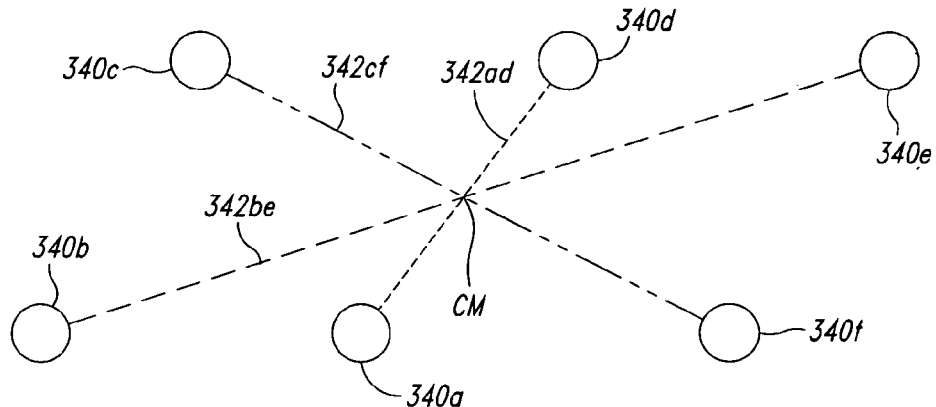
FIG. 45 is a general topology for a six-cylinder implementation of the non-fluidic free-piston multicylinder Stirling system for vibration reduction.
Figure 46:
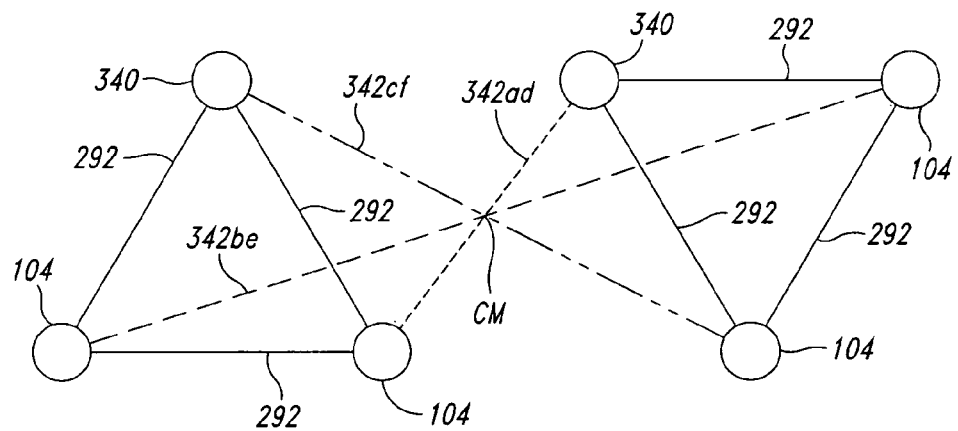
FIG. 46 is a topology of an assembly of two three-cylinder modules of the non-fluidic free-piston multicylinder Stirling system for vibration reduction.
Figure 47:
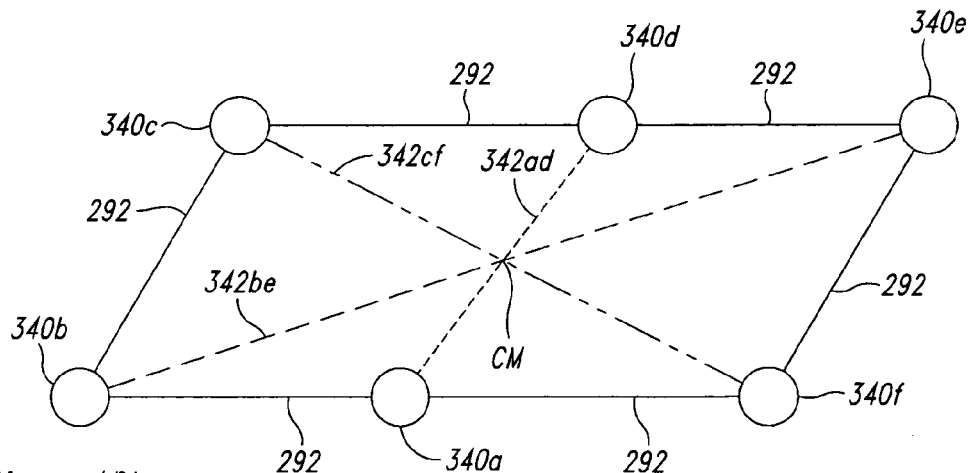
FIG. 47 is a topology of an assembly of a six-cylinder implementation of the non-fluidic free-piston multicylinder Stirling system for vibration reduction.
Figure 48:
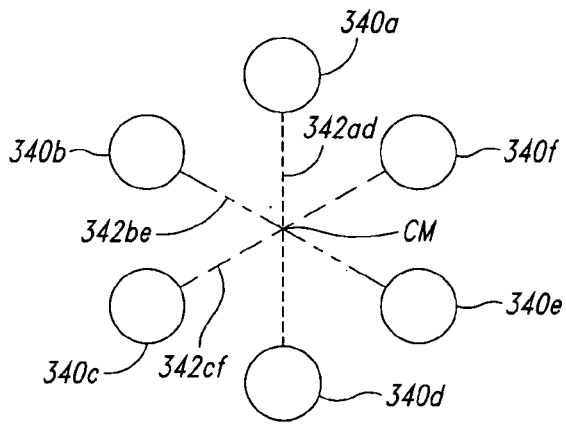
FIG. 48 is a topology of an assembly of a second six-cylinder implementation of the non-fluidic free-piston multicylinder Stirling system for vibration reduction.
Figure 49:
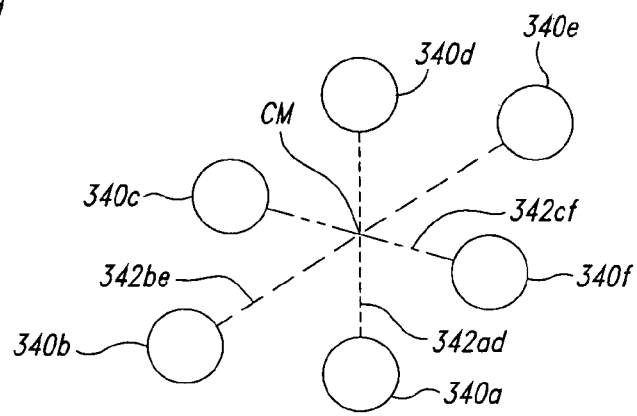
FIG. 49 is a topology of an assembly of a third six-cylinder implementation of the non-fluidic free-piston multicylinder Stirling system for vibration reduction.

A particular implementation of the more general depiction shown in FIG. 45 is shown in FIG. 46 for the case in which two three-cylinder modules of the system 100 are structurally coupled but do not share the same working fluid. A particular implementation of the more general depiction shown in FIG. 45 is shown in FIG. 47 for the case in which all cylinders of a six-cylinder implementation of the system 100 both are structurally coupled and share working fluid.

Each Stirling unit 340 comprised of the cylinders 104 and the other components associated with the cylinder such as the piston 102, the piston rod 121, and the overstroke preventer 122 is shown from a viewpoint that looks down on one of the hot end 118 or the cold end 120 of the cylinder in the FIGS. 45–50.

Six of the Stirling units 340a–340f are depicted in FIG. 45 as being symmetrically positioned about a center of moving mass (CM) given that the moving mass of each of the Stirling units is substantially the same. If the moving mass of at least one of the Stirling units 340 differed appreciably, then the Stirling units would be positioned accordingly so that the reaction forces associated with the Stirling units would still substantially cancel to achieve vibration reduction.

For the depicted three-cylinder implementations, opposingly positioned pairs of Stirling units 340 are coupled to a different one of the controllers 128 as represented by dashed line 342ad for a first pair of the Stirling unit 340a and the Stirling unit 340d, dashed line 342be for a second pair of the Stirling unit 340b and the Stirling unit 340e, and dashed line 342cf for a third pair of the Stirling unit 340c and the Stirling unit 340f.

The controllers 128 are use to achieve parallel or opposing reciprocation of the two pistons 102 of each pair of the Stirling units 340 so that reaction forces are cancelled thereby causing vibration reduction. The dashed lines 342 between opposing Stirling unit pairs also indicate that the pistons 102 associated with a Stirling unit pair are moving synchronously (in phase or 180° out of phase). One desired element is for the center of moving mass of all these pairs to pass through the same point CM as indicated. Alternatively, a composite of different points that superimpose to cancel out any net displacement of the total moving center of mass is also acceptable.

The 6-cylinder implementations of FIGS. 45–47 and 48–49 can include different dual three-cylinder configurations having two modules structurally coupled but not sharing working fluid in which positions and/or relative angles of some of the Stirling units 340 are changed without any translation of the total net center of moving mass or individual pair centers of moving masses. The Stirling units 340 are paired so that thermodynamically independent pairs of the pistons 102, as identified by the dashed lines 342, one piston from each of the two modules, move in synchronization as a result of the linear alternators 124 of the Stirling units 340 being electrically coupled. Also, as described, a further approach for vibration reduction is to co-locate the centers of moving mass for each of the pairs of Stirling units 340.

Some of those implementations using a linear alternator can use an alternative to the linear alternators 124 that are each coupled to an individual one of the pistons 102. As mentioned, the system 100 can also use duplex implementations of linear alternators in which each are coupled to two of the pistons 102 with potential performance advantages. The duplex alternator 220 typically employs a pair of alternator movers that are 180° out of phase with one another.

Figure 51:
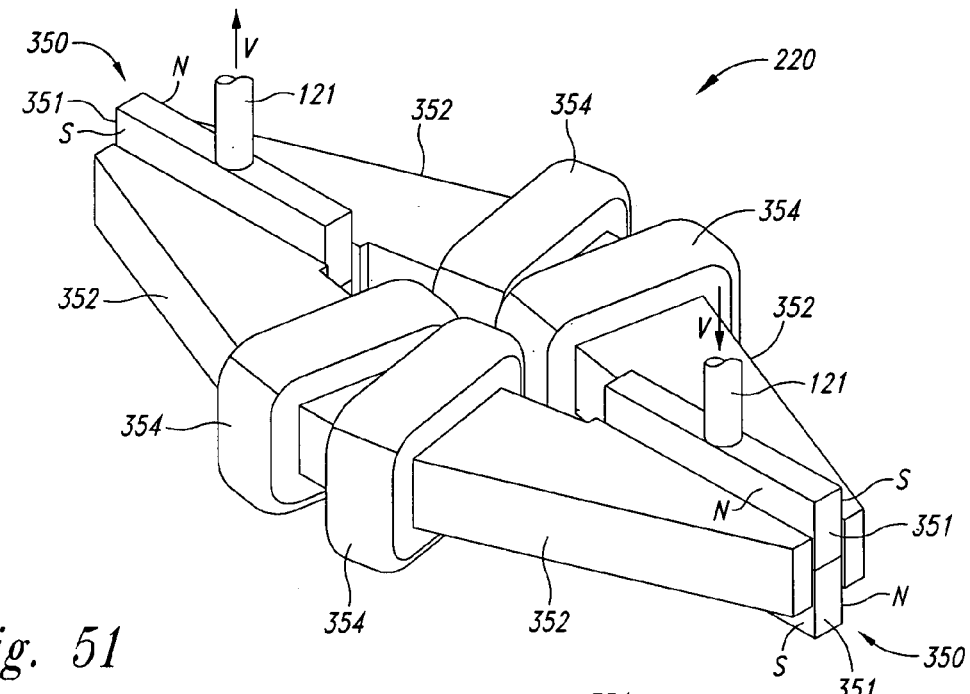
FIG. 51 is an isometric view of an implementation of a duplex linear alternator.
Figure 52:
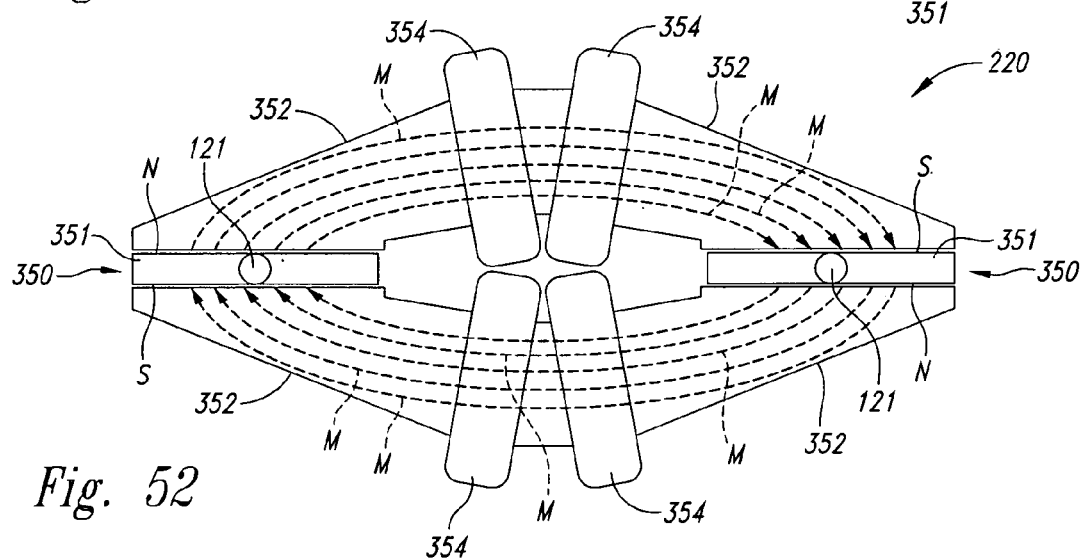
FIG. 52 is a top plan view of the duplex linear alternator of FIG. 51 showing magnetic flux lines in a clockwise manner.
Figure 53:
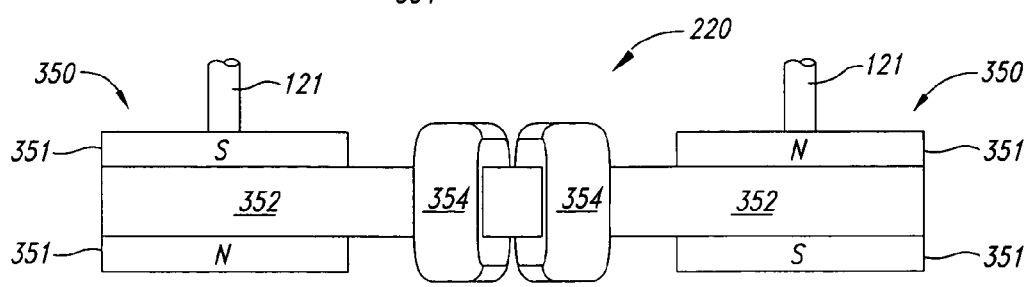
FIG. 53 is an elevational side view of the duplex linear alternator of FIG. 51.

An implementation of the duplex linear alternator 220 is shown in FIGS. 51–53 as having two movers 350, each having a pair of oppositely polarized magnet 351 and shown located in mid-stroke traveling in opposite directions V. The depicted duplex linear alternator 220 further has two stators sections 352 made of separate lamination stacks and each having one or more coils 354 of wire wound around the stator to increase magnetic flux M shown in FIG. 52. Hiperco laminations can be used when higher performance is desired and M-19 silicon steel laminations can be used when lower cost is a factor. Other implementations can use other types of laminations. It is not necessary that both stator sections 352 be symmetrical as pictured, or even that they each include one or more coils 354.

Although the movers 350 are shown having the magnets 351, the magnets in other implementations can be coupled to the stators 352 with the movers being composed of iron. The depicted duplex linear alternator 220 having the movers 350 are shown with the magnets 351 being flat, which can aid in using structural enclosures for the alternator. The stators 352 as depicted use flat laminations that can be stacked and fastened together using conventional electric machine fabrication techniques. The coils 354 are shown wound around a relatively small longitudinal section of lamination material with reduced material usage and reduced resistance losses as contrasted to conventional approaches. There are many other ways to distribute the coils, both in number and in location, as well as the stator configuration and the moving members (moving iron, moving copper, and other configurations of moving magnets) and still retain the essential features of a duplex linear motor or alternator that utilizes two moving members.

The duplex linear alternator 220 allows for simultaneous extraction of power from the two movers 350 operating 180 degrees out of phase. The movers 350 incorporate the two magnets 351 as axially-stacked flat magnets with opposite polarity as indicated by N and S markings on the magnets for north and south poles, respectively. When the movers 350 cycle between their two end stroke positions, flux through the stator 352 cycles between linking the coils in a clockwise and a counter-clockwise manner (FIG. 52 showing the clockwise manner). This resultant cyclic flux linkage reversal in the coils 354 generates an AC power output. Iron usage can be reduced by providing only the iron cross-section and flux path length needed to carry the requisite flux. Copper usage can also be reduced by close winding around the reduced iron cross-section area.

Figure 54:
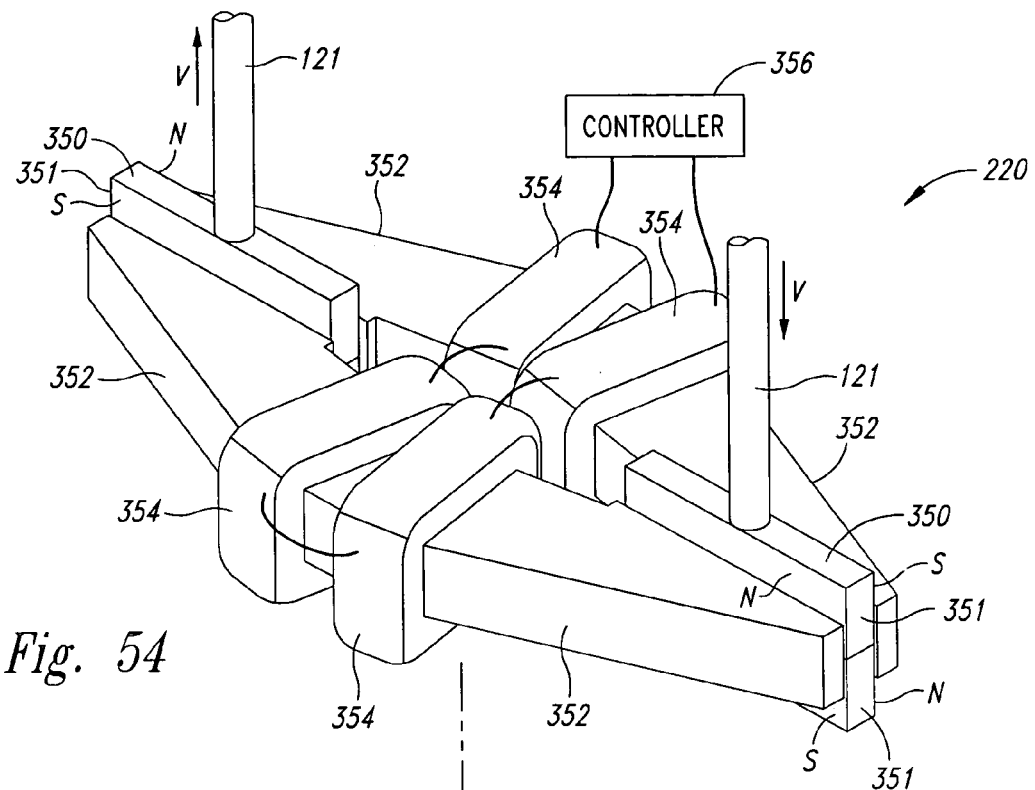
FIG. 54 is an isometric view of a series wiring implementation of the duplex linear alternator of FIG. 51.
Figure 55:
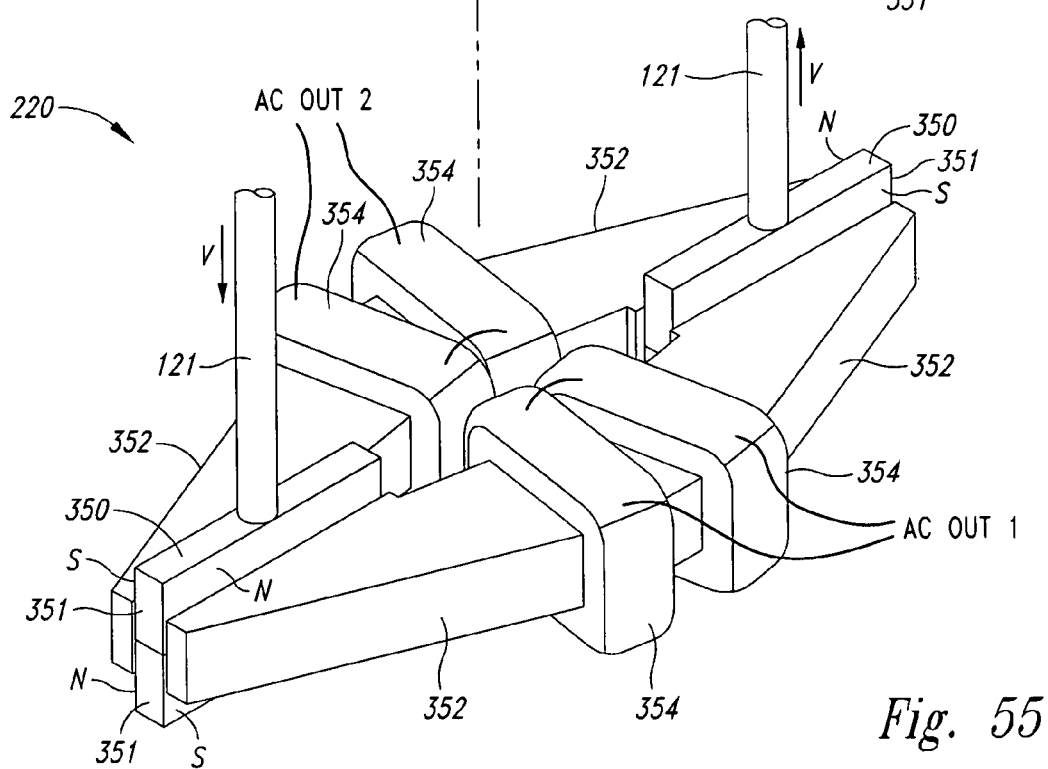
FIG. 55 is an isometric view of a series-parallel wiring implementation of the duplex linear alternator of FIG. 51.

All four of the coils 354 of the duplex linear alternator 220 can be wired in a series arrangement to a controller 356 as shown in FIG. 54. Alternatively, the four coils 354 can be arranged in two pairs with the coils of a pair being wired is series and the two pairs being wired together in parallel as shown in FIG. 55.

Figure 56:
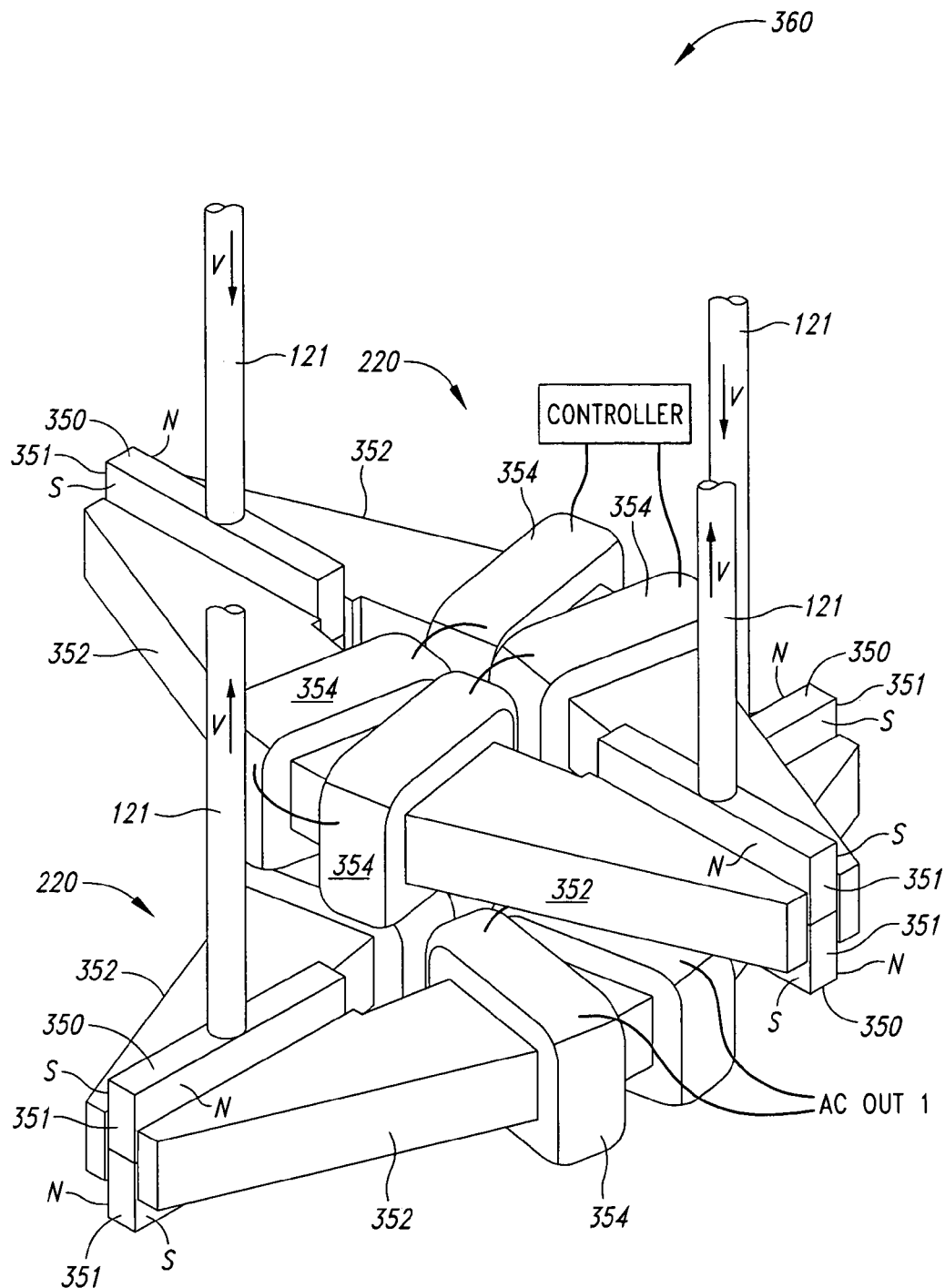
FIG. 56 is an isometric view of two duplex linear alternators for a four-cylinder implementation of the non-fluidic free-piston multicylinder Stirling system.
Figure 57:
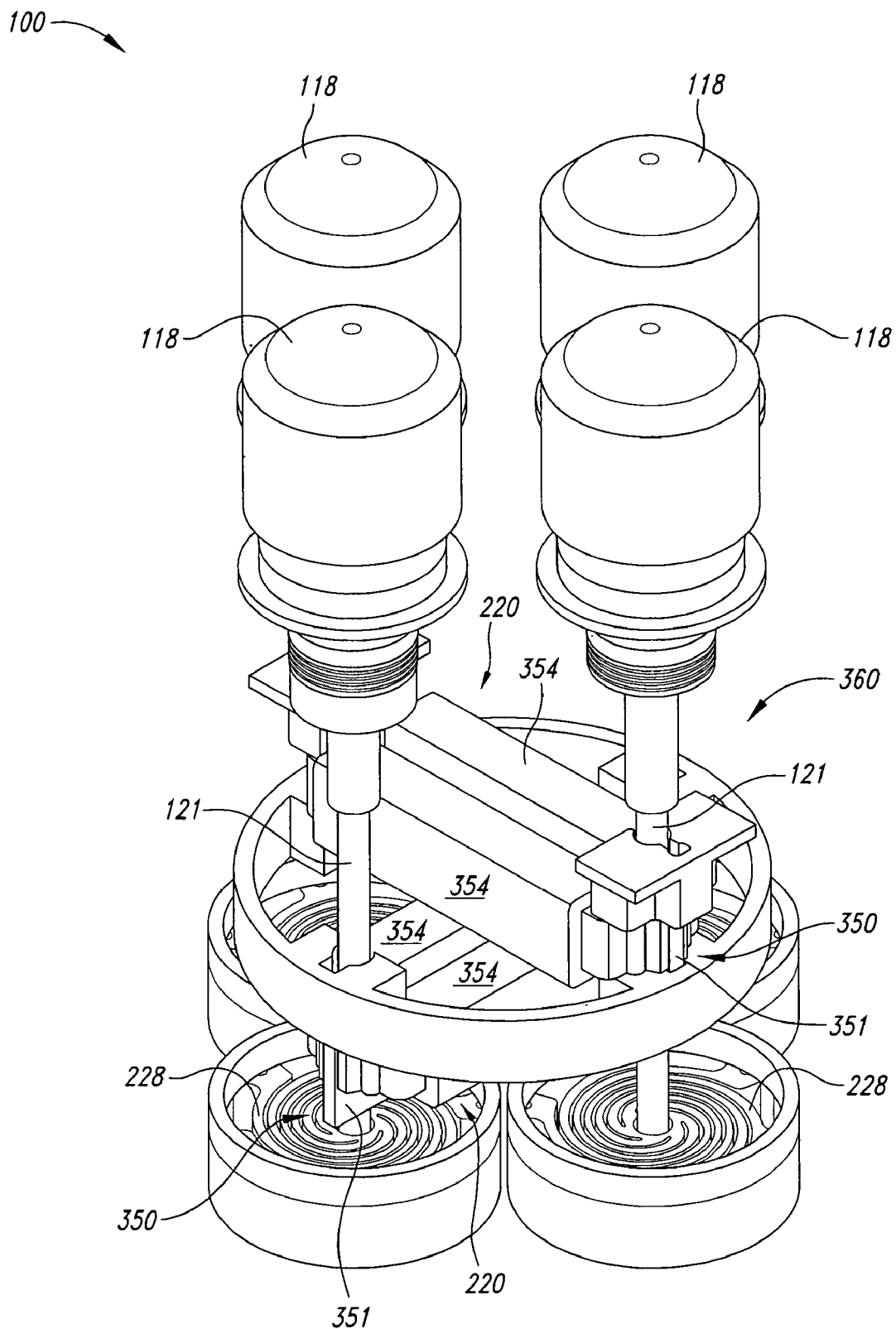
FIG. 57 is an isometric view of a four-cylinder implementation of the non-fluidic free-piston multicylinder Stirling system using duplex linear alternators.
Figure 58:
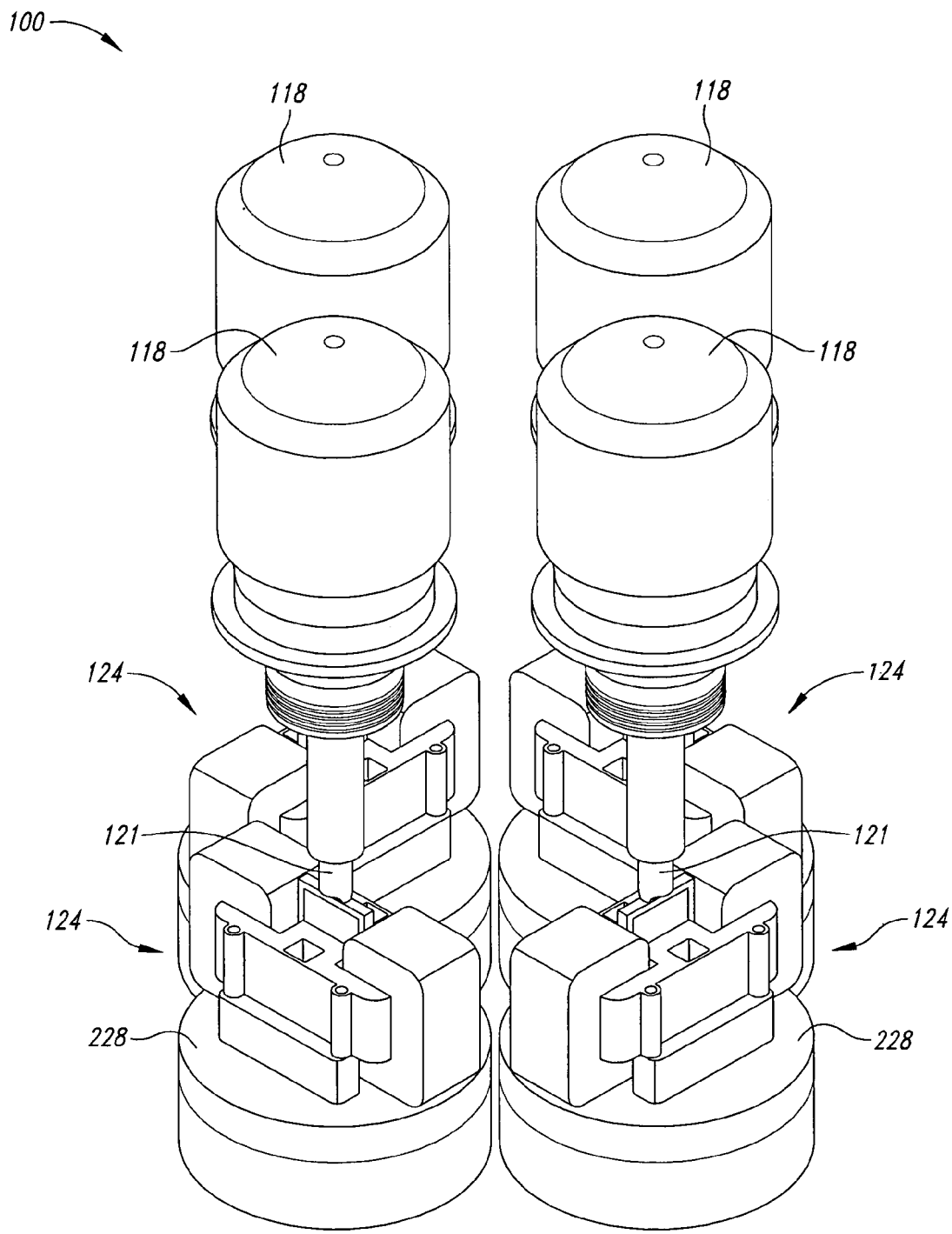
FIG. 58 is an isometric view of a four-cylinder implementation of the non-fluidic free-piston multicylinder Stirling system using one single linear alternator per cylinder.

Each of the coils 354 of a first instance of the duplex linear alternator 220 are positioned on their respective stator 352 at an angle. This positioning of the coils 354 helps to accommodate placement of the piston rods 121 of a second instance of the duplex linear alternator 220 when the first and second instances of the duplex linear alternator are positioned adjacent one another, shown in FIG. 56, to operate in a four-cylinder implementation of the system 100, further shown in FIG. 57. Four-cylinder implementations of the system 100 using the duplex linear alternator 220 have potential for being more compact compared with use of one linear alternator for each of the four cylinders as shown in FIG. 58. Other four-cylinder implementations can use the depicted duplex linear alternator 220 along with two single mover linear alternators for supplying output at multiple voltages and to provide more aggressive phase locking by connecting the single conventional alternators in parallel.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A Stirling system comprising:
 a plurality of double-acting non-fluidic free-pistons;
 a plurality of overstroke preventers, each coupled to at least a different one of the pistons;
 a plurality of cylinders, each having a different one of the pistons positioned therein for reciprocal motion, each of the cylinders coupled to a different corresponding pair of other ones of the cylinders to fluidly couple the cylinder to a first cylinder and a second cylinder of the corresponding pair; and
 a Stirling cycle working fluid, portions of the Stirling cycle working fluid positioned in the cylinders and in contact with the pistons, the reciprocal motion of the piston positioned in each of the cylinders being coupled to the reciprocal motion of the piston positioned in the first cylinder of the corresponding pair solely through the Stirling cycle working fluid and being coupled to the reciprocal motion of the piston positioned in the second cylinder of the corresponding pair solely through the Stirling cycle working fluid.

2. The system of claim 1 wherein each of the cylinders is coupled to the first cylinder of the corresponding pair to provide for transfer of a first portion of the Stirling cycle working fluid therebetween and coupled to the second cylinder of the corresponding pair to provide for transfer of a second portion of the Stirling cycle working fluid therebetween.

3. The system of claim 2 wherein each of the cylinders has a hot end and a cold end, and wherein each of the cylinders is coupled to the corresponding pair by coupling of the hot end of the cylinder with the cold end of the first cylinder of the corresponding pair and by coupling of the cold end of the cylinder with the hot end of the second cylinder of the corresponding pair.

4. The system of claim 2 wherein each of the cylinders is coupled to the corresponding pair by coupling of the cylinder with the first cylinder of the corresponding pair via a first heat exchanger circuit and by coupling of the cylinder with the second cylinder of the corresponding pair via a second heat exchanger circuit.

5. The system of claim 1 further comprising a plurality of flexure bearings, and wherein each of the pistons is coupled to the cylinder within which positioned through at least a different one of the flexure bearings.

6. The system of claim 1 wherein the cylinders are located with respect to one another in positions to cancel a substantial portion of reaction forces resulting from operation of the pistons to reduce vibration.

7. The system of claim 1 wherein each of the overstroke preventers includes a linear alternator having a mover and further includes a controller configured to control the mover to avoid undesirable travel of the piston coupled to the overstroke preventer.

8. The system of claim 2 wherein the controller controls to avoid travel of the piston past a predefined end point of reciprocal motion.

9. The system of claim 1 further comprising a tuning system having an accumulator fluidly coupled to at least one of the cylinders through a first fluid line and a second fluid line, the first fluid line having a first check valve configured to allow fluid flow from the at least one cylinder to the accumulator and to prevent fluid flow from the accumulator to the at least one cylinder, and the second fluid line having a second check valve configured to allow fluid flow from the accumulator to the at least one cylinder and to prevent fluid flow from the at least one cylinder to the accumulator.

10. A method for operating a Stirling system, comprising:
 positioning each of a plurality of double-acting non-fluidic free-pistons in a different one of a plurality of cylinders;
 allowing each of the pistons to reciprocate within its respective cylinder;
 controlling the reciprocal motion of each of the pistons within its respective cylinder to prevent undesirable travel of the piston within the respective cylinder;
 including portions of a Stirling cycle working fluid in the cylinders and contacting the pistons; and
 coupling the reciprocal motion of each of the pistons with the reciprocal motions of a different pair of the pistons solely through the Stirling cycle working fluid.

11. The method of claim 10 wherein allowing each of the pistons to reciprocate within its respective cylinder includes coupling each of the pistons to the respective cylinder through at least one flexure bearing.

12. The method of claim 10 further comprising adjusting the amount of the Stirling cycle working fluid to adjust frequency of the reciprocal motion of the pistons within their respective cylinders.

13. The method of claim 10 further comprising locating the cylinders with respect to one another in positions to cancel a substantial portion of reaction forces resulting from reciprocation of the pistons to reduce vibration.

14. The method of claim 10 further comprising coupling at least one linear alternator to at least one of the pistons, and wherein the controlling the reciprocal motion of each of the pistons further comprises controlling an amount of travel of a mover of the linear alternator coupled to the at least one piston.

15. The method of claim 10 wherein controlling the reciprocal motion of each of the pistons further comprises for each pair of different pistons using a controller to control a stator of a duplex linear alternator to control an amount of travel of two movers of the duplex linear alternator, each of the two movers coupled to a different one of the pistons of the pair.

16. The method of claim 10 wherein controlling the reciprocal motion of each of the pistons to prevent undesirable travel is to prevent piston travel that causes damage to at least one of the following: the piston or the cylinder within which the piston is positioned.

17. The method of claim 10 further comprising extracting work from the reciprocal motion of the pistons.

18. The method of claim 10 further comprising inputting work into the reciprocal motion of the pistons.

19. A Stirling system comprising:
a Stirling cycle working fluid;
a plurality of double-acting non-fluidic free-pistons, the pistons in contact with portions of the Stirling cycle working fluid;
a plurality of overstroke preventers, each of the overstroke preventers coupled to at least a different one of the pistons; and
a plurality of cylinders, each of the cylinders having some of the Stirling cycle working fluid therein and coupled to a different corresponding pair of other ones of the cylinders to couple the cylinder to a first cylinder of the corresponding pair to provide for transfer of a first portion of the Stirling cycle working fluid therebetween and to couple the cylinder to a second cylinder of the corresponding pair to provide for transfer of a second portion of the Stirling cycle working fluid therebetween, each of the pistons positioned in a different one of the cylinders for reciprocal motion therein, the piston positioned in the cylinder being coupled to the piston positioned in the first cylinder of the corresponding pair through the Stirling cycle working fluid and coupled to the piston positioned in the second cylinder of the corresponding pair through the Stirling cycle working fluid.

20. The system of claim 19 further comprising a plurality of flexure bearings, and wherein each of the pistons is coupled to the cylinder with which positioned through at least a different one of the flexure bearings.

21. The system of claim 19 wherein the cylinders are located with respect to one another in positions to cancel a substantial portion of reaction forces to reduce vibration.

22. The system of claim 19 wherein the overstroke preventers includes at least one duplex linear alternator having two movers, each mover coupled to a different one of the pistons, and further includes a controller configured to control at least the two movers to avoid undesirable travel of the pistons coupled to the overstroke preventer.

23. The system of claim 20 wherein the controller controls to avoid travel of each of the pistons to an extent past a predefined end point of reciprocal motion for the piston.

24. The system of claim 19 further comprising a tuning system having an accumulator fluidly coupled to at least one of the cylinders through a first fluid line and a second fluid line, the first fluid line having a first check valve configured to allow fluid flow from the at least one cylinder to the accumulator and to prevent fluid flow from the accumulator to the at least one cylinder, and the second fluid line having a second check valve configured to allow fluid flow from the accumulator to the at least one cylinder and to prevent fluid flow from the at least one cylinder to the accumulator.

25. A method for operating a Stirling system, comprising:
allowing each of a plurality of double-acting non-fludic free-pistons to reciprocate within a different one of a plurality of cylinders;
including a Stirling cycle working fluid within at least portions of the cylinders to contact the free pistons;
controlling the reciprocal motion of each of the pistons within its respective cylinder to limit travel of the piston therein; and
fluidly coupling each of the cylinders to a different corresponding pair of other ones of the cylinders to couple the cylinder to a first cylinder of the corresponding pair to provide for transfer of a first portion of the Stirling cycle working fluid therebetween and to couple the cylinder to a second cylinder of the corresponding pair to provide for transfer of a second portion of the Stirling cycle working fluid therebetween, with the piston positioned in each cylinder coupled through the Stirling cycle working fluid with the piston within the first cylinder of the corresponding pair and through the Stirling cycle working fluid with the piston within the second cylinder of the corresponding pair.

26. The method of claim 25 wherein allowing each of the pistons to reciprocate within its respective cylinder includes coupling each of the pistons to the respective cylinder through at least one flexure bearing.

27. The method of claim 25 further comprising adjusting the amount of the Stirling cycle working fluid to adjust frequency of the reciprocal motion of the pistons within their respective cylinders.

28. The method of claim 25 further comprising locating the cylinders with respect to one another in positions to cancel a substantial portion of reaction forces resulting from reciprocation of the pistons to reduce vibration.

29. The method of claim 25 further comprising coupling at least one linear alternator to at least one of the pistons, and wherein the controlling the reciprocal motion of each of the pistons further comprises controlling an amount of travel of a mover of the linear alternator coupled to the at least one piston.

30. The method of claim 25 wherein controlling the reciprocal motion of each of the pistons further comprises for each pair of different pistons using a controller to control a stator of a duplex linear alternator to control an amount of travel of two movers of the duplex linear alternator, each of the two movers coupled to a different one of the pistons of the pair.

31. The method of claim 25 wherein controlling the reciprocal motion of each of the pistons to limit travel is to limit piston travel sufficient to avoid damage to at least one of the following: the piston or the cylinder within which the piston is positioned.

32. The method of claim 25 further comprising extracting work from the reciprocal motion of the pistons.

33. The method of claim 25 further comprising inputting work into the reciprocal motion of the pistons.

34. A Stirling system comprising:
a plurality of double-acting non-fluidic free-pistons mechanically disconnected from each other;
a plurality of overstroke preventers, each coupled to at least a different one of the pistons; and
a plurality of cylinders, each having a different one of the pistons positioned therein for reciprocal motion, each of the cylinders coupled to a different corresponding pair of other ones of the cylinders to fluidly couple the cylinder to a first cylinder and a second cylinder of the corresponding pair;
a Stirling cycle working fluid, portions of the Stirling cycle working fluid positioned in the cylinders and contacting the pistons, the reciprocal motion of each piston being coupled to the reciprocal motion of at least another one of the pistons through the Stirling cycle working fluid being transferred between the respective cylinder of the piston and the respective cylinder of the at least another one of the pistons; and
means for extracting work from the reciprocal motion of the pistons.

35. A Stirling system comprising:
a plurality of double-acting non-fluidic free-pistons mechanically disconnected from each other;
a plurality of overstroke preventers, each coupled to at least a different one of the pistons; and
a plurality of cylinders, each having a different one of the pistons positioned therein for reciprocal motion, each of the cylinders coupled to a different corresponding pair of other ones of the cylinders to fluidly couple the cylinder to a first cylinder and a second cylinder of the corresponding pair;
a Stirling cycle working fluid, portions of the Stirling cycle working fluid positioned in the cylinders and contacting the pistons, the reciprocal motion of each piston being coupled to the reciprocal motion of at least another one of the pistons through the Stirling cycle working fluid flowing between the respective cylinder of the piston and the respective cylinder of the least another one of the pistons; and
means for supplying work to the reciprocal motion of the pistons.

36. A Stirling system comprising:
a plurality of double-acting non-fluidic free-pistons mechanically disconnected from each other;
a plurality of cylinders, each having a different one of the pistons positioned therein for reciprocal motion, each of the cylinders fluidly coupled to a different corresponding pair of other ones of the cylinders to fluidly couple the cylinder to a first cylinder and a second cylinder of the corresponding pair; and
a Stirling cycle working fluid, portions of the Stirling cycle working fluid positioned in the cylinders and contacting the pistons, the reciprocal motion of the piston positioned in each of the cylinders being coupled to the reciprocal motion of the piston positioned in the first cylinder of the corresponding pair through the Stirling cycle working fluid via the fluid coupling of the cylinder to provide for transfer of a first portion of the Stirling cycle working fluid therebetween in which the piston is positioned to the first cylinder of the corresponding pair, and being coupled to the reciprocal motion of the piston positioned in the second cylinder of the corresponding pair through the Stirling cycle working fluid via the fluid coupling of the cylinder to provide for transfer of a second portion of the Stirling cycle working fluid therebetween in which the piston is positioned to the second cylinder of the corresponding pair.

37. The system of claim 36 wherein each of the cylinders has a hot end and a cold end, and wherein each of the cylinders is coupled to the corresponding pair by coupling of the hot end of the cylinder with the cold end of the first cylinder of the corresponding pair and by coupling of the cold end of the cylinder with the hot end of the second cylinder of the corresponding pair.

38. The system of claim 36 wherein each of the cylinders is coupled to the corresponding pair by coupling of the cylinder with the first cylinder of the corresponding pair via a first heat exchanger circuit and by coupling of the cylinder with the second cylinder of the corresponding pair via a second heat exchanger circuit.

39. The system of claim 36 further comprising a tuning system having an accumulator fluidly coupled to at least one of the cylinders through a first fluid line and a second fluid line, the first fluid line having a first check valve configured to allow fluid flow from the at least one cylinder to the accumulator and to prevent fluid flow from the accumulator to the at least one cylinder, and the second fluid line having a second check valve configured to allow fluid flow from the accumulator to the at least one cylinder and to prevent fluid flow from the at least one cylinder to the accumulator.

40. A free-piston Stirling system comprising:
a plurality of double-acting non-fluidic free-pistons;
a plurality of cylinders, each having a different one of the pistons positioned therein for reciprocal motion, each of the cylinders fluidly coupled to a different corresponding pair of other ones of the cylinders to fluidly couple the cylinder to a first cylinder and a second cylinder of the corresponding pair; and
a Stirling cycle working fluid, portions of the Stirling cycle working fluid positioned in the cylinders, the reciprocal motion of the piston positioned in each of the cylinders being coupled to the reciprocal motion of the piston positioned in the first cylinder of the corresponding pair through the Stirling cycle working fluid via the fluid coupling of the cylinder to provide for transfer of a first portion of the Stirling cycle working fluid therebetween in which the piston is positioned to the first cylinder of the corresponding pair, and being coupled to the reciprocal motion of the piston positioned in the second cylinder of the corresponding pair through the Stirling cycle working fluid via the fluid coupling of the cylinder to provide for transfer of a first portion of the Stirling cycle working fluid therebetween in which the piston is positioned to the second cylinder of the corresponding pair, whereby the Stirling system operates without use of a separate displacer piston.

41. The system of claim 40 wherein each of the cylinders has a hot end and a cold end, and wherein each of the cylinders is coupled to the corresponding pair by coupling of the hot end of the cylinder with the cold end of the first cylinder of the corresponding pair and by coupling of the cold end of the cylinder with the hot end of the second cylinder of the corresponding pair.

42. The system of claim 40 wherein each of the cylinders is coupled to the corresponding pair by coupling of the cylinder with the first cylinder of the corresponding pair via a first heat exchanger circuit and by coupling of the cylinder with the second cylinder of the corresponding pair via a second heat exchanger circuit.

43. The system of claim 40 further comprising a tuning system having an accumulator fluidly coupled to at least one of the cylinders through a first fluid line and a second fluid line, the first fluid line having a first check valve configured to allow fluid flow from the at least one cylinder to the accumulator and to prevent fluid flow from the accumulator to the at least one cylinder, and the second fluid line having a second check valve configured to allow fluid flow from the accumulator to the at least one cylinder and to prevent fluid flow from the at least one cylinder to the accumulator.

44. A method for operating a Stirling system, comprising:
positioning each of a plurality of double-acting non-fluidic free-pistons in a different one of a plurality of cylinders, the pistons being mechanically disconnected from each other;
allowing each of the pistons to reciprocate within its respective cylinder;
including portions of a Stirling cycle working fluid in the cylinders; and
coupling the reciprocal motion of each of the pistons with the reciprocal motions of a different corresponding pair of the pistons through the Stirling cycle working fluid moving between the cylinders.

45. The method of claim 44 wherein coupling the reciprocal motion of each of the pistons with the reciprocal motions of a corresponding pair of pistons through the Stirling cycle working fluid includes fluidly coupling each of the cylinders to a different corresponding pair of the cylinders in which in the corresponding pair of pistons are positioned to fluidly couple the cylinder to a first cylinder and a second cylinder of the corresponding pair of cylinders.

46. The method of claim 44 further comprising adjusting the amount of the Stirling cycle working fluid to adjust frequency of the reciprocal motion of the pistons within their respective cylinders.

47. A Stirling system comprising:
a Stirling cycle working fluid;
a plurality of double-acting non-fluidic free-pistons mechanically disconnected from each other; and
a plurality of cylinders, portions of the Stirling cycle working fluid located therein, each of the cylinders coupled to a different corresponding pair of other ones of the cylinders to couple the cylinder to a first cylinder of the corresponding pair to provide for transfer of a first portion of the Stirling cycle working fluid therebetween and to couple the cylinder to a second cylinder of the corresponding pair to provide for transfer of a second portion of the Stirling cycle working fluid therebetween, each of the pistons positioned in a different one of the cylinders for reciprocal motion therein, the piston positioned in the cylinder being coupled to the piston positioned in the first cylinder of the corresponding pair through the Stirling cycle working fluid and coupled to the piston positioned in the second cylinder of the corresponding pair through the Stirling cycle working fluid.

48. The system of claim 47 further comprising a tuning system having an accumulator fluidly coupled to at least one of the cylinders through a first fluid line and a second fluid line, the first fluid line having a first check valve configured to allow fluid flow from the at least one cylinder to the accumulator and to prevent fluid flow from the accumulator to the at least one cylinder, and the second fluid line having a second check valve configured to allow fluid flow from the accumulator to the at least one cylinder and to prevent fluid flow from the at least one cylinder to the accumulator.

49. A method for operating a Stirling system, comprising:
allowing each of a plurality of double-acting non-fluidic free-pistons to reciprocate within a different one of a plurality of cylinders, the pistons being mechanically disconnected from each other;
including a Stirling cycle working fluid within at least portions of the cylinders; and
fluidly coupling each of the cylinders to a different corresponding pair of other ones of the cylinders to couple the cylinder to a first cylinder of the corresponding pair to provide for transfer of a first portion of the Stirling cycle working fluid therebetween and to couple the cylinder to a second cylinder of the corresponding pair to provide for transfer of a second portion of the Stirling cycle working fluid therebetween, with the piston positioned in each cylinder coupled through the Stirling cycle working fluid with the piston within the first cylinder of the corresponding pair and through the Stirling cycle working fluid with the piston within the second cylinder of the corresponding pair.

50. The method of claim 49 further comprising adjusting the amount of the Stirling cycle working fluid to adjust frequency of the reciprocal motion of the pistons within their respective cylinders.

51. A Stirling machine having a plurality of cylinders, each cylinder having a double-acting non-fluidic free-piston therein, a system comprising:
an accumulator;
a first fluid line fluidly coupled to the accumulator and at least a first one of the cylinders;
a first solenoid valve positioned in the first fluid line, the first solenoid valve configured to be controlled to open and close;
a first check valve positioned in the first fluid line, the first check valve configured to allow fluid flow from the at least first one cylinder to the accumulator and to prevent fluid flow from the accumulator to the at least first one cylinder when the first solenoid valve is open;
a second fluid line fluidly coupled to the accumulator and at least a second one of the cylinders, the at least first one cylinder and the at least second one cylinder being the same cylinder or different cylinders;
a second solenoid valve positioned in the second fluid line, the second solenoid valve configured to be controlled to open and close; and
a second check valve positioned in the second fluid line, the second check valve configured to allow fluid flow from the accumulator to the at least one second cylinder and to prevent fluid flow from the at least one second cylinder to the accumulator when the second solenoid valve is open.

52. For a Stirling machine having a plurality of cylinders, each cylinders having a non-fluidic free-piston therein, a system comprising:
an accumulator;
a first fluid line fluidly coupled to the accumulator and at least a first one of the cylinders;
a first valve positioned in the first fluid line, the first valve configured to be controlled to open and close;
a first check valve positioned in the first fluid line, the first check valve configured to allow fluid flow from the at least first one cylinder to the accumulator and to prevent fluid flow from the accumulator to the at least first one cylinder when the first solenoid valve is open;
a second fluid line fluidly coupled to the accumulator and at least a second one of the cylinders, the at least first one cylinder and the at least second one cylinder being the same cylinder or different cylinders;
a second valve positioned in the second fluid line, the second valve configured to be controlled to open and close;
a second check valve positioned in the second fluid line, the second check valve configured to allow fluid flow from the accumulator to the at least one second cylinder and to prevent fluid flow from the at least one second cylinder to the accumulator when the second solenoid valve is open; and
a controller coupled with the first valve and the second valve, the controller configured to control the first valve and the second valve based at least in part on a desired operating frequency for the Stirling machine.

53. A method comprising:
providing a first multicylinder double-acting non-fluidic free-piston machine having a first plurality of cylinders, the first cylinders being interconnected to share a first Stirling cycle working fluid, each first cylinder with a first piston reciprocally mounted therein, the first piston having at least one moveable component of an overstroke preventer coupled thereto;
providing a second multicylinder double-acting non-fluidic free-piston machine having a second plurality of cylinders, the second cylinders being interconnected to share a second Stirling cycle working fluid, the first cylinders unconnected with the second cylinders to prevent the first cylinders from sharing the second Stirling cycle working fluid and to prevent the second cylinders from sharing the first Stirling cycle working fluid, each second cylinder with a second piston reciprocally mounted therein, the second piston having at least one moveable component of an overstroke preventer coupled thereto; and locating the first multicylinder machine and the second multicylinder machine with respect to one another and controlling movement of the first pistons and the second pistons with the overstroke preventers to cancel reaction forces resulting from reciprocation of the pistons to reduce operational vibration.

* * * * *